US011651257B2

(12) United States Patent
Mehra et al.

(10) Patent No.: US 11,651,257 B2
(45) Date of Patent: May 16, 2023

(54) SOFTWARE COBOT ENGINEERING, EXECUTION, AND MONITORING

(71) Applicant: ACCENTURE GLOBAL SOLUTIONS LIMITED, Dublin (IE)

(72) Inventors: Rohit Mehra, Rohini (IN); Vibhu Saujanya Sharma, Bangalore (IN); Vikrant Kaulgud, Pune (IN); Sanjay Podder, Thane (IN); Adam Patten Burden, Tampa, FL (US); Sourav Bhattacharya, Kolkata (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 230 days.

(21) Appl. No.: 17/084,212

(22) Filed: Oct. 29, 2020

(65) Prior Publication Data
US 2022/0138604 A1 May 5, 2022

(51) Int. Cl.
*G06N 5/043* (2023.01)
*G06F 8/10* (2018.01)
*G06F 11/30* (2006.01)

(52) U.S. Cl.
CPC .............. *G06N 5/043* (2013.01); *G06F 8/10* (2013.01); *G06F 11/302* (2013.01)

(58) Field of Classification Search
CPC .......... G06N 5/043; G06F 8/10; G06F 11/302
USPC .................................................... 706/12–46
See application file for complete search history.

(56) References Cited

U.S. PATENT DOCUMENTS

| 5,952,796 A * | 9/1999 | Colgate .................. B25J 9/1689 318/1 |
| 6,567,973 B1 * | 5/2003 | Yamamoto .............. G06F 9/454 717/136 |
| 6,678,744 B2 * | 1/2004 | Moon .................. G06F 9/45512 719/315 |
| 6,735,759 B1 * | 5/2004 | Yamamoto .............. G06F 9/454 717/136 |

(Continued)

FOREIGN PATENT DOCUMENTS

| EP | 3643455 A1 | 4/2020 |
| WO | 2019234700 A1 | 12/2019 |

OTHER PUBLICATIONS

Gillespie et al, "A General Framework for Cobot Control", IEEE, pp. 391-400 (Year: 2001).*
Peshkin et al, "Cobot Architecture", IEEE, pp. 377-390 (Year: 2001).*
Michaelis et al, "Collaborative or Simply Uncaged? Understanding Human-Cobot Interactions in Automation", ACM, pp. 1-12 (Year: 2020).*

(Continued)

*Primary Examiner* — Anil Khatri
(74) *Attorney, Agent, or Firm* — Mannava & Kang, P.C.

(57) ABSTRACT

In some examples, software CoBot engineering, execution, and monitoring may include extracting a CoBot requirement from a requirement specification for a CoBot that is to be implemented. Based on application of a CoBot description language to the CoBot requirement, a CoBot workflow that specifies a plurality of tasks to be performed by the CoBot may be generated. A determination may be made as to whether a task is to be performed by a bot or by a human. A team that includes a plurality of bots and at least one human may be generated to execute the CoBot workflow. The bots of the team may be prioritized to identify a bot that is a best match to the CoBot requirement. The CoBot that includes configured bots may be deployed in an operational environment to perform the CoBot workflow.

18 Claims, 45 Drawing Sheets

(56) References Cited

U.S. PATENT DOCUMENTS

| | | | | |
|---|---|---|---|---|
| 6,851,115 | B1* | 2/2005 | Cheyer | G06F 9/465 |
| | | | | 717/114 |
| 7,152,092 | B2* | 12/2006 | Beams | G09B 7/00 |
| | | | | 434/323 |
| 7,644,048 | B2* | 1/2010 | Vane | G06N 5/043 |
| | | | | 706/45 |
| 8,069,131 | B1* | 11/2011 | Luechtefeld | G06Q 10/06 |
| | | | | 706/50 |
| 8,229,878 | B2* | 7/2012 | Michelin | G06F 40/30 |
| | | | | 706/62 |
| 8,438,007 | B1* | 5/2013 | Hokari | G06F 9/454 |
| | | | | 704/7 |
| 9,053,236 | B1* | 6/2015 | Covarrubias | G06F 11/3684 |
| 10,831,839 | B1* | 11/2020 | Ogawa | G10L 13/033 |
| 10,997,258 | B2* | 5/2021 | Chen | G06F 16/3329 |
| 11,416,224 | B1* | 8/2022 | Kaitha | G06F 8/35 |
| 11,497,564 | B2* | 11/2022 | Dahdouh | A61B 34/35 |
| 2019/0299411 | A1* | 10/2019 | Kumar | B25J 9/1676 |

OTHER PUBLICATIONS

Ionescu et al, "Improving Safeguards and Functionality in Industrial Collaborative Robot HMIs through GUI Automation", IEEE, pp. 557-564 (Year: 2020).*

Cheon et al, "Working with Bounded Collaboration: A Qualitative Study on How Collaboration is Co-Constructed around Collaborative Robots in Industry", ACM, pp. 1-34 (Year: 2022).*

Ambati et al, "Collaborative Workflow for Crowdsourcing Translation", ACM, pp. 1191-1194 (Year: 2012).*

Hanna et al, "Towards safe human robot collaboration—Risk assessment of intelligent automation", IEEE, pp. 424-431 (Year: 2020).*

Michael Peshkin et al "Industrial Robot: An International Journal: Cobots" DOI:10.1108/01439919910283722, Publication Date: Jan. 7, 1999, 7 pages.

Witaya Wannasuphoprasit et al "Cobot Control" DOI: 10.1109/ROBOT.1997.606888, Publication Date: Apr. 25, 1997, 6 pages.

* cited by examiner

Create New Project (Step 1 of 2)

Let's start with a name for your project: Credit Card Application Processing

Requirement Description

Credit card application process goes through multiple approval before customer is offered a credit card. Applying for a credit card occurs in four steps. It can process more than 1000 enquiry at a time. Customer query – customer enquires about offers and provides his details that is used in the second phase to process customer application. The system sends the processed customer application including customer's name and address information to the credit card service to determine through for score check. If the customer is eligible to apply for the credit card being offered. If the customer is eligible to apply for the credit card, the process then determines if the customer is approved for the credit card based on customer history. the customer can accept the credit card offer and complete a credit card application. If the customer qualifies for the credit card, the system ask the customer if he/she would like to apply for the credit card. If the customer accepts the credit card offer, the system sends additional customer information to the credit card service for further processing.

Upload requirement document

Next ⇧

Create New Project (Step 1 of 2)

Let's start with a name for your project - Credit Card Application Processing

Requirement Description

☐ Type of process ☐ Domain ☐ How-to ☐ Functional requirements

Credit card application process goes through multiple approval before customer is offered a credit card. Applying for a credit card occurs in four steps. It can process more than [illegible] at a time. Customer query - customer enquires about offers and provides his details that is used in the second phase to process customer application. The system sends the processed customer application including customer's name and address information to the credit card service to determine through for score check. if the customer is eligible to apply for the credit card being offered.If the customer is eligible to apply for the credit card, the process then determines if the customer is approved for the credit card based on customer history, the customer can accept the credit card offer and complete a credit card application. If the customer qualifies for the credit card, the system ask the customer if he/she would like to apply for the credit card. If the customer accepts the credit card offer, the system sends additional customer information to the credit card service for further processing.

⬆ Upload requirements document

Next ➡

EXTRACT, BASED ON AT LEAST ONE DOMAIN-SPECIFIC NATURAL LANGUAGE PROCESSING MODEL, AT LEAST ONE COBOT REQUIREMENT FROM A REQUIREMENT SPECIFICATION FOR A COBOT THAT IS TO BE IMPLEMENTED
4302

GENERATE, BASED ON APPLICATION OF A COBOT DESCRIPTION LANGUAGE TO THE AT LEAST ONE COBOT REQUIREMENT, A COBOT WORKFLOW THAT SPECIFIES A PLURALITY OF TASKS TO BE PERFORMED BY THE COBOT
4304

DEPLOY, THE COBOT THAT INCLUDES AT LEAST ONE BOT AND AT LEAST ONE HUMAN IN AN OPERATIONAL ENVIRONMENT TO PERFORM THE COBOT WORKFLOW
4306

FIG. 43

SOFTWARE COBOT ENGINEERING, EXECUTION, AND MONITORING

BACKGROUND

A collaborative robot may be referred to as a CoBot, and may represent a software robot and a human that work together as a team to achieve a particular goal, A software robot may be referred to as a bot. Compared to a bot that may be isolated from direct human interaction, for a CoBot, the bot and the human may cooperatively operate in a specified environment.

BRIEF DESCRIPTION OF DRAWINGS

Features of the present disclosure are illustrated by way of example and not limited in the following figure(s), in which like numerals indicate like elements, in which:

FIG. 24 illustrates credit card application processing for the loan approval process CoBot of FIG. 23 to illustrate operation of the software CoBot engineering, execution, and monitoring apparatus of FIG. 1 in accordance with an example of the present disclosure;

FIG. 26 illustrates credit card application processing for the loan approval process CoBot of FIG. 23 to illustrate operation of the software CoBot engineering, execution, and monitoring apparatus of FIG. 1 in accordance with an example of the present disclosure;

FIG. 29 illustrates creation of a new project including selection of a request for the loan approval process CoBot of FIG. 23 to illustrate operation of the software CoBot engineering, execution, and monitoring apparatus of FIG. 1 in accordance with an example of the present disclosure;

FIG. 43 illustrates a flowchart of an example method for software CoBot engineering, execution, and monitoring in accordance with an example of the present disclosure.

DETAILED DESCRIPTION

Figure 1:
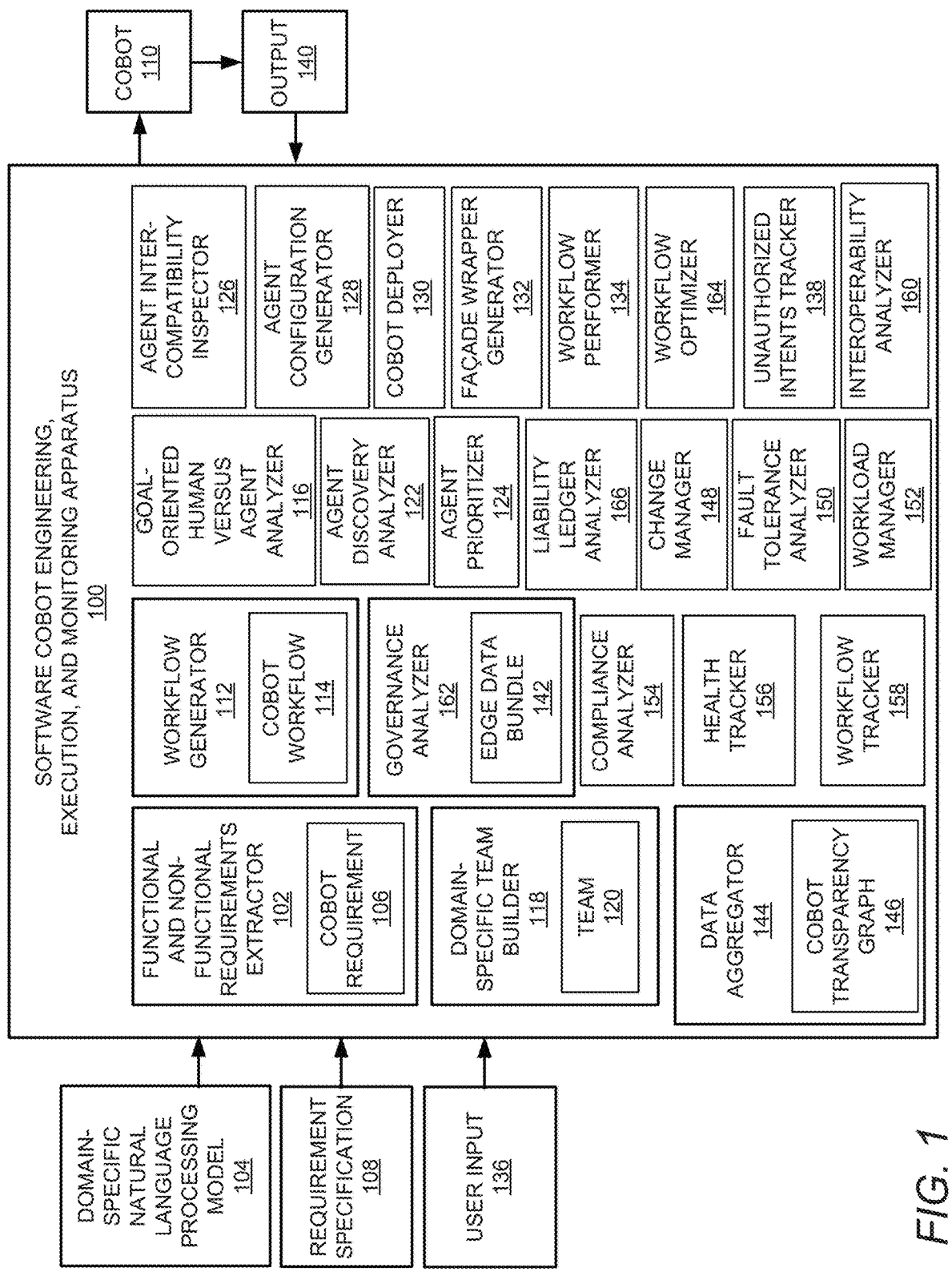
FIG. 1 illustrates a layout of a software CoBot engineering, execution, and monitoring apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Software CoBot engineering, execution, and monitoring apparatuses, methods for software CoBot engineering, execution, and monitoring, and non-transitory computer readable media having stored thereon machine readable instructions to provide software CoBot engineering, execution, and monitoring are disclosed herein. The apparatuses, methods, and non-transitory computer readable media disclosed herein provide for software CoBot engineering, execution, and monitoring by implementation of a framework that supports the engineering and execution of software CoBots. The apparatuses, methods, and non-transitory computer readable media disclosed herein may receive and analyze as input a high level natural language description of a problem that needs to be solved, and guide a user, such as a process designer, through a series of automated and semi-automated steps towards engineering the CoBot. In this regard, the apparatuses, methods, and non-transitory computer readable media disclosed herein may provide for automatic (e.g., without human intervention) goal detection, CoBot team design, goal planning, responsibility allocation, and CoBot deployment. Further, the execution of the CoBot may be monitored in real-time by utilizing a distributed primary and secondary CoBot brain model (e.g., macro brain and micro brain as disclosed herein) that tracks and monitors a CoBot's performance, output logs, and health information, and intervenes to adapt the CoBot process in the event of any detected complications and/or violations. The CoBot framework may be agnostic of the type of software CoBot.

With respect to the apparatuses, methods, and non-transitory computer readable media disclosed herein, humans are increasingly working together with synthetic agents, both robotic and software-based, to carry out essential organizational goals. Generally, qualities such as leadership, empathy, creativity, and judgement may be attributed to humans, whereas qualities such as computational efficiency, prediction, iteration, and adaptation may be attributed to machines.

There is a rapid paradigm shift towards development and wide scale adoption of software bots for delivering and consuming services, as an alternative to command-line, desktop, web, or mobile applications. These software bots can be conversational, embodied, interfaces, and/or artificial intelligence-based. For the software bot, the human and bot team, along with components required for engineering and execution, may be referred to as a software CoBot.

With respect to current software development and bot development frameworks, it is technically challenging to implement such frameworks to build software CoBot solutions. It is also technically challenging to implement support for CoBot attributes such as shared awareness, distributed governance, interoperability, trust, and other such attributes.

The apparatuses, methods, and non-transitory computer readable media disclosed herein may address the aforementioned technical challenges by implementing a framework that supports the engineering and execution of software CoBots as disclosed herein, as well as the real-time monitoring of a deployed CoBot by utilizing a distributed primary and secondary CoBot brain model as disclosed herein.

For the apparatuses, methods, and non-transitory computer readable media disclosed herein, a bot may be described as any type of interface that exposes a software service. For example, a bot may connect a user (e.g., a human user) to a software service. The user may also include programs, systems, and/or other bots. A software bot may include a first type of relationship that includes a bot (e.g., an interface) connected to an external service, a second type of relationship that includes a bot connected to an integrated service, and a third type of relationship that includes a bot connected to both external and integrated services.

For the apparatuses, methods, and non-transitory computer readable media disclosed herein, compared to a bot, a CoBot may be described as a bot that follows human-robot collaboration principles, amplifies humans through human-hot and bot-bot coordination, and/or is composed of many collaborating bots and humans. With respect to the human-robot collaboration principles, a CoBot may include attributes such as being a partner in a human-machine teams, provide relief from risky activities, include smart and safe behavior, include flexibility and teachability, and is usable anywhere. With respect to being composed of many collaborating bots and humans, a CoBot may be composed of a chat bot, a knowledge bot, an orchestration bot, a domain bot, a Robotic Process Automation (RPA) bot, and other types of bots, With respect to amplification of humans through human-hot and bot-bot coordination, a CoBot may amplify human cognitive strengths, and free people for higher-level tasks. In this regard, blending of bot capabilities with human agents may provide for maximization of investments in automation, while supporting more satisfied and productive personnel.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry, FIG. 1 illustrates a layout of an example software CoBot engineering, execution, and monitoring apparatus (hereinafter also referred to as "apparatus 100").

Referring to FIG. 1, the apparatus 100 may include a functional and non-functional requirements extractor 102 that is executed by at least one hardware processor (e.g., the hardware processor 4202 of FIG. 42, and/or the hardware processor 4404 of FIG. 44) to extract, based on at least one domain-specific natural language processing model 104, at least one CoBot requirement 106 that includes at least one of a functional requirement, a non-functional requirement, an intent, a flow, or a constraint from a requirement specification 108 for a CoBot 110 that is to be implemented.

A workflow generator 112 that is executed by the at least one hardware processor (e.g., the hardware processor 4202 of FIG. 42, and/or the hardware processor 4404 of FIG. 44) may generate, based on application of a CoBot description language to the at least one CoBot requirement 106, a CoBot workflow 114 that specifies a plurality of tasks to be performed by the CoBot 110.

A goal-oriented human versus agent analyzer 116 that is executed by the at least one hardware processor (e.g., the hardware processor 4202 of FIG. 42, and/or the hardware processor 4404 of FIG. 44) may determine, for each of the tasks of the CoBot workflow 114, whether the task is to be performed by a bot or by a human.

A domain-specific team builder 118 that is executed by the at least one hardware processor (e.g., the hardware processor 4202 of FIG. 42, and/or the hardware processor 4404 of FIG. 44) may generate, based on the determination for each of the tasks of the CoBot workflow 114 whether the task is to be performed by the bot or by the human, a team 120 that includes a plurality of bots and at least one human to execute the CoBot workflow 114.

An agent discovery analyzer 122 that is executed by the at least one hardware processor (e.g., the hardware processor 4202 of FIG. 42, and/or the hardware processor 4404 of FIG. 44) may map the at least one of the functional requirement or the non-functional requirement with respect to the CoBot description language of the bots of the team 120.

An agent prioritizer 124 that is executed by the at least one hardware processor (e.g., the hardware processor 4202 of FIG. 42, and/or the hardware processor 4404 of FIG. 44) may prioritize, based on the mapping of the at least one of the functional requirement or the non-functional requirement, the bots of the team 120 to identify a bot that is a best match to the at least one of the functional requirement or the non-functional requirement.

According to examples disclosed herein, the agent prioritizer 124 may prioritize, based on the mapping of the at least one of the functional requirement or the non-functional requirement, the bots of the team 120 to identify at least one further bot that is a lower match to the at least one of the functional requirement or the non-functional requirement.

An agent inter-compatibility inspector 126 that is executed by the at least one hardware processor (e.g., the hardware processor 4202 of FIG. 42, and/or the hardware processor 4404 of FIG. 44) may analyze, for the bots of the team 120, compatibility of a bot that has been assigned to perform a task of the CoBot workflow 114 with another bot that has been assigned to perform another task of the CoBot workflow 114.

According to examples disclosed herein, the agent inter-compatibility inspector 126 may assign, based on a determination that the bot that has been assigned to perform the task of the CoBot workflow 114 is not compatible with the another bot that has been assigned to perform the another task of the CoBot workflow 114, the at least one further bot that is the lower match to the at least one of the functional requirement or the non-functional requirement to perform the task of the CoBot workflow 114.

An agent configuration generator 128 that is executed by the at least one hardware processor (e.g., the hardware processor 4202 of FIG. 42, and/or the hardware processor 4404 of FIG. 44) may configure each the bots to perform the assigned task of the CoBot workflow 114.

According to examples disclosed herein, the agent configuration generator 128 may implement a macro brain to perform a global configuration of all of the bots of the team 120.

According to examples disclosed herein, the agent configuration generator 128 may implement a micro brain to perform a local configuration of each of the bots of the team 120.

A CoBot deployer 130 that is executed by the at least one hardware processor (e.g., the hardware processor 4202 of FIG. 42, and/or the hardware processor 4404 of FIG. 44) may deploy the CoBot 110 that includes the configured bots in an operational environment to perform the CoBot workflow 114.

Figure 42:
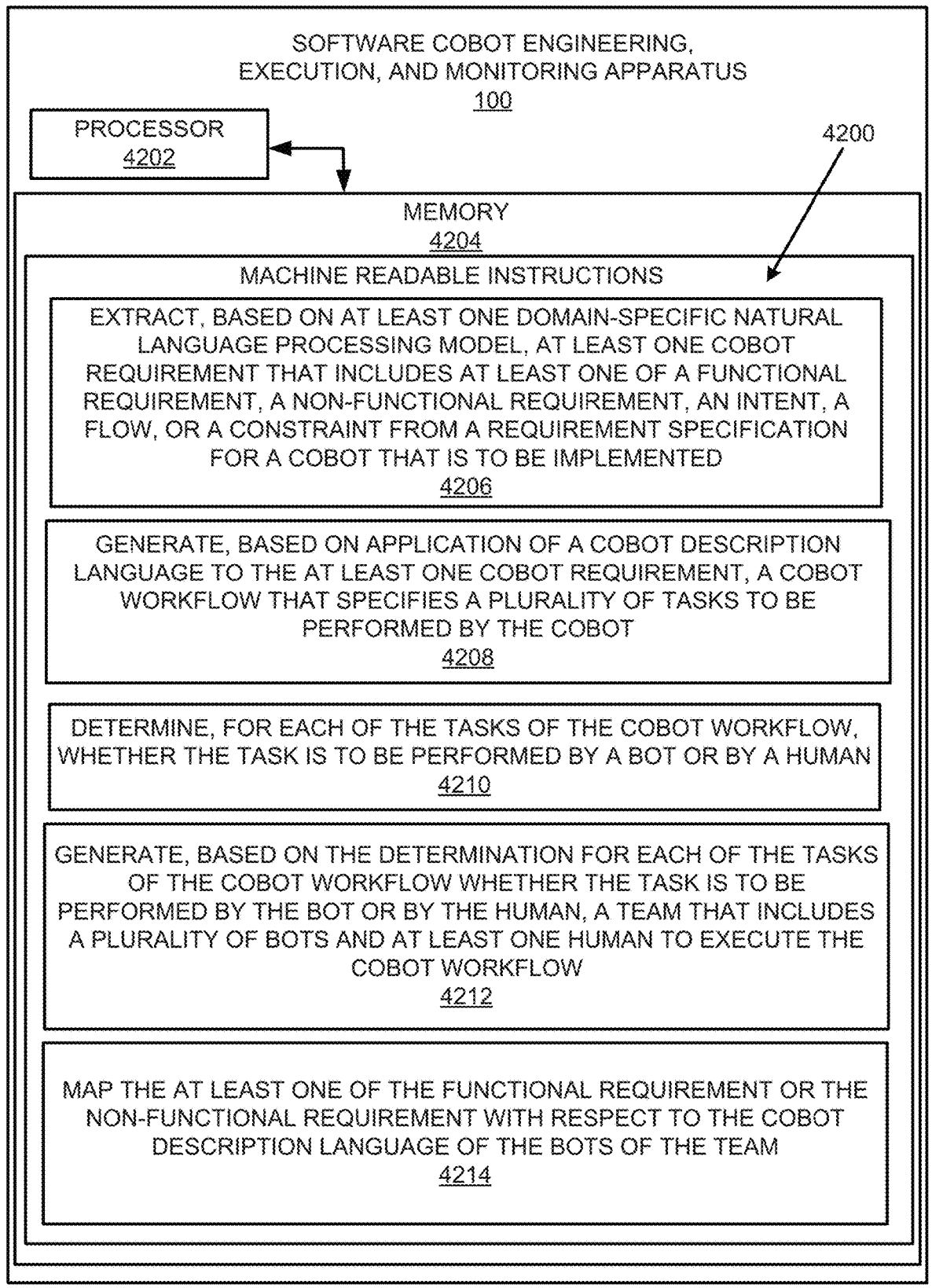
FIG. 42 illustrates an example block diagram for software CoBot engineering, execution, and monitoring in accordance with an example of the present disclosure.
Figure 42:
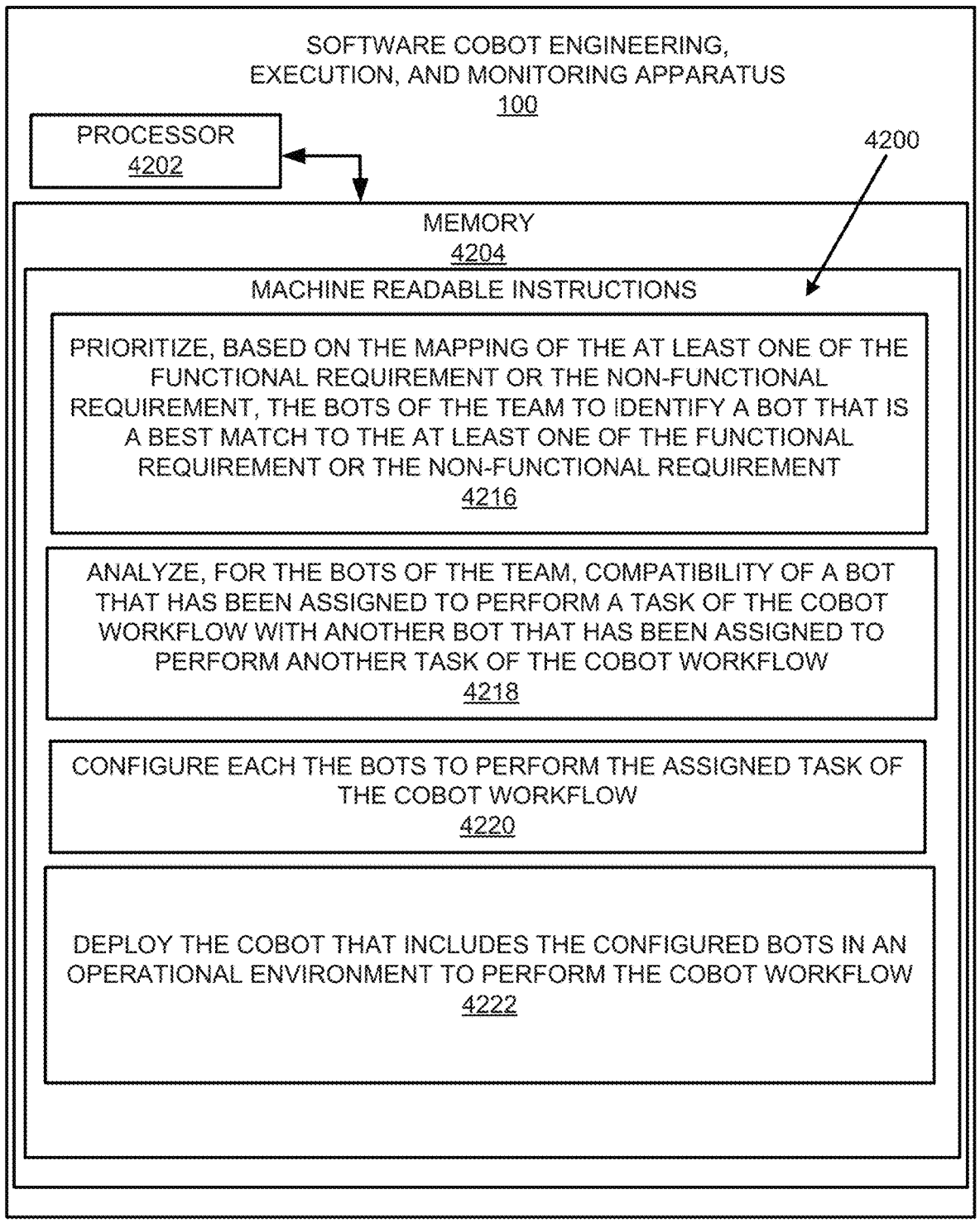

A façade wrapper generator 132 that is executed by the at least one hardware processor (e.g., the hardware processor 4202 of FIG. 42, and/or the hardware processor 4404 of FIG.

44) may generate a homogeneous wrapper for each interface between the bots and the at least one human of the team 120 to monitor a health of each of the bots. The façade wrapper generator 132 may generate the homogeneous wrapper for each interface between the bots and the at least one human of the team to enable communication between the bots and the at least one human.

A workflow performer 134 that is executed by the at least one hardware processor (e.g., the hardware processor 4202 of FIG. 42, and/or the hardware processor 4404 of FIG. 44) may analyze, for the deployed CoBot 110, a user input 136 associated with at least one task to be performed by the deployed CoBot 110. Further, the workflow performer 134 may determine, based on the user input 136, which bot of the plurality of bots or whether the at least one human is to be invoked to perform the at least one task to be performed by the deployed CoBot 110.

A workflow optimizer 164 that is executed by the at least one hardware processor (e.g., the hardware processor 4202 of FIG. 42, and/or the hardware processor 4404 of FIG. 44) may determine whether the user input 136 corresponds to a previously performed user input, Based on a determination that the user input 136 corresponds to the previously performed user input, the workflow optimizer 164 may maintain or modify an order of the bot of the plurality of bots or the at least one human that is to be invoked to perform the at least one task to be performed by the deployed CoBot 110.

An unauthorized intents tracker 138 that is executed by the at least one hardware processor (e.g., the hardware processor 4202 of FIG. 42, and/or the hardware processor 4404 of FIG. 44) may analyze an output 140 of the bot of the plurality of bots or the at least one human that is invoked to perform the at least one task to be performed by the deployed CoBot 110. Further, the unauthorized intents tracker 138 may determine, based on an analysis of the output 140 of the bot of the plurality of bots or the at least one human, whether the output 140 represents an unauthorized intent.

A governance analyzer 162 that is executed by the at least one hardware processor (e.g., the hardware processor 4202 of FIG. 42, and/or the hardware processor 4404 of FIG. 44) may generate, based on a determination that the output 140 represents the unauthorized intent, an edge data bundle 142.

A data aggregator 144 that is executed by the at least one hardware processor (e.g., the hardware processor 4202 of FIG. 42, and/or the hardware processor 4404 of FIG. 44) may generate, based on the edge data bundle 142, a CoBot transparency graph 146 that tracks operations of the plurality of bots and the at least one human in the team.

A liability ledger analyzer 166 that is executed by the at least one hardware processor (e.g., the hardware processor 4202 of FIG. 42, and/or the hardware processor 4404 of FIG. 44) may determine, based on the CoBot transparency graph 146, whether the bot or the human that is developing the unauthorized intent is to be replaced or retrained.

A change manager 148 that is executed by the at least one hardware processor (e.g., the hardware processor 4202 of FIG. 42, and/or the hardware processor 4404 of FIG. 44) may determine whether a requirement associated with the bot or the human that is developing the unauthorized intent is changed. Further, based on a determination that the requirement associated with the bot or the human that is developing the unauthorized intent is changed, the change manager 148 may replace or retrain the bot or the human that is developing the unauthorized intent.

A fault tolerance analyzer 150 that is executed by the at least one hardware processor (e.g., the hardware processor 4202 of FIG. 42, and/or the hardware processor 4404 of FIG. 44) may determine whether a fault has occurred with respect to the bot or the human that is developing the unauthorized intent. Further, based on a determination that the fault has occurred with respect to the bot or the human that is developing the unauthorized intent, the fault tolerance analyzer 150 may replace or retrain the bot or the human that is developing the unauthorized intent.

A workload manager 152 that is executed by the at least one hardware processor (e.g., the hardware processor 4202 of FIG. 42, and/or the hardware processor 4404 of FIG. 44) may determine whether a workload associated with the bot or the human that is developing the unauthorized intent exceeds a specified workload. Further, based on a determination that the workload associated with the hot or the human that is developing the unauthorized intent exceeds the specified workload, the workload manager 152 may divide the workload amongst a plurality of bots or humans.

A compliance analyzer 154 that is executed by the at least one hardware processor (e.g., the hardware processor 4202 of FIG. 42, and/or the hardware processor 4404 of FIG. 44) may determine whether the bot or the human that is developing the unauthorized intent is in compliance with a policy associated with operation of the bot or the human. Further, based on a determination that the bot or the human that is developing the unauthorized intent is not in compliance with the policy associated with operation of the bot or the human, the compliance analyzer 154 may replace or retrain the bot or the human that is developing the unauthorized intent.

A health tracker 156 that is executed by the at least one hardware processor (e.g., the hardware processor 4202 of FIG. 42, and/or the hardware processor 4404 of FIG. 44) may monitor, based on an analysis of environment logs and network logs associated with the plurality of bots and the at least one human in the team 120 to determine an operational status of the plurality of bots and the at least one human in the team 120.

A workflow tracker 158 that is executed by the at least one hardware processor (e.g., the hardware processor 4202 of FIG. 42, and/or the hardware processor 4404 of FIG. 44) may track, based on the environment logs and network logs associated with the plurality of bots and the at least one human in the team, a status of the CoBot workflow 114.

An interoperability analyzer 160 that is executed by the at least one hardware processor (e.g., the hardware processor 4202 of FIG. 42, and/or the hardware processor 4404 of FIG. 44) may convert an output 140 of a bot of the plurality of bots in the team 120 for comprehension by another bot of the plurality of bots in the team 120.

Figure 2:
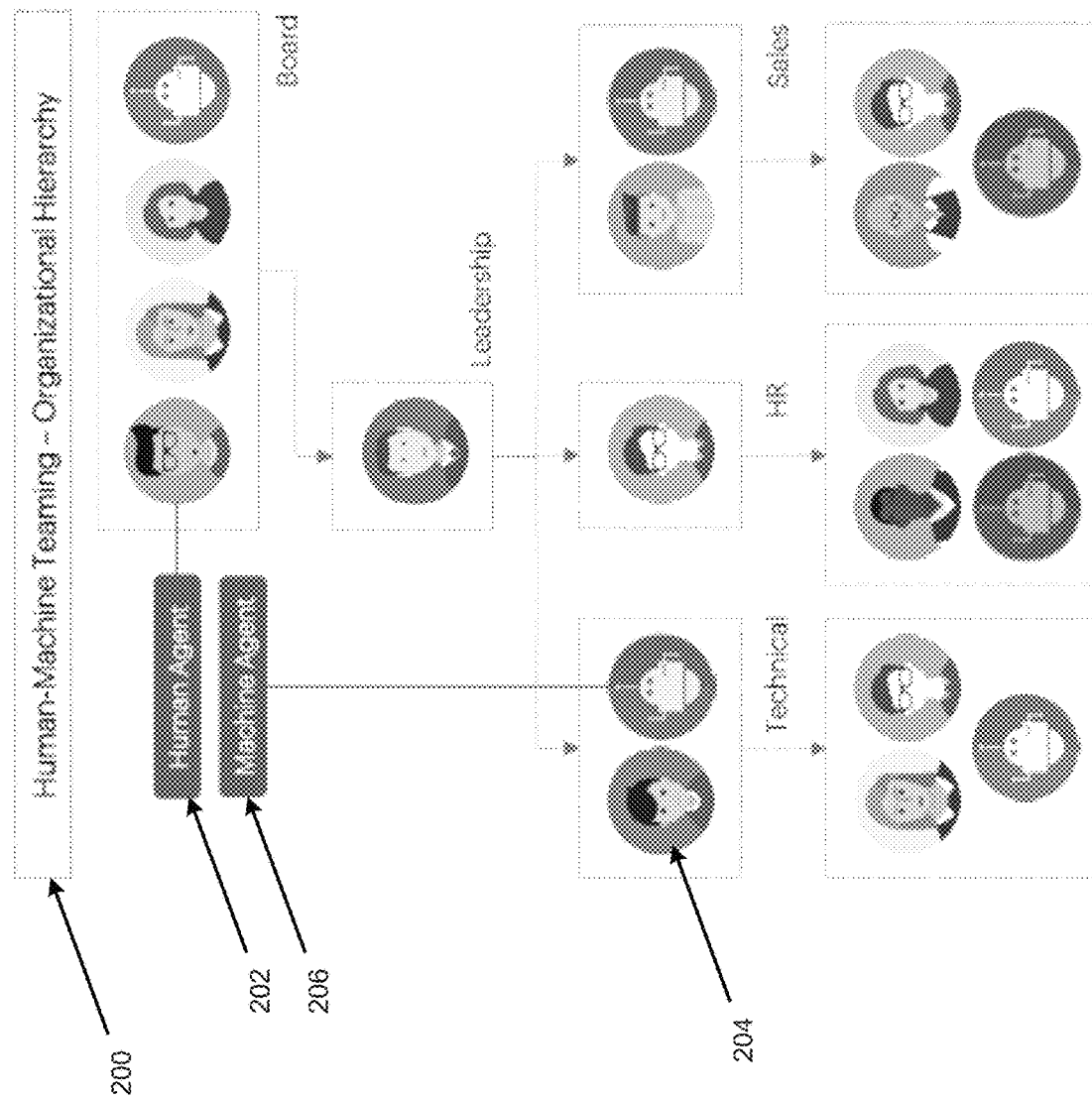
FIG. 2 illustrates a human-machine learning organizational hierarchy to illustrate operation of the software CoBot engineering, execution, and monitoring apparatus of FIG. 1 in accordance with an example of the present disclosure.

FIG. 2 illustrates a human-machine learning organizational hierarchy to illustrate operation of the apparatus 100 in accordance with an example of the present disclosure.

Referring to FIG. 2, the human-machine learning organizational hierarchy 200 may include, for example, a human agent 202 who may communicate with a human at 204 and a machine agent 206. The machine agent 206 may include, for example, the CoBot 110 as disclosed herein. In this regard, various activities such as technical activities, human resources activities, sales activities, etc., may be provided by humans and bots as shown in FIG. 2.

Figure 3:
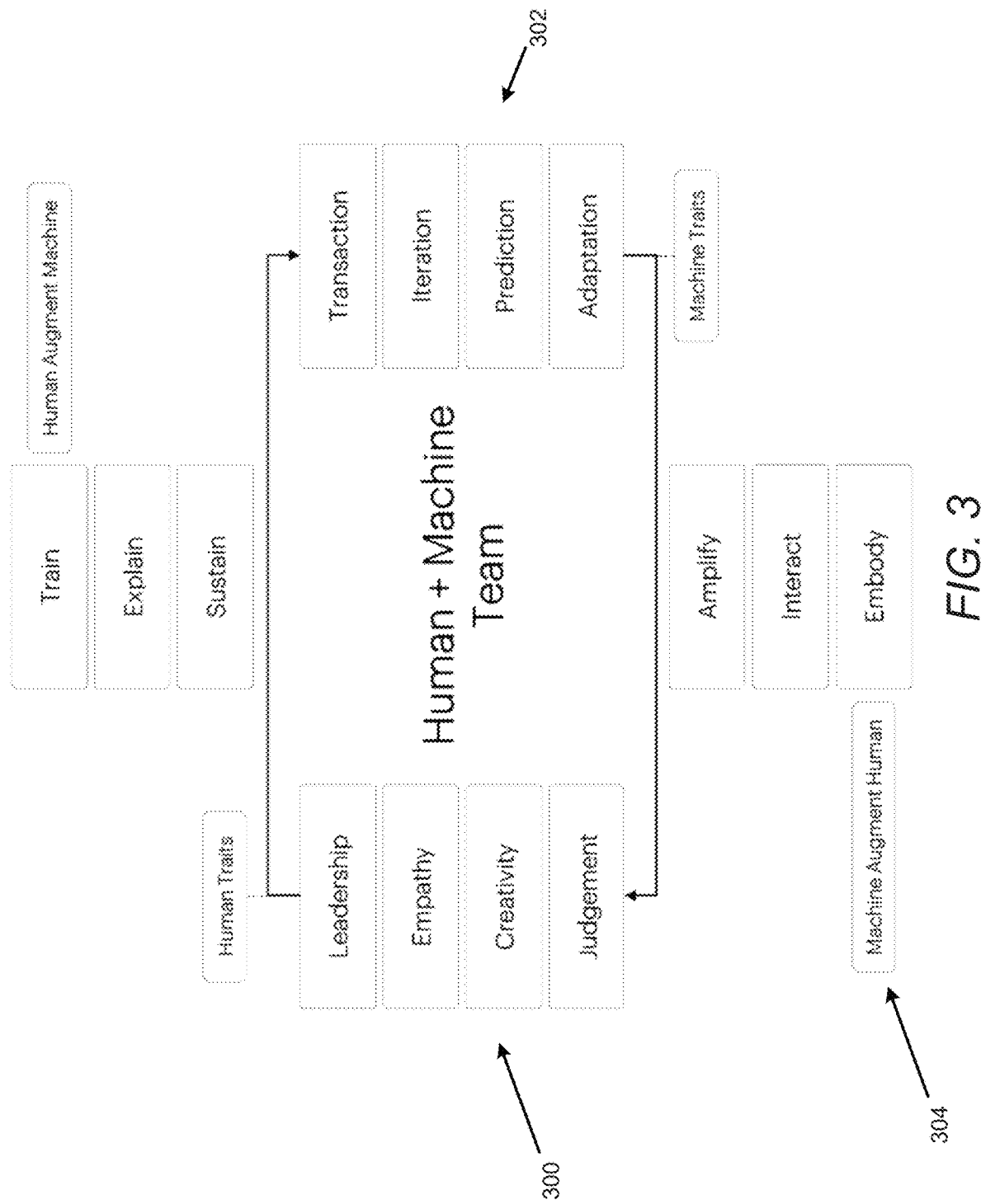
FIG. 3 illustrates details related to a human and machine team to illustrate operation of the software CoBot engineering, execution, and monitoring apparatus of FIG. 1 in accordance with an example of the present disclosure.

FIG. 3 illustrates details related to a human and machine team to illustrate operation of the apparatus 100 in accordance with an example of the present disclosure.

Referring to FIG. 3, a human and machine team may include human traits as shown at 300 and machine traits as shown at 302. The machine augmented human at 304 may include amplified traits.

Figure 4:
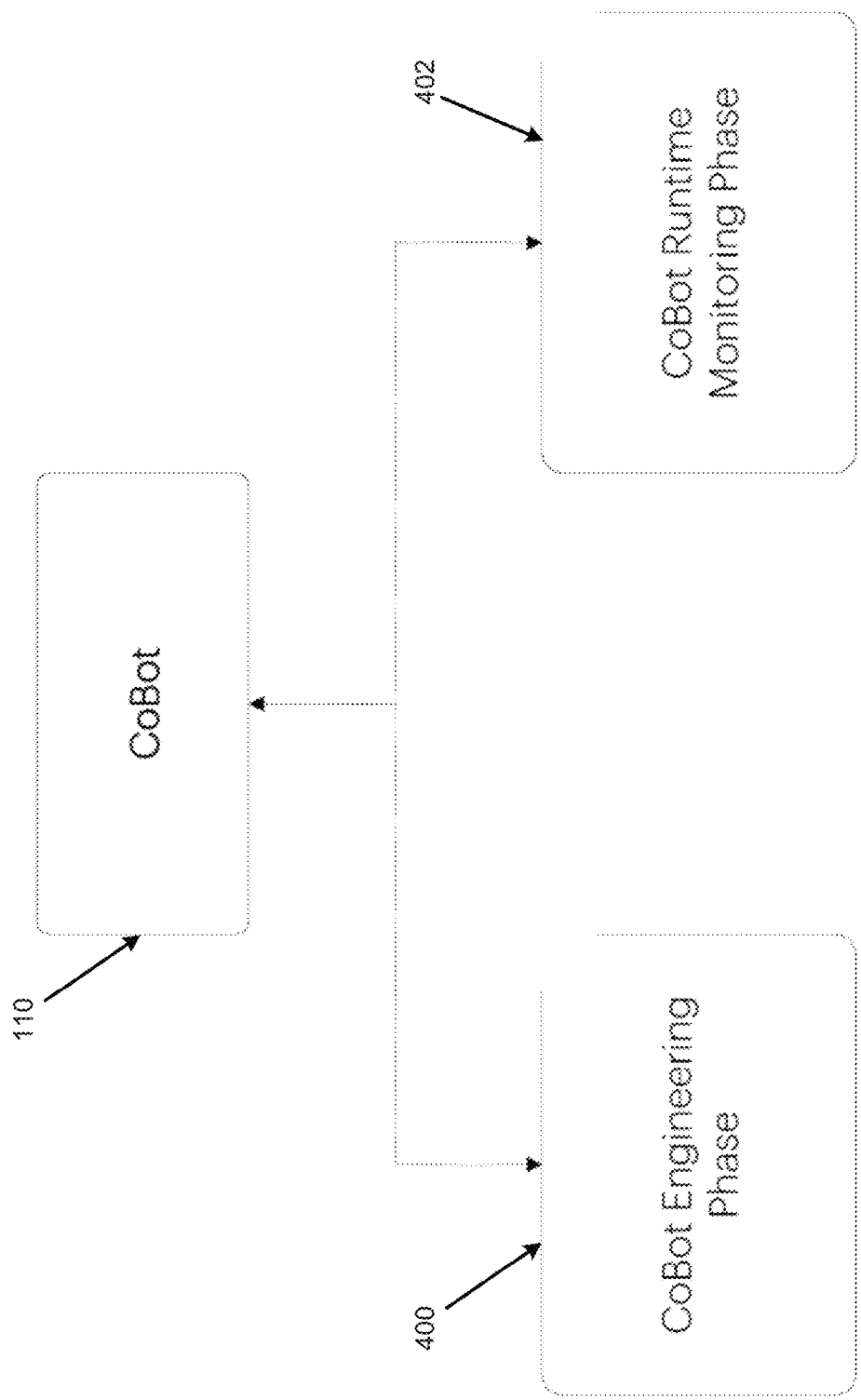
FIG. 4 illustrates engineering and runtime monitoring phases for a CoBot to illustrate operation of the software CoBot engineering, execution, and monitoring apparatus of FIG. 1 in accordance with an example of the present disclosure.

FIG. 4 illustrates engineering and runtime monitoring phases for a CoBot to illustrate operation of the apparatus 100 in accordance with an example of the present disclosure.

Referring to FIG. 4, a CoBot engineering phase at 400 may be represent a phase during which the CoBot 110 is developed and deployed. A CoBot runtime monitoring phase at 402 may be represent a phase during which operations of the CoBot 110 are monitored for transactions that are to be performed by the CoBot 110. Further, any changes that are to be implemented to the CoBot 110 (e.g., software updates, physical changes, etc.) may be performed during the CoBot runtime monitoring phase. For example, if a task performed by a CoBot is to be modified from an initially specified task (e.g., perform a credit check for a two year period), the CoBot runtime monitoring phase may be implemented to modify the task as needed (e.g., perform a credit check for a five year period).

Figure 5:
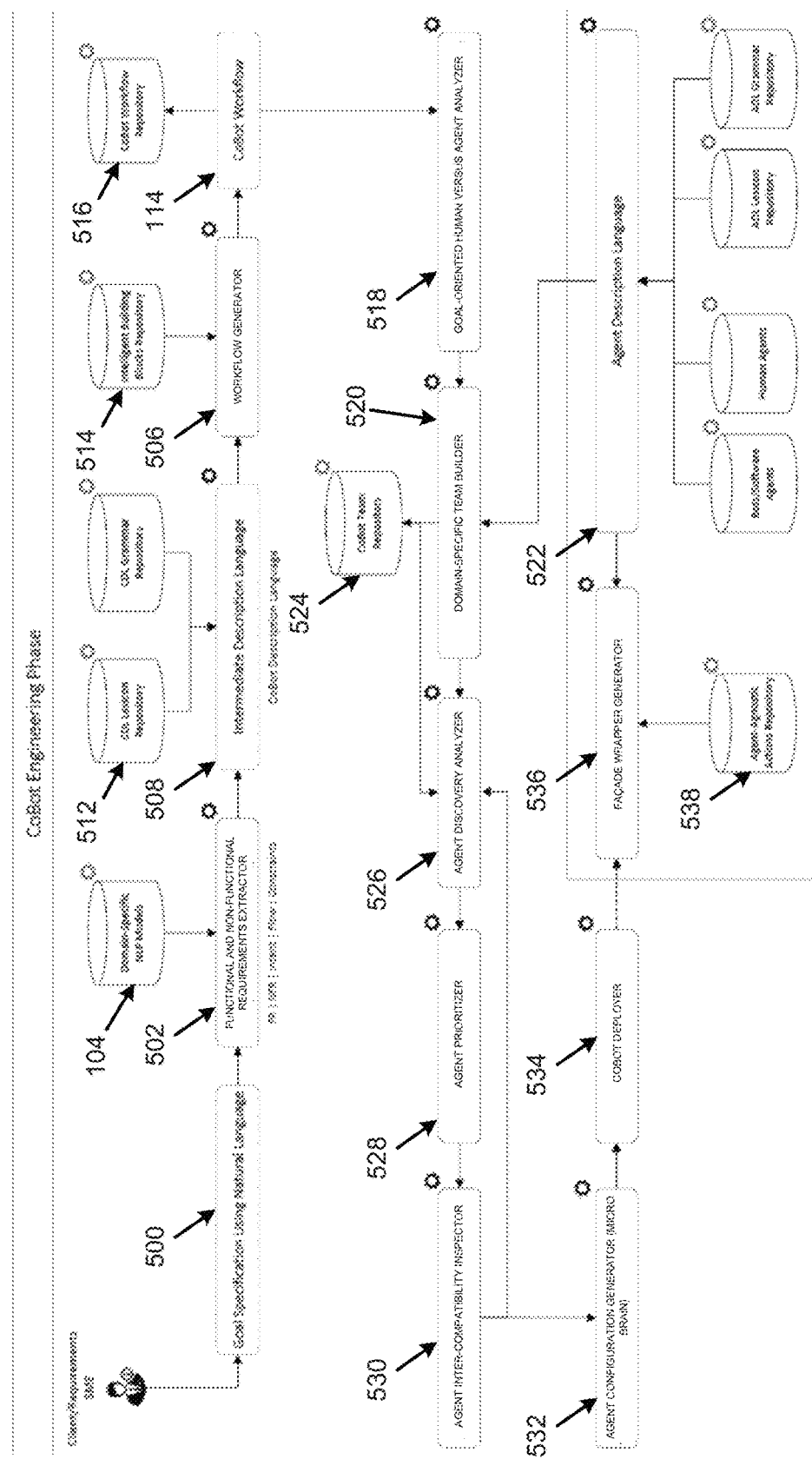
FIG. 5 illustrates a logical flow associated with a CoBot engineering phase to illustrate operation of the software CoBot engineering, execution, and monitoring apparatus of FIG. 1 in accordance with an example of the present disclosure.

FIG. 5 illustrates a logical flow associated with a CoBot engineering phase to illustrate operation of the apparatus 100 in accordance with an example of the present disclosure.

Referring to FIGS. 1 and 5, with respect to the CoBot engineering phase, at block 500, a user may specify a goal and other specifications for the CoBot 110 based on natural language processing being applied to a requirement specification 108.

In this regard, at block 502, the functional and non-functional requirements extractor 102 may extract, using domain-specific natural language processing models 104, functional requirements (e.g., what blocks need to be there in the pipeline for generating the CoBot 110), non-functional requirements (e.g., fora block, availability is a specified percentage, etc.), intent (e.g., what is a purpose of the CoBot 110), flow (e.g., flow from one block to another), constraints (e.g., constraints specified fora block), etc., for the CoBot 110.

Figure 8:
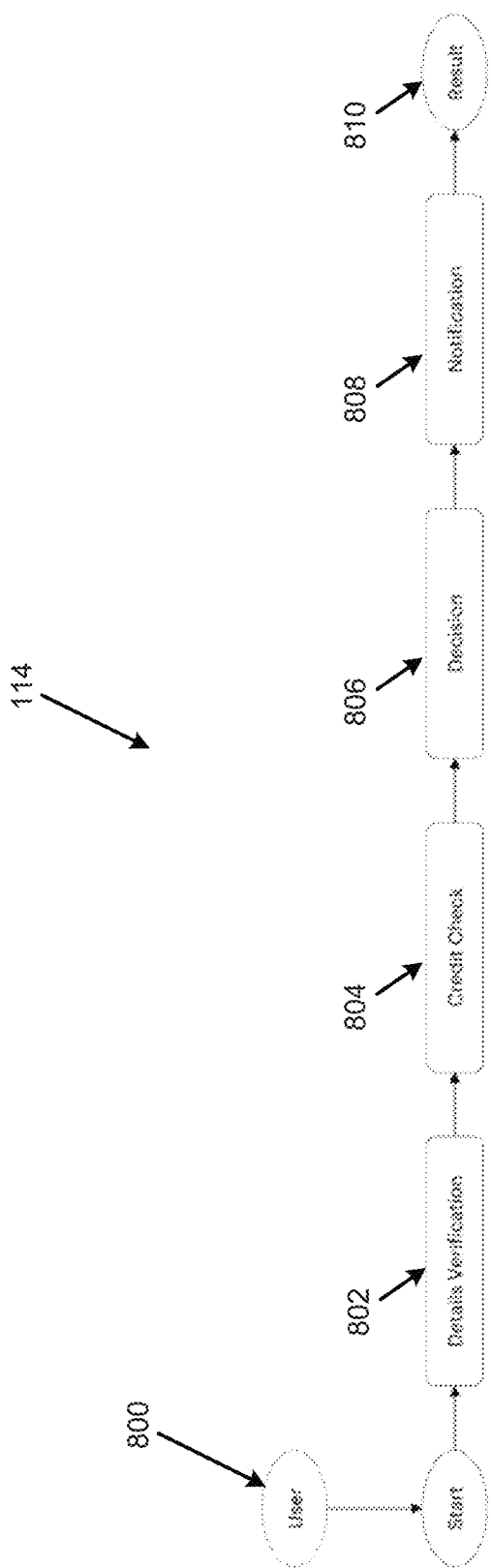
FIG. 8 illustrates an example of a loan processing CoBot to illustrate operation of the software CoBot engineering, execution, and monitoring apparatus of FIG. 1 in accordance with an example of the present disclosure.

At block 506, the workflow generator 112 may utilize an intermediate description language 508, such as a CoBot description language, to generate a CoBot workflow 114. The intermediate description language 508 may be obtained, for example, from CoBot description language repositories 512. The intermediate description language 508 may specify the functional and non-functional requirements in a specified language. The intermediate description language 508 may specify tasks that are to be performed by the CoBot 110. The workflow generator 112 may utilize an intelligent building blocks repository 514 to generate the CoBot workflow 114. The CoBot workflow 114 may be stored in a CoBot workflow repository 516. The CoBot workflow 114 may represent a visual layout of one or more tasks to be performed by the CoBot 110. An example of a CoBot workflow 114 is shown in FIG. 8.

At block 518, the CoBot workflow 114 may be analyzed by the goal-oriented human versus agent analyzer 116. In this regard, the goal-oriented human versus agent analyzer 116 may determine whether a block in the CoBot workflow 114 can be performed by a human or by a bot. For example, if a block is to perform a decision and an associated risk factor is high, the block may be specified to be performed by a human. Otherwise, if a block performs a repetitive task, a computational task, or a low risk factor task, such a block may be specified to be performed by a bot.

At block 520, the domain-specific team builder 118 may receive information in the form of agent description language from block 522. The agent description language at block 522 may be based on various sources such as bots/software agents repository, human agents repository, an agent description language (ADL) lexicon repository, and an ADL grammar repository. The bots/software agents repository may include information with respect to bots, and the human agents repository may include information with respect to human agents. The agent description language may specify (e.g., define) capabilities, availability rates, decision making rates, etc., with respect to agents (that may include human or software agents). The domain-specific team builder 118 at block 520 may store information in a CoBot team repository 524. The domain-specific team builder 118 at block 520 may build the team (e.g., human(s) and bots) to perform the tasks specified by the CoBot workflow 114. For the specified domain, the domain-specific team builder 118 at block 520 may identify humans and bots that may operate in the specified domain, and store the identified humans and bots in the CoBot team repository 524.

At block 526, the agent discovery analyzer 122 may receive information from the domain-specific team builder 118, and forward results of agent discovery analysis to the agent prioritizer 124 at block 528. For each block of the CoBot workflow 114, based on the humans and bots stored in the CoBot team repository 524, the agent discovery analyzer 122 may map the functional requirements and the non-functional requirements with respect to the description language of all of the bots. The agent prioritizer 124 may prioritize the bots based on the mapping of the functional requirements and the non-functional requirements to identify bots that are the best match with respect to the functional requirements and the non-functional requirements, versus bots that are the lowest matching. With respect to mapping for a high match versus a low match, assuming the non-functional requirements specify availability to be 100% and response time<5 seconds, in this case, a bot/human with availability of 95% may be prioritized more than another alternative human/bot, with availability of 85%. Availability may be described as a time period from an overall time duration that a bot/human is available. Similarly, response time may be described as a time needed for a bot/human to perform a specified task.

At block 530, results from the analysis performed by the agent prioritizer 124 may be analyzed by the agent inter-compatibility inspector 126. The agent inter-compatibility inspector 126 may analyze compatibility of a bot that has been identified to perform a specified block of the CoBot workflow 114 with another bot that has been identified to perform another specified block of the CoBot workflow 114. For example, an output of one bot may not be suitable to be sent or received by another bot. If two bots are identified as being non-compatible, the flow may revert to block 526 to select the next lower prioritized bot to ensure that bot that are to be utilized are compatible with each other. With respect to non-suitable output between bots, assuming that two adjacent bots are both web services, then these bots may be considered compatible with each other, as one bot's output may be modified to become another bot's input. The same may not be true if one bot is a web service and another bot is a conversation agent. In this scenario, the first case including two adjacent web service bots may be more prioritized than the second case of the web service and the conversation agent bots.

At block 532, results from the analysis performed by the agent inter-compatibility inspector 126 may be analyzed by the agent configuration generator 128. The agent configuration generator 128 may implement a micro brain as disclosed herein, where the "micro" may refer to configurations applied to each bot. The agent configuration generator 128 may provide for configuration of each bot. For example, a configuration may specify a time-interval (e.g., 5 minutes) for checking the health of each bot.

At block 534, based on the configurations applied by the agent configuration generator 128, the CoBot deployer 130 may deploy the CoBot 110 (or CoBots) in an operational environment.

At block 536, results from the analysis performed by the CoBot deployer 130 may be analyzed by the façade wrapper generator 132. In this regard, the façade wrapper generator 132 may receive information from an agent-agnostic action repository 538. The façade wrapper generator 132 may add a homogeneous wrapper that sits on top of each bot and human interface for connecting to each bot, checking its health (e.g., a chat bot is different from a robotic process automation (RPA) bot, which is different from an artificial intelligence (AI) bot, etc.). In this regard, the CoBot 110 may communicate with the façade wrapper generated by the façade wrapper generator 132 to thus allow the bots to operate in conjunction with each other. With respect to homogeneous wrapper that is applied to a bot, an example may include a REST API wrapper on top on conversation bot. The macro brain may pass context to the REST API wrapper, that in turn knows how to pass the same message to the conversation bot. The wrapper may include fixed commands that are applicable to all type of bots (e.g., START|SHUTDOWN|STATUS|LOG).

Figure 6:
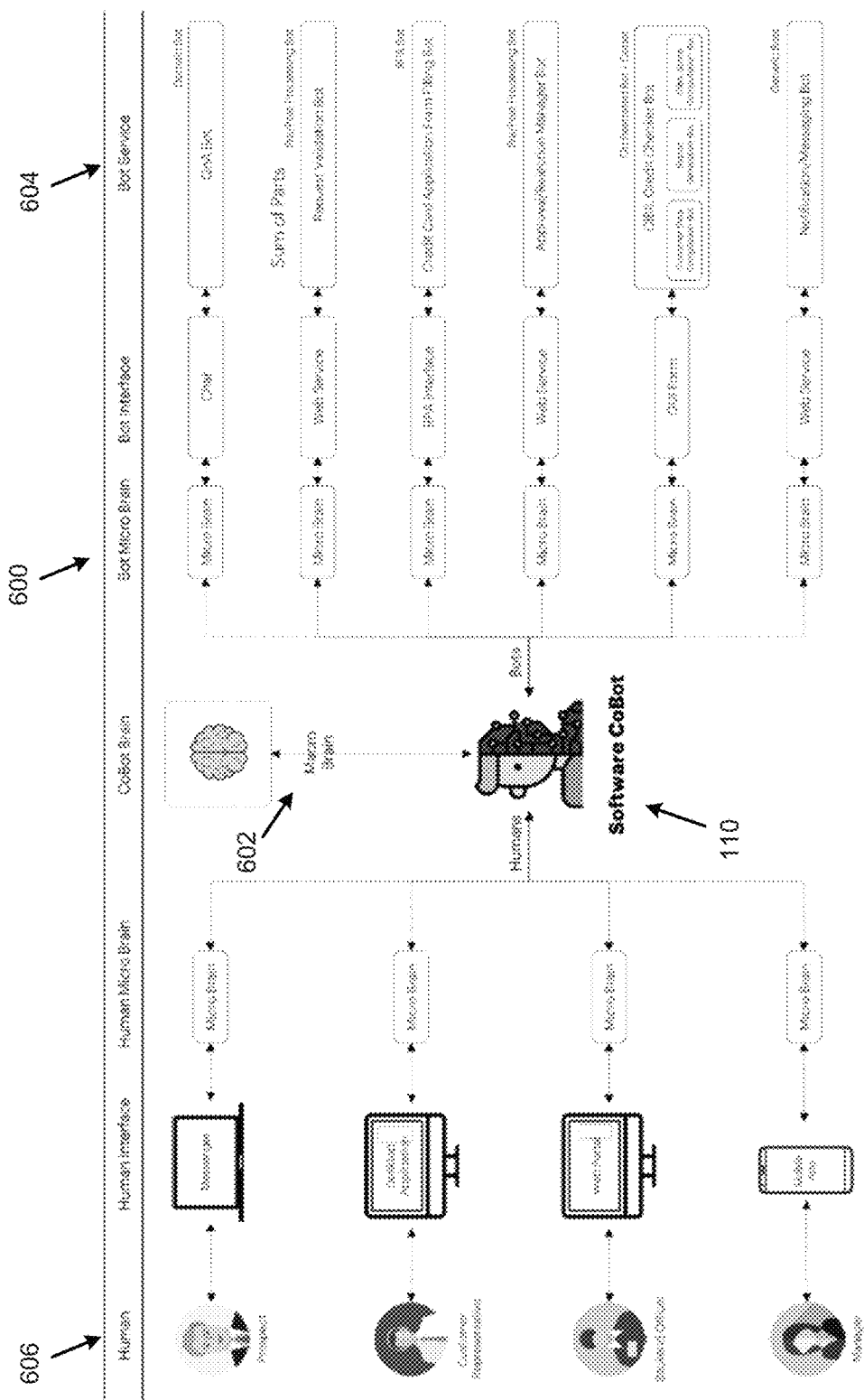
FIG. 6 illustrates details of a deployed software CoBot to illustrate operation of the software CoBot engineering, execution, and monitoring apparatus of FIG. 1 in accordance with an example of the present disclosure.

FIG. 6 illustrates details of a deployed software CoBot 110 to illustrate operation of the apparatus 100 in accordance with an example of the present disclosure.

Referring to FIG. 6, for the CoBot 110, a micro brain 600 (implemented by the agent configuration generator 128) may represent a computational unit on top of a bot interface and recite where a bot physically resides. The macro brain 602 (implemented by the agent configuration generator 128) may control the micro brains 600 with respect to aspects such as when to invoke a bot, when to send data to a bot, how to manipulate data being sent to a bot, how to analyze data being received from a bot, etc. For the bots specified at 604, each bot may be designed or configured to perform a specified task (e.g., a question and answer bot, a request validation bot, etc.). Similarly, for the humans specified at 606, each human may be proficient (or designated) to perform a task utilizing a specified device (e.g., a mobile application, a web portal, a desktop application, a messenger, etc.). If a human or a bot fails to perform a specified task, the macro brain 602 may replace or otherwise modify the human or bot as needed.

Figure 7:
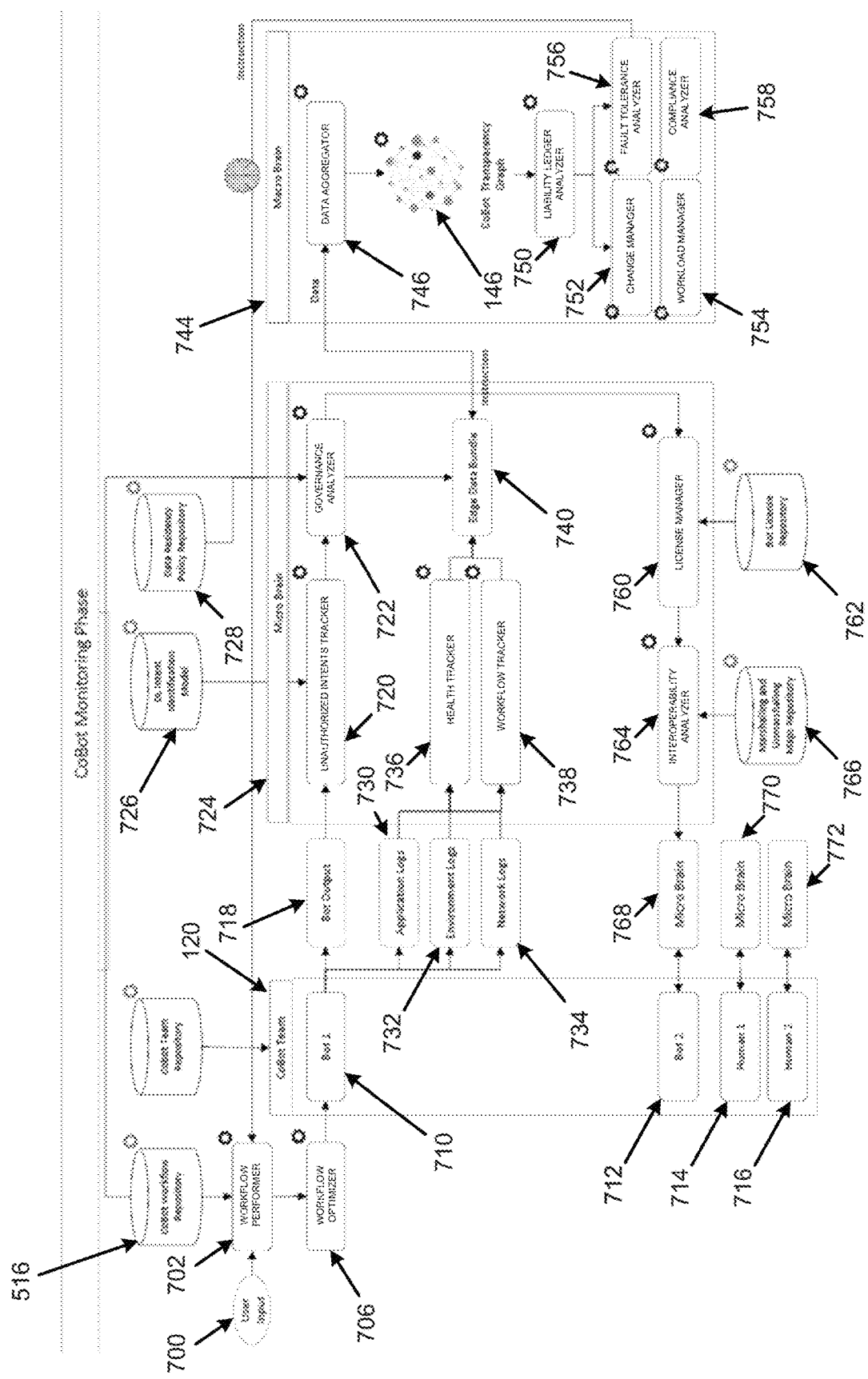
FIG. 7 illustrates a logical flow associated with a CoBot monitoring phase to illustrate operation of the software CoBot engineering, execution, and monitoring apparatus of FIG. 1 in accordance with an example of the present disclosure.

FIG. 7 illustrates a logical flow associated with a CoBot monitoring phase to illustrate operation of the apparatus 100 in accordance with an example of the present disclosure.

Referring to FIG. 7, at block 700, user input 136 may be received by a workflow performer 134 at 702. The workflow performer 134 may receive input from the CoBot workflow repository 516 and a fault tolerance analyzer 150 at 756. The workflow performer 134 may determine which bot (e.g., Bot-1, Bot-2, etc.) is to be utilized first to address the user input 136. With respect to determination of which bot is to be utilized first to address the user input 136, the workflow performer 134 may leverage the CoBot workflow repository 516 to determine which bot/human should receive the user input and begin the CoBot processing.

At 706, an output of the workflow performer 134 may feed into a workflow optimizer 164, The workflow optimizer 164 may analyze the user input 136 to determine whether the user input corresponds to a previously received user input. If the user input 136 corresponds to a previously received user input, the workflow optimizer 164 may utilize the CoBot team 120 utilized for the previously received user input.

The workflow optimizer 164 may communicate with the CoBot team 120, which may include bot-1 at 710, bot-2 at 712, human-1 at 714, and human-2 at 716. In this regard, bot-1 at 710 may pass the context to bot-2 at 712, bot-2 at 712 may pass the context to human-1 at 714, etc.

A bot output 140 at 718 may be forwarded to an unauthorized intents tracker 138 at 720. The bot output 140 at 718 may represent an output of a task performed by the bot with respect to the user input 136 at 700. The unauthorized intents tracker 138 at 720 may receive input from a description language intent identification model at 726, The unauthorized intents tracker 138 at 720 may receive the bot output 140 at 718 and determine whether the bot is developing an unauthorized intent, With respect to determination of unauthorized intent, assuming that a ChatBot that is required to converse with users regarding technical issues, over time, learns and develops an unauthorized intent (e.g., abusing the user upon asking a specific question), the output of the ChatBot may be passed through the unauthorized intents tracker 138 at 720 to determine if the ChatBot developed any malicious intent, and if yes, the ChatBot may need to be re-trained or replaced with another bot/human (e.g., in real-time). In this regard, a machine learning model may be leveraged to detect this malicious intent. For example, if the bot-1 at 710 is a chat bot that returns negative responses to a user, the negative responses may represent an unauthorized intent, and the bot-1 may be either removed and replaced, or retrained by the macro brain 744 via input from the governance analyzer 162 at 722.

An output of the unauthorized intents tracker 138 may be received by the governance analyzer 162 at 722. The governance analyzer 162 at 722 may receive input from a data residency policy repository 728, The governance analyzer 162 at 722 may create an edge data bundle at 740 (e.g., which data is to be sent to macro brain 744 versus to a bot). The bot output, health, logs and other information may be captured and saved into an edge data bundle at 740, Whenever, the macro brain requests this information, the information may be shared, otherwise the information may be logged on the micro brain side for edge processing (e.g., micro brain working).

At 724, a micro brain may control operation of the unauthorized intents tracker 138 and the governance analyzer 162.

Application logs 730, environment logs 732, and network logs 734 may be received by the health tracker 156 at 736, and the workflow tracker 158 at 738. In addition to the bot output at 718 generated by bot-1, bot-1 may also generate the application logs 730, the environment logs 732, and the network logs 734. The environment logs 732 and network logs 734 may be utilized to ascertain a health of a bot (e.g., bot load is too high, etc.). This information may also be combined in the edge data bundle 740 and forwarded to the macro brain 744 for processing.

Outputs of the health tracker 156 and the workflow tracker 158 may be received by the edge data bundle 740.

A macro brain at 744 may control operation of the data aggregator 144 at 746, and other components as shown. In this regard, the data aggregator 144 may generate a CoBot transparency graph 146, which may be received by the liability ledger analyzer 166 at 750. The CoBot transparency graph 146 may represent a knowledge graph that stores and correlates/links data from multiple bots/humans and is used for CoBot auditing (hence, transparency) and analytics. The CoBot transparency graph 146 may represent a knowledge graph that tracks all of the bots and humans in a CoBot pipeline. With respect to the liability ledger analyzer 166 at 750, assuming that a bot makes a decision (e.g., approves a credit card for a user that later defaults on the credit card), the liability ledger analyzer 166 at 750 may determine which bot (or human) is liable for that decision. In this regard, the liability ledger analyzer 166 at 750 may determine whether that bot (or human) is to be replaced with another bot (or human), or is to be retrained.

An output of the liability ledger analyzer 166 may be fed to the change manager 148 at 752, the fault tolerance analyzer 150 at 756, the workload manager 152 at 754, and the compliance analyzer 154 at 758. With respect to the change manager 148 at 752, if a requirement has been changed, the change manager 148 at 752 may replace or retrain a bot (or human) to address the requirement change. An example of a requirement change that requires repair/replacement may include if the risk factor for a particular block in the workflow changes, then the bot/humans may need to be replaced accordingly. The fault tolerance analyzer 150 at 756 may determine how to replace a bot that has gone down (or otherwise malfunctioned) by another bot or human. The workload manager 152 at 754 may divide a workload of an overloaded bot amongst multiple bots. The compliance analyzer 154 at 758 may ensure that bots are abiding with known laws and policies related to operation of bots.

Referring next to block 760, a license manager that is executed by at least one hardware processor (e.g., the hardware processor 4202 of FIG. 42, and/or the hardware processor 4404 of FIG. 44) may receive input from the governance analyzer 162, and from a bot license repository 762. In this regard, if the governance analyzer 162 determines that data from bot-1 is to be passed to bot-2, the data may be passed through the license manager at 760. The license manager at 760 may control operation of a bot by ensuring that a particular instance of a bot is operating at an authorized time. In this regard, the license manager at 760 may determine whether a maximum number of instances of a bot have been reached, and if so, no further data will be sent to that bot.

At block 764, an interoperability analyzer 160 may receive input from the license manager and a marshalling and unmarshalling maps repository 766. The interoperability analyzer 160 may convert an output of a bot (e.g., bot-1) for understandability by another bot (e.g., bot-2). The conversion may be performed using a façade wrapper that represents an intelligent entity which uses rule-based mechanics to convert the output of one bot to be used as an input for another bot. For example, an output of a Chabot is in text format. The important intent from the output may be extracted and used as an input for a subsequent web service bot call. For example, if bot-1 is a chat bot and bot-2 is a robotic process automation (RPA) bot, then the output of bot-1 may be modified for understandability by bot-2.

Output of the interoperability analyzer 160 may be received by a micro brain 768 associated with bot-2 at 712. Further, micro brains 770 and 772 may specify operations of human-1 at 714, and human-2 at 716.

FIG. 8 illustrates an example of a loan processing CoBot to illustrate operation of the apparatus 100 in accordance with an example of the present disclosure.

Referring to FIG. 8, an example of a CoBot workflow 114 for the loan processing CoBot 110 is shown and includes a user 800 for which the CoBot 110 performs verification of details (e.g., name, address, social security number, etc.) at 802 with respect to the user 800. At 804, the CoBot 110 may perform a credit check with respect to the user 800. At 806, the CoBot 110 may generate a decision (e.g., approved, denied, or further information needed) based on performance of the credit check at 804. At 808, the CoBot 110 may generate a notification as to the decision at block 806, with the results being output (e.g., displayed or otherwise forwarded) at block 810.

Figure 9:
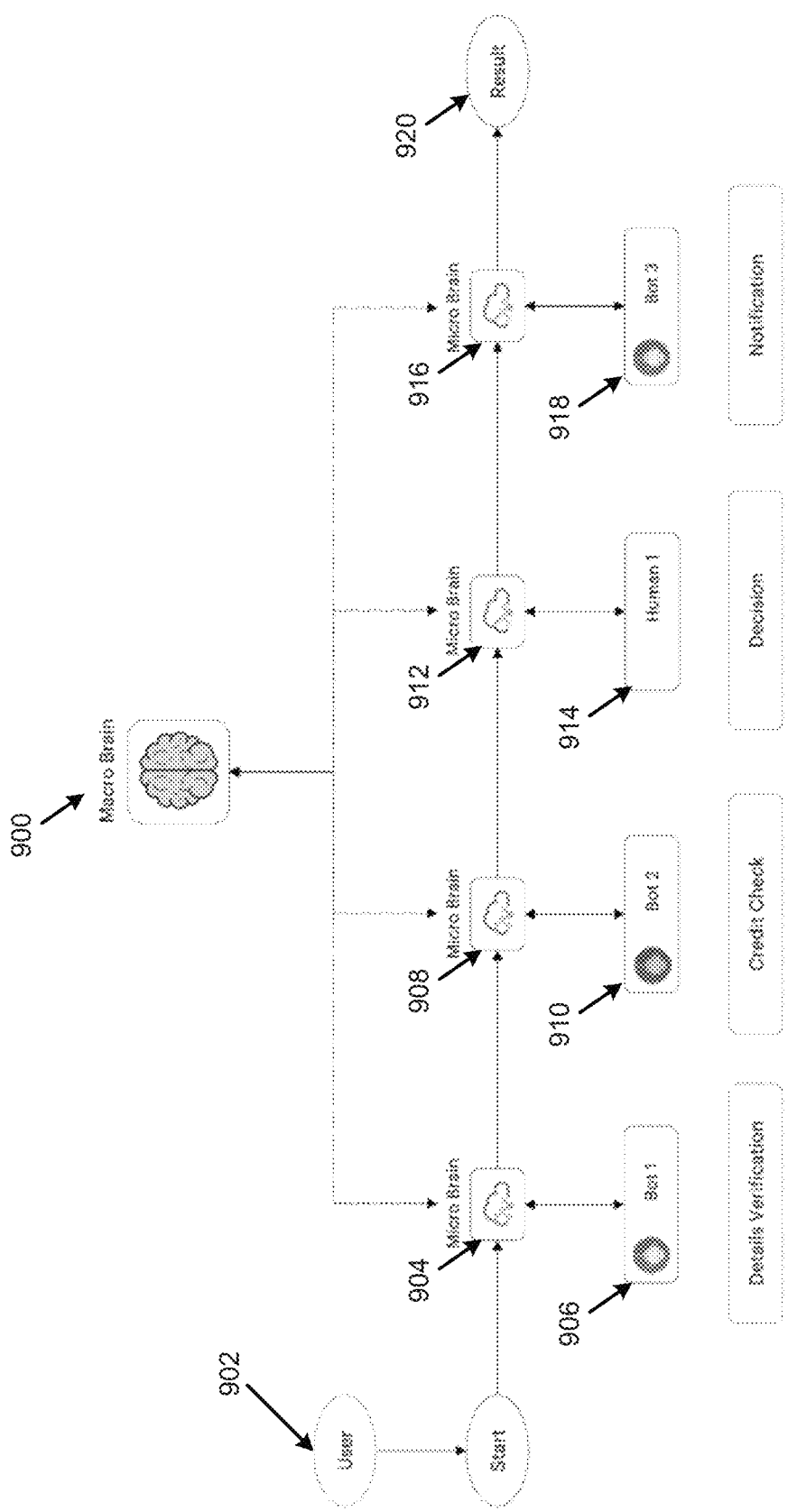
FIG. 9 illustrates further details of the loan processing CoBot of FIG. 8 to illustrate operation of the software CoBot engineering, execution, and monitoring apparatus of FIG. 1 in accordance with an example of the present disclosure.

FIG. 9 illustrates further details of the loan processing CoBot of FIG. 8 to illustrate operation of the apparatus 100 in accordance with an example of the present disclosure.

Referring to FIG. 9, a macro brain 900 (e.g., similar to macro brain 744) may perform an aggregated analysis to analyze, monitor, and/or control operation of all of the bots, whereas the micro brains 904, 908, 912, and 916 may perform a local analysis to respectively analyze, monitor, and/or control operation of bot-1 at 906, bot-2 at 910, human-1 at 914, and bot-3 at 918. For a user input received by a user 902, results of operations performed by the bot-1 at 906, bot-2 at 910, human-1 at 914, and bot-3 at 918 may be output as result 920.

Figure 10:
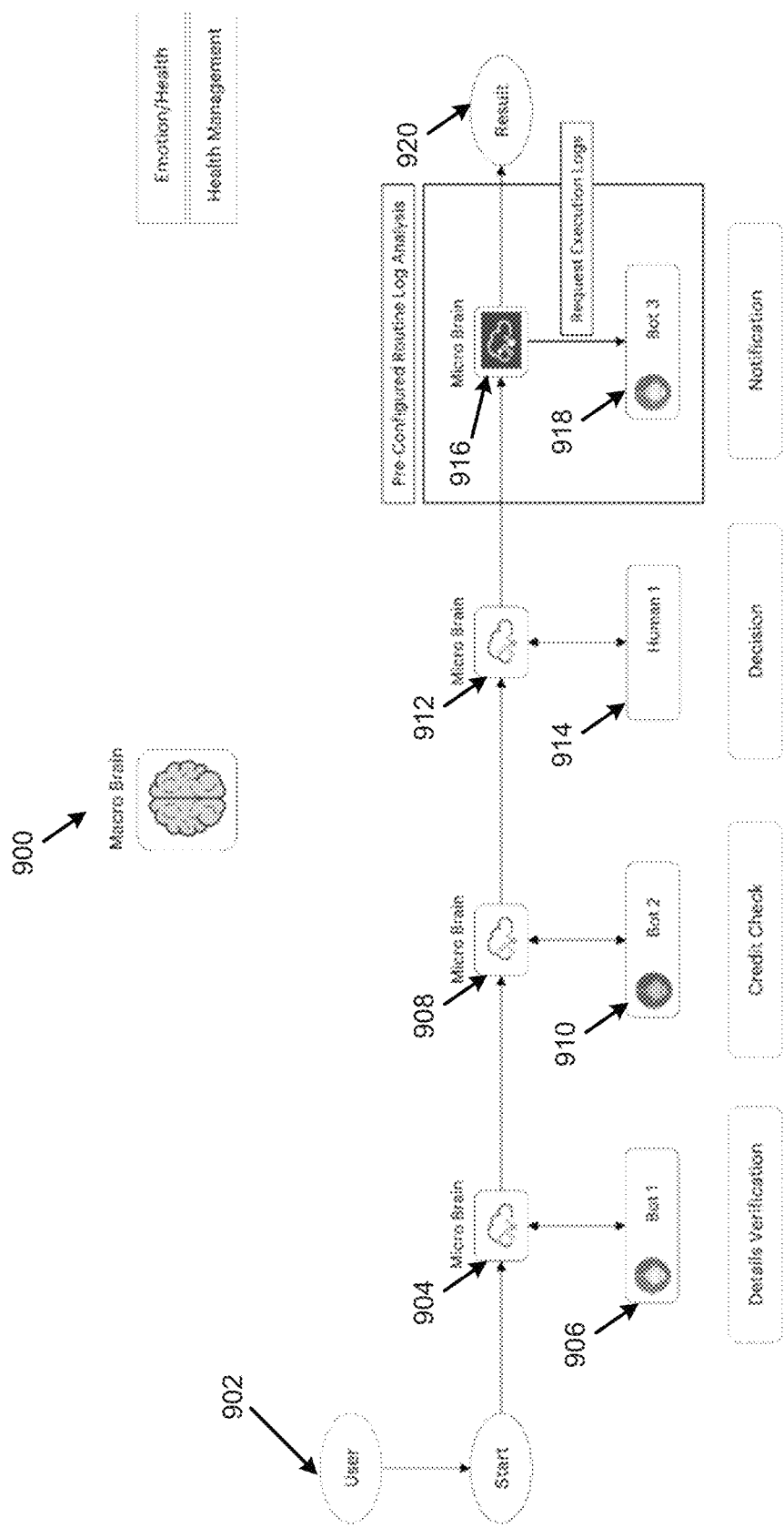
FIG. 10 illustrates pre-configured routine log analysis for the loan processing CoBot of FIG. 8 to illustrate operation of the software CoBot engineering, execution, and monitoring apparatus of FIG. 1 in accordance with an example of the present disclosure.
Figure 11:
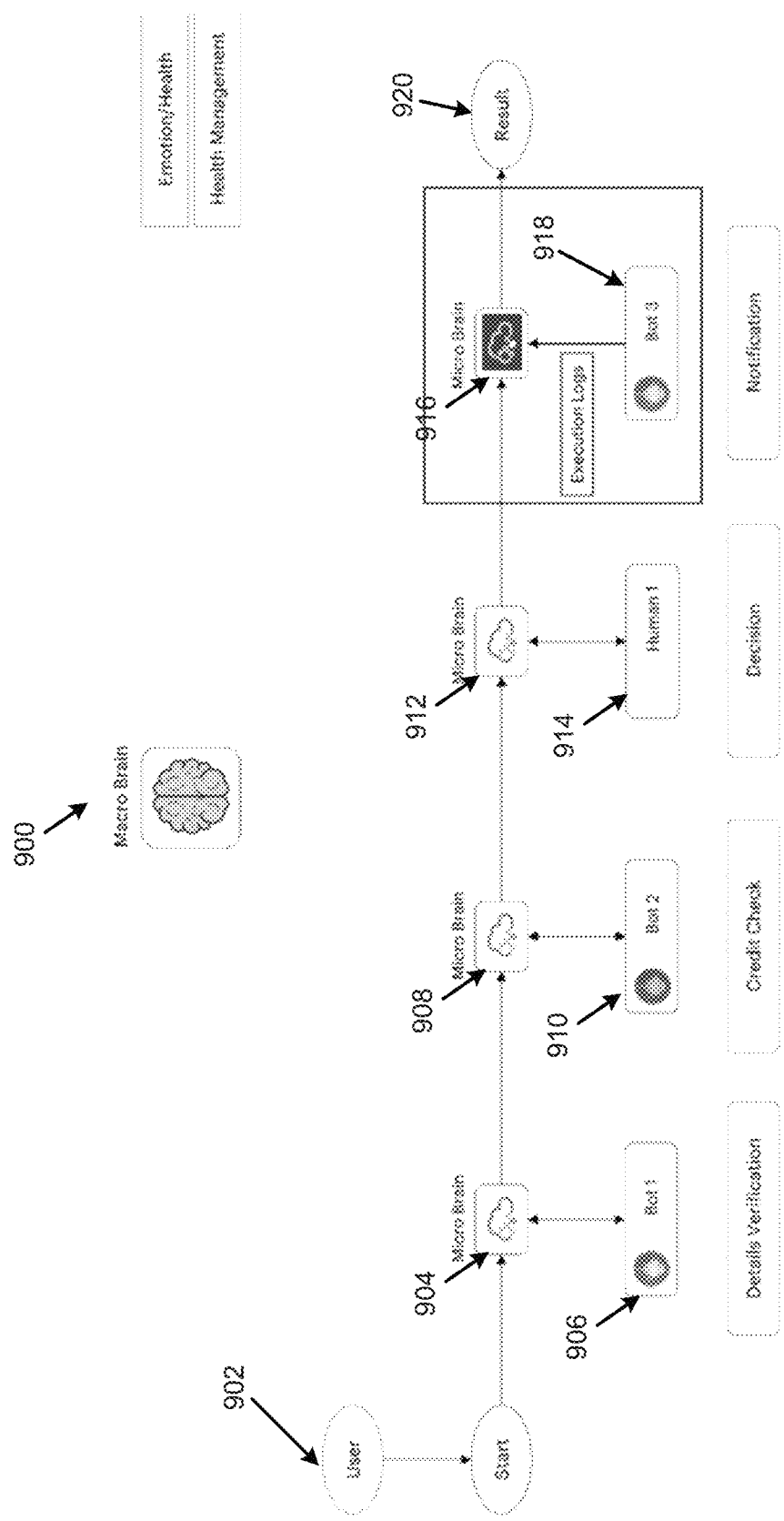
FIG. 11 illustrates execution logs for the loan processing CoBot of FIG. 8 to illustrate operation of the software CoBot engineering, execution, and monitoring apparatus of FIG. 1 in accordance with an example of the present disclosure.
Figure 12:
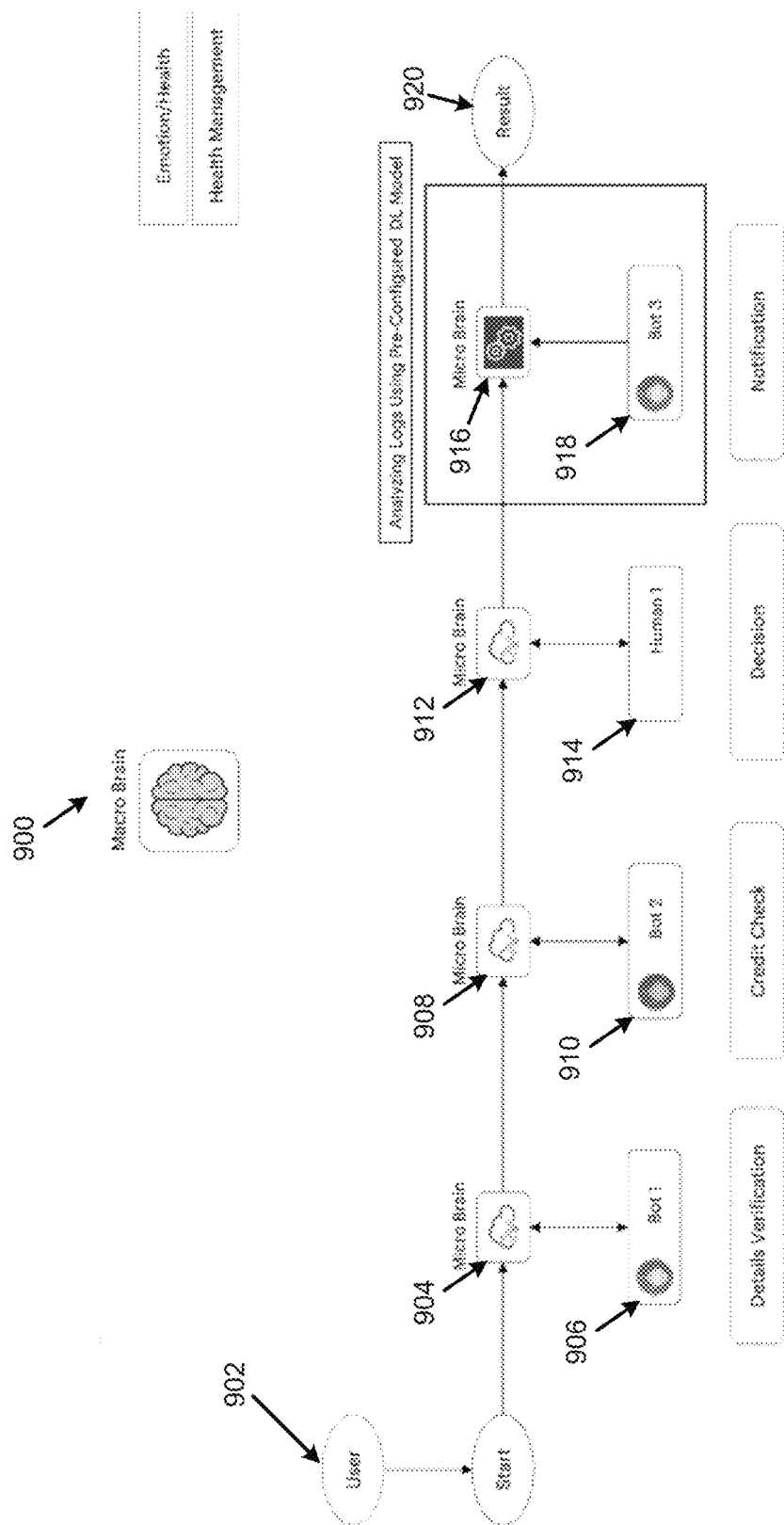
FIG. 12 illustrates log analysis using pre-configured deep learning model for the loan processing CoBot of FIG. 8 to illustrate operation of the software CoBot engineering, execution, and monitoring apparatus of FIG. 1 in accordance with an example of the present disclosure.
Figure 13:
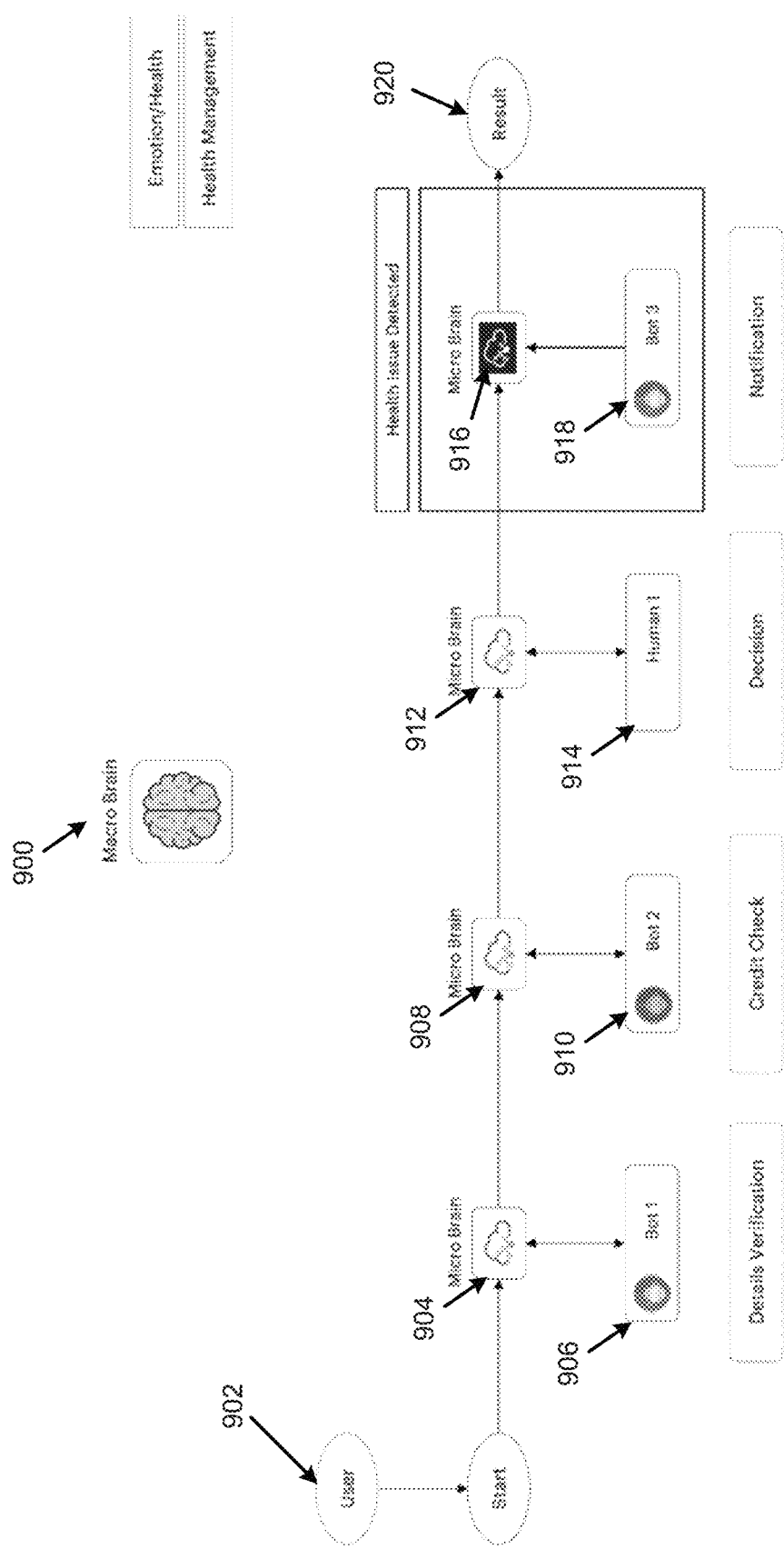
FIG. 13 illustrates detection of a health issue for the loan processing CoBot of FIG. 8 to illustrate operation of the software CoBot engineering, execution, and monitoring apparatus of FIG. 1 in accordance with an example of the present disclosure.
Figure 14:
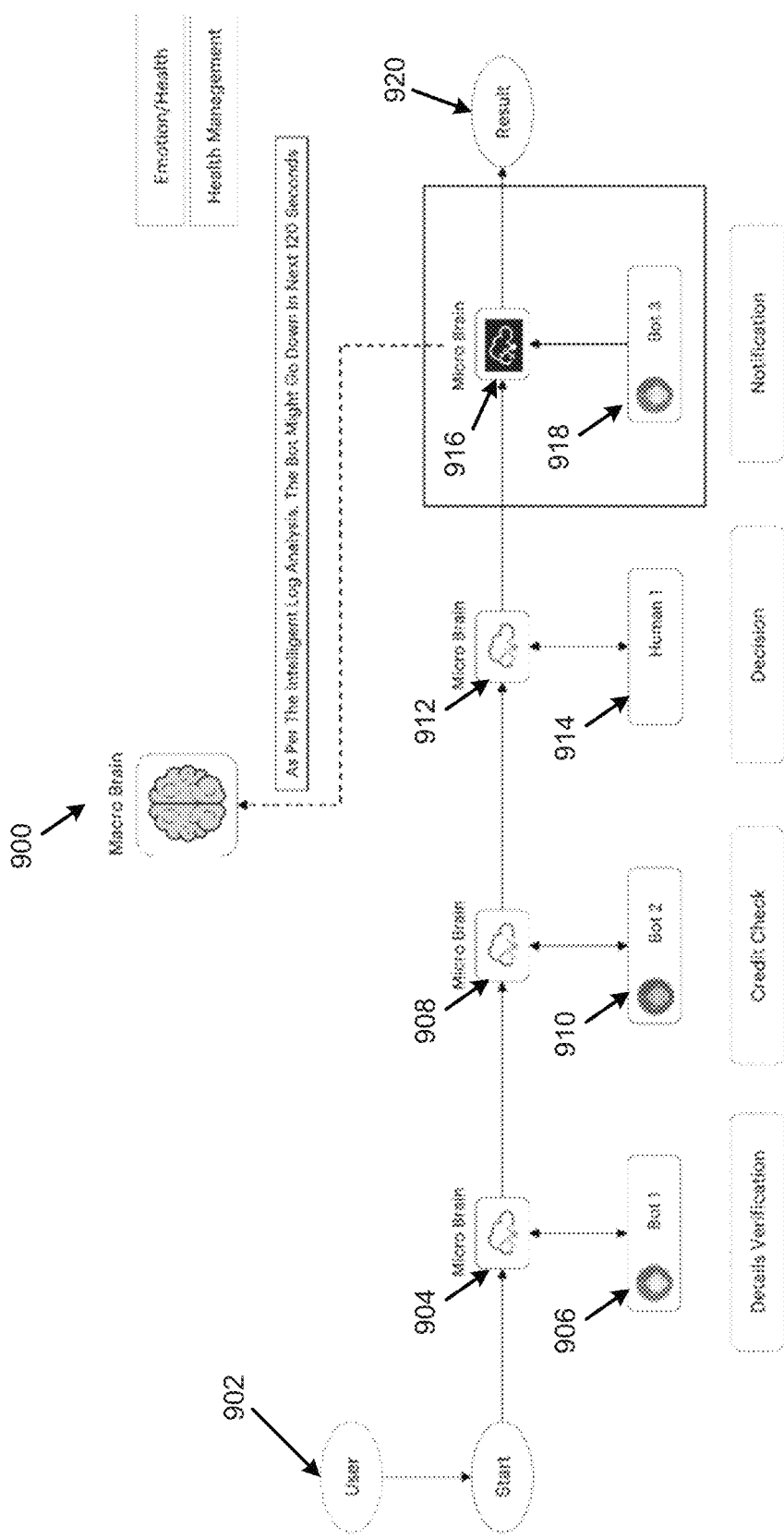
FIG. 14 illustrates an indication of a CoBot status change for the loan processing CoBot of FIG. 8 to illustrate operation of the software CoBot engineering, execution, and monitoring apparatus of FIG. 1 in accordance with an example of the present disclosure.

Assuming that micro brain 916 is to perform a health analysis on bot-3 at 918, as shown in FIG. 10, the micro brain 916 may request execution logs from bot-3 at 918. Upon receipt, as shown in FIGS. 11 and 12, the micro brain 916 may utilize the deep learning model to perform log analysis of the execution logs for bot-3 at 918, resulting in detection, as shown in FIG. 13, of a potential health issue that may result in shut-down of bot-3 within a specified time (e.g., 120 seconds as shown in FIG. 14).

Figure 15:
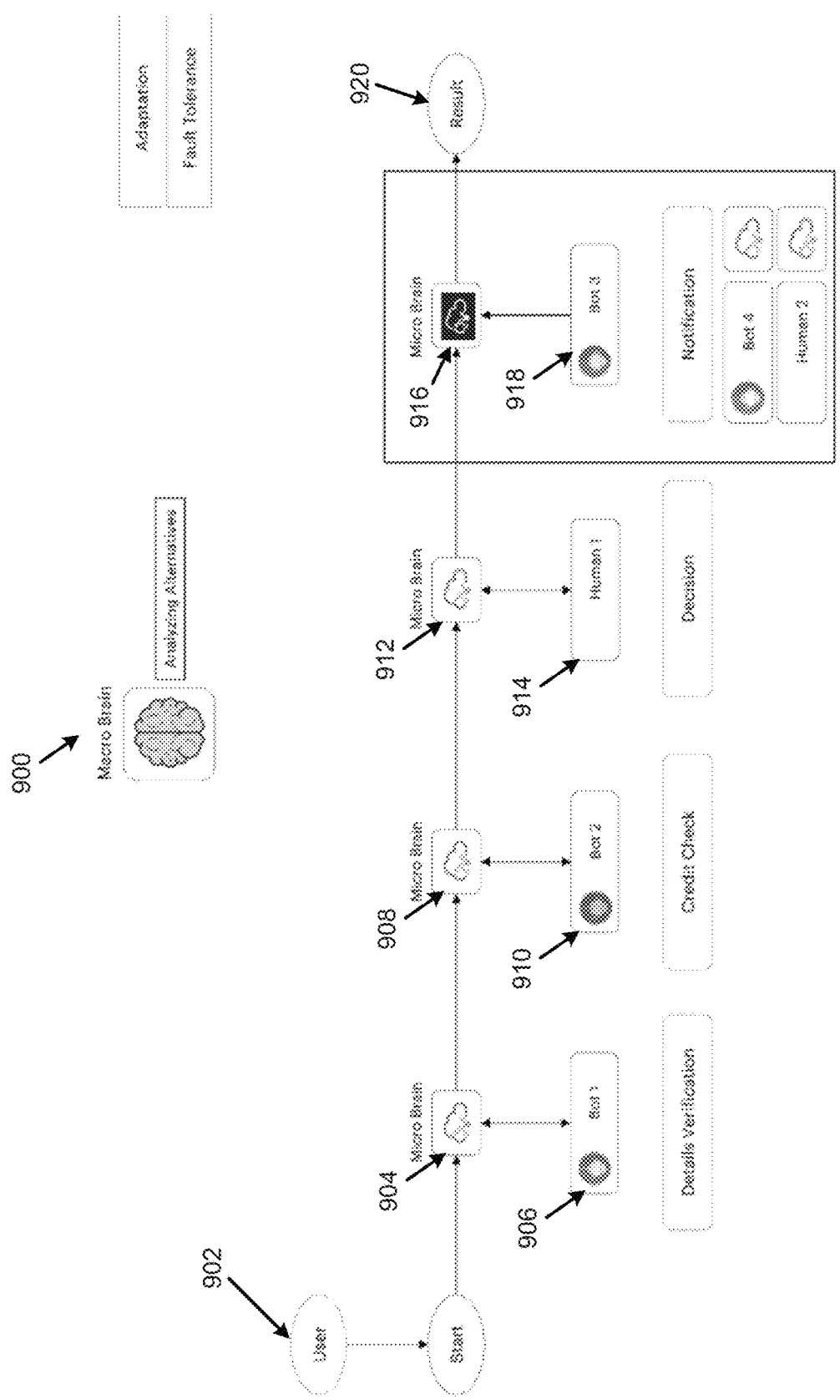
FIG. 15 illustrates analysis of alternatives for the loan processing CoBot of FIG. 8 to illustrate operation of the software CoBot engineering, execution, and monitoring apparatus of FIG. 1 in accordance with an example of the present disclosure.

Referring to FIG. 15, the macro brain 900 may perform an analysis on the potential health issue to determine alternatives.

Figure 16:
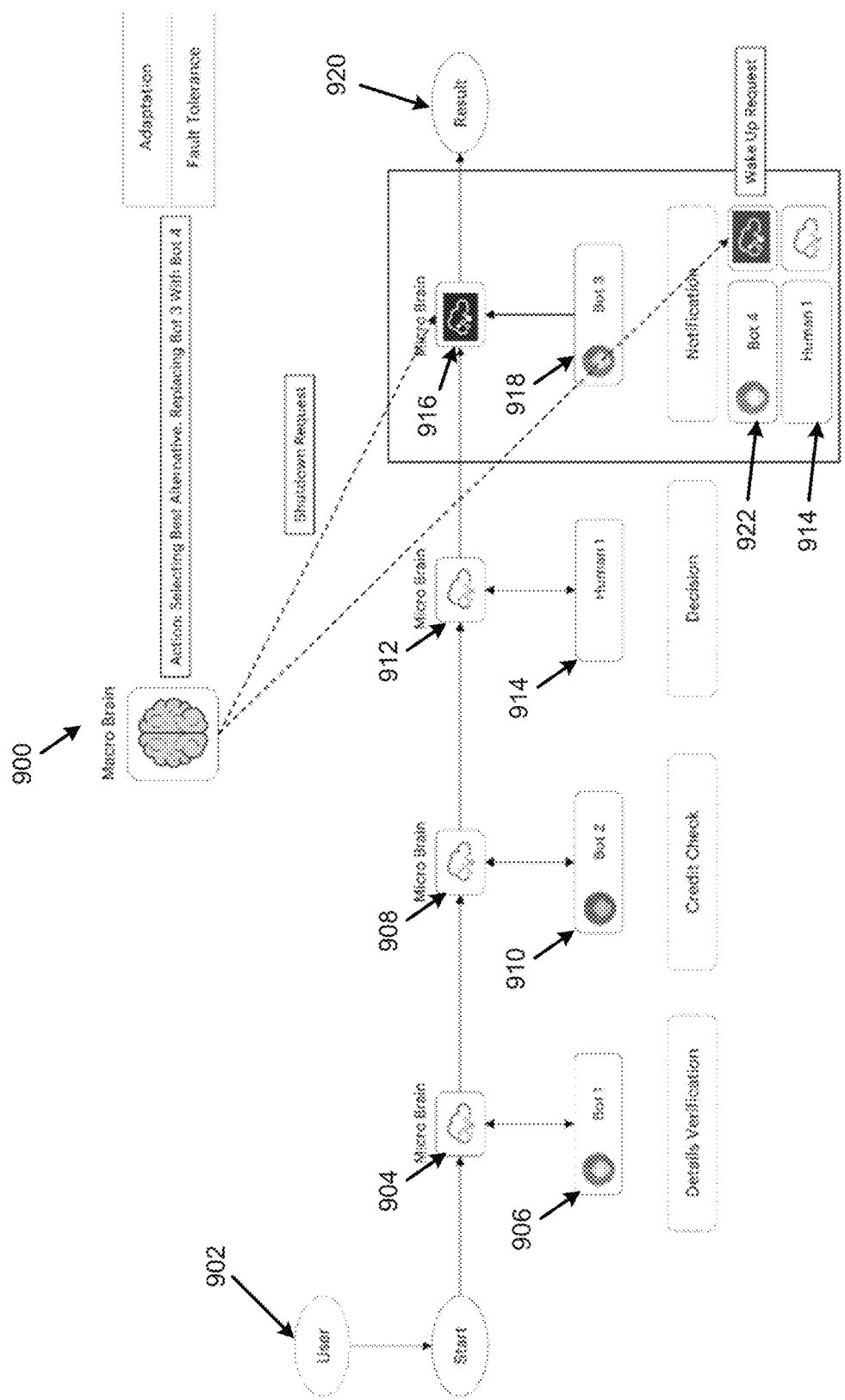
FIG. 16 illustrates selection of an alternative for the loan processing CoBot of FIG. 8 to illustrate operation of the software CoBot engineering, execution, and monitoring apparatus of FIG. 1 in accordance with an example of the present disclosure.

Referring to FIG. 16, the macro brain 900 may recommend performance of a shutdown of bot-3 at 916, and replacement of bot-3 with a bot-4 at 922 or human-1 at 914. In this example, bot-4 at 922 may be selected to replace bot-3.

Figure 17:
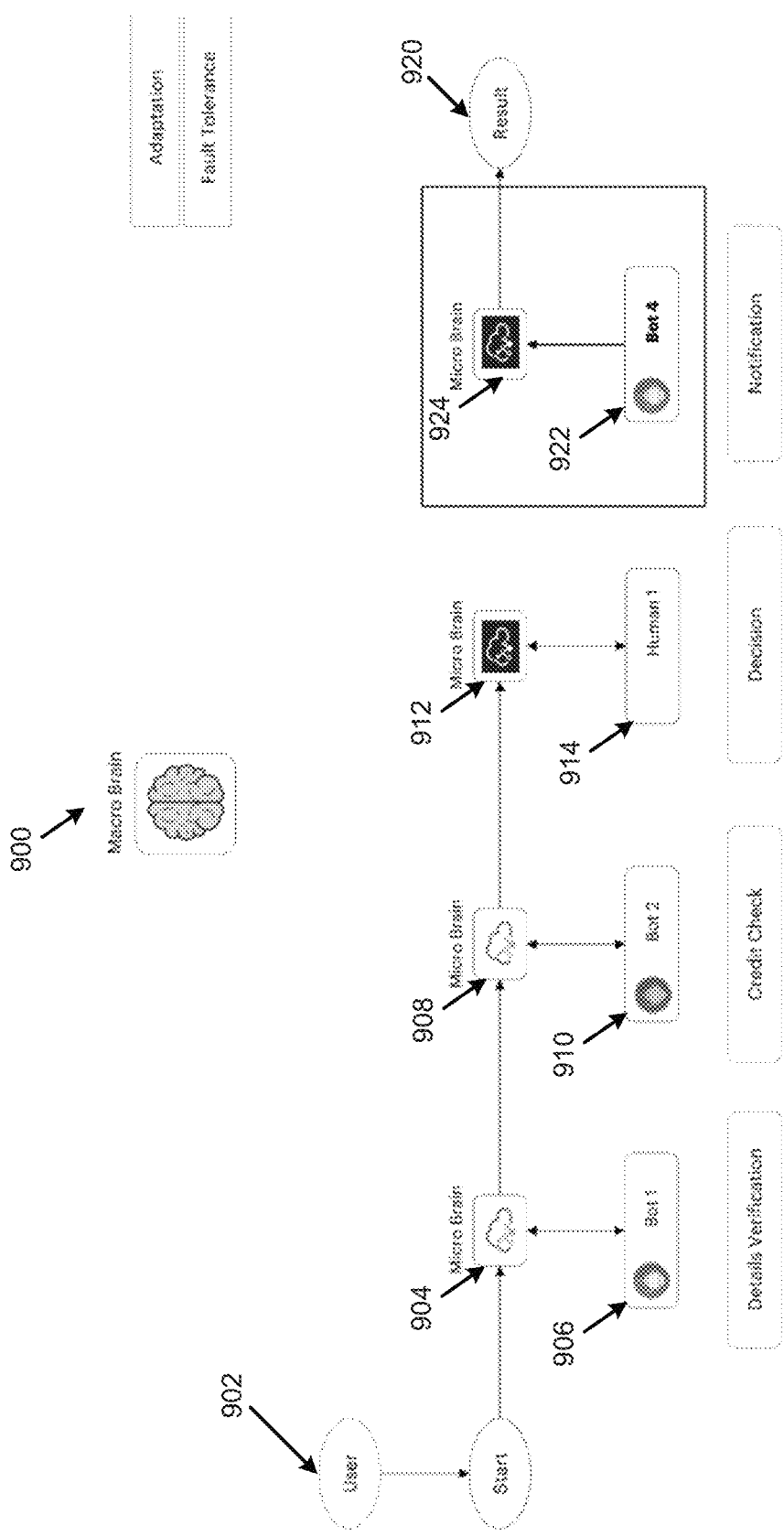
FIG. 17 illustrates analysis by a different micro brain for the loan processing CoBot of FIG. 8 to illustrate operation of the software CoBot engineering, execution, and monitoring apparatus of FIG. 1 in accordance with an example of the present disclosure.

Referring to FIG. 17, with bot-3 replaced by bot-4 at 922, the micro brain 912 for human-1 at 914, which was originally communicating with micro brain 916 for bot-3, may no longer include a communication link with micro brain 924 for bot-4.

Figure 18:
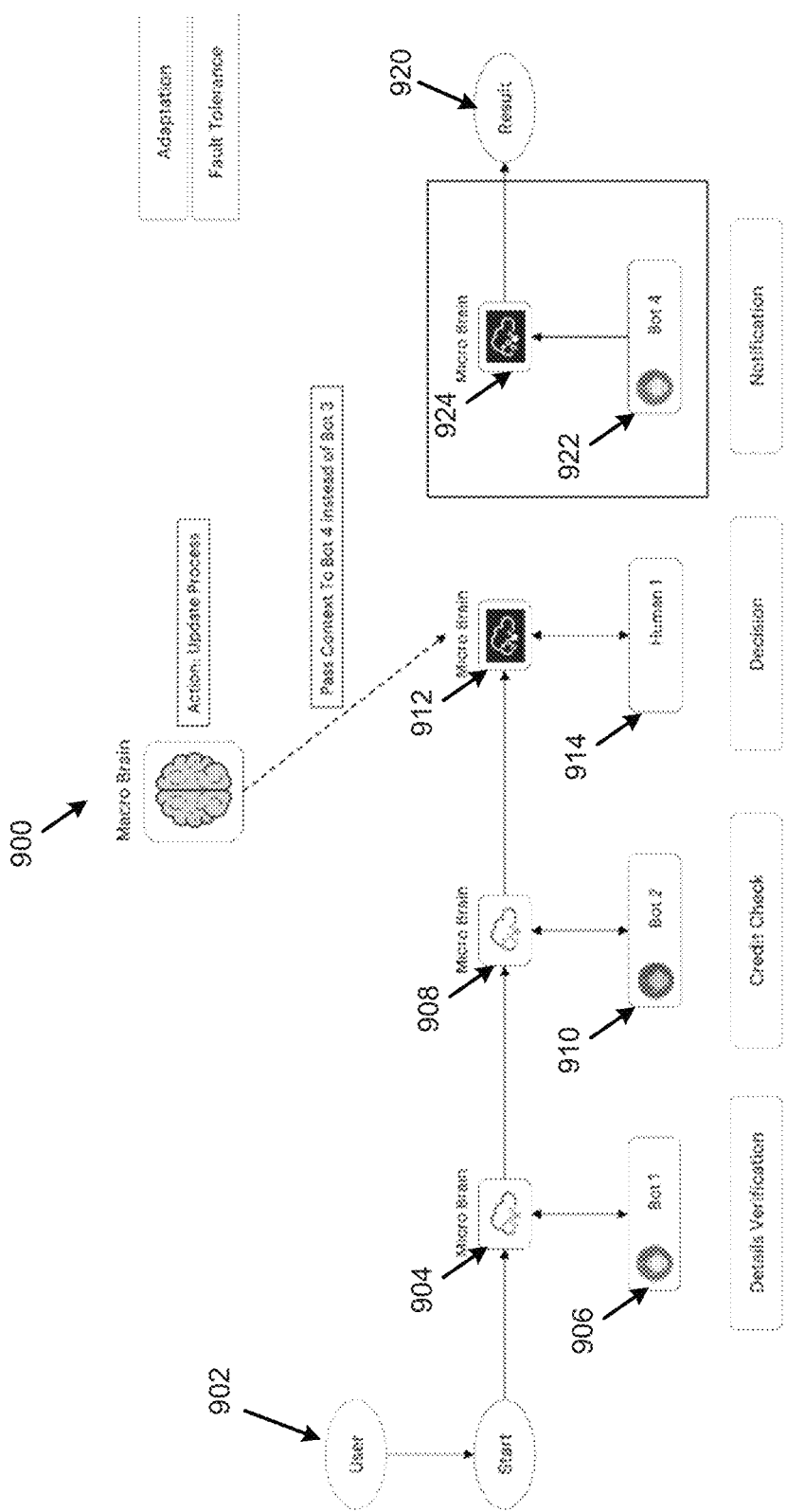
FIG. 18 illustrates passing of context to a different CoBot for the loan processing CoBot of FIG. 8 to illustrate operation of the software CoBot engineering, execution, and monitoring apparatus of FIG. 1 in accordance with an example of the present disclosure.

Referring to FIG. 18, macro brain 900 may request micro brain 912 for human-1 at 914 to pass its context to bot-4 at 922 instead of bot-3.

Figure 19:
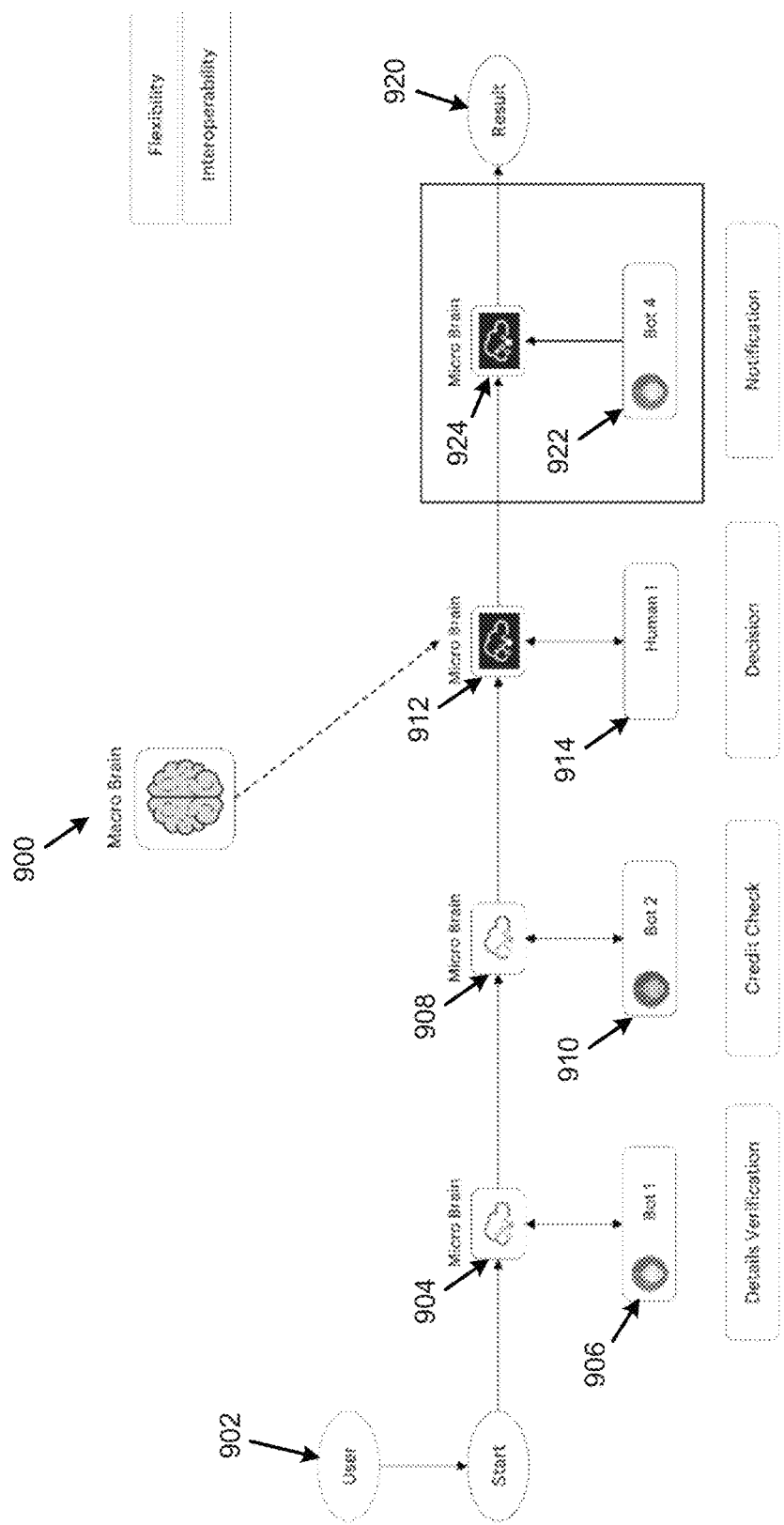
FIG. 19 illustrates analysis by a different micro brain for the loan processing CoBot of FIG. 8 to illustrate operation of the software CoBot engineering, execution, and monitoring apparatus of FIG. 1 in accordance with an example of the present disclosure.

Referring to FIG. 19, a link may be established between micro brain 912 and micro brain 924.

Figure 20:
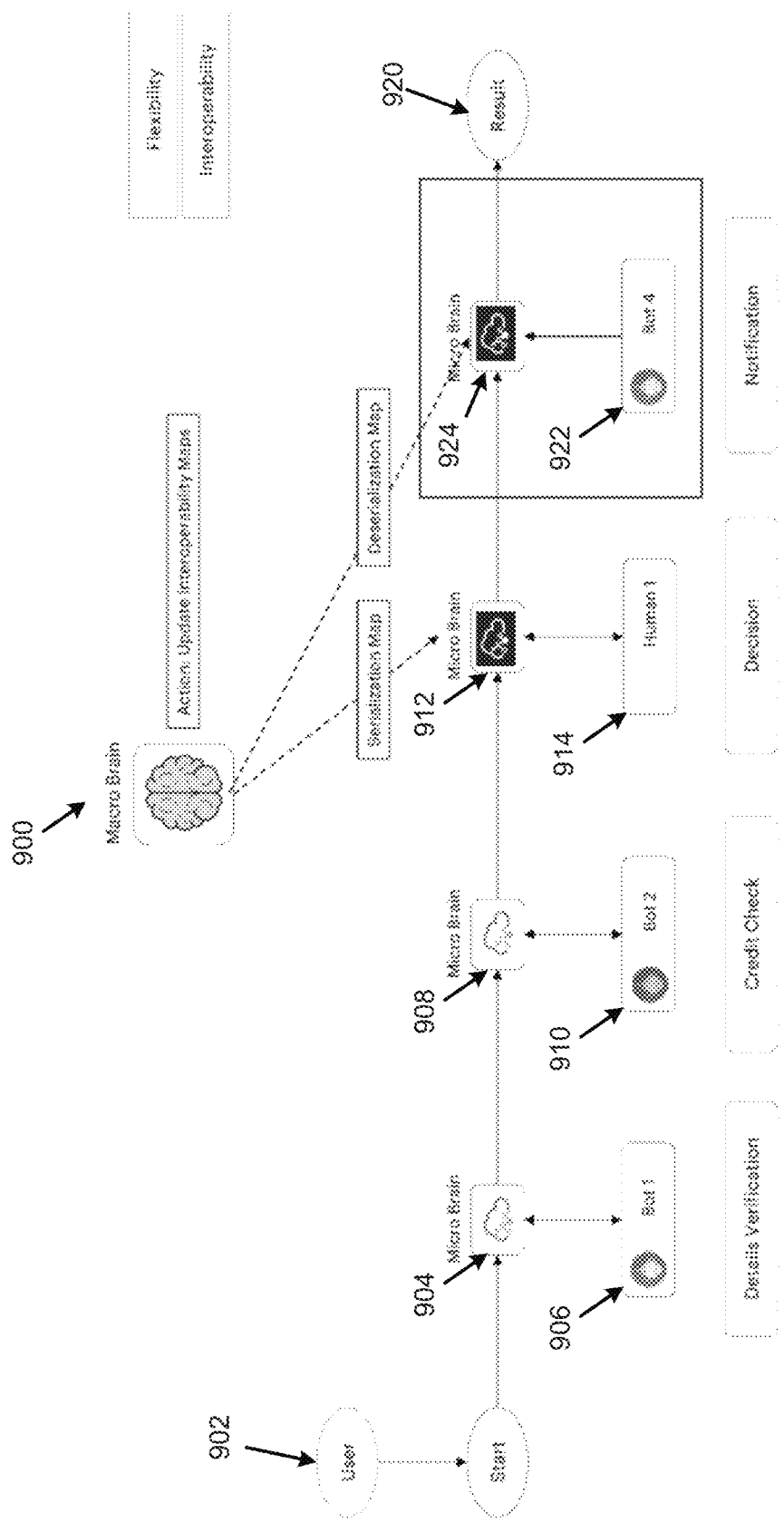
FIG. 20 illustrates implementation of a serialization map and a deserialization map for the loan processing CoBot of FIG. 8 to illustrate operation of the software CoBot engineering, execution, and monitoring apparatus of FIG. 1 in accordance with an example of the present disclosure.

Referring to FIG. 20, in order for micro brain 912 to serialize data so that micro brain 924 may comprehend the data, macro brain 900 may update interoperability maps with respect to micro brain 912 and micro brain 924. The sterilization map sent to micro brain 912 may be utilized by micro brain 912 to convert its data for micro brain 924. Similarly, the desterilization map sent to micro brain 924 may be utilized by micro brain 924 to convert its data for utilization by bot-4 at 922.

Figure 21:
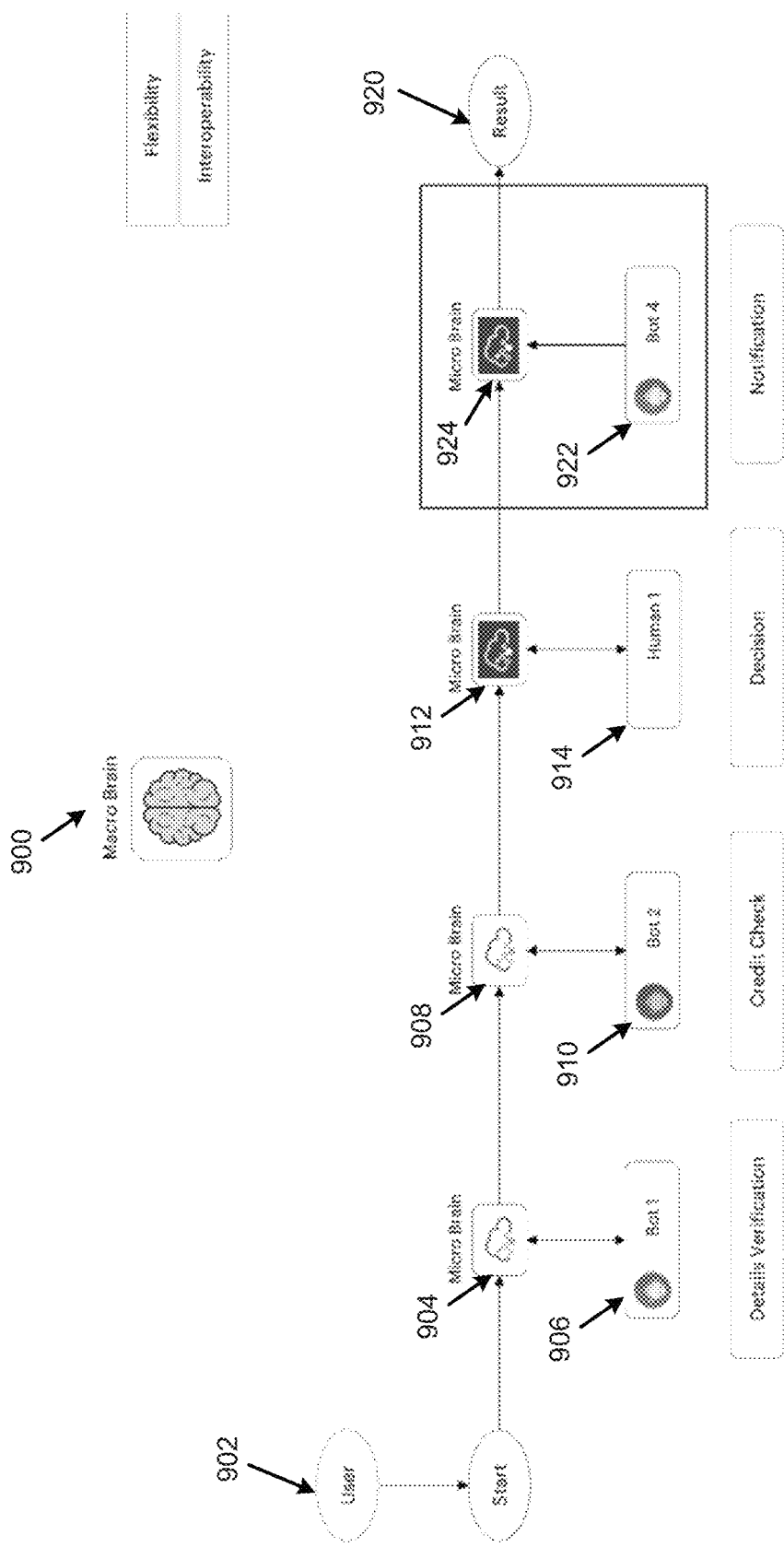
FIG. 21 illustrates analysis by a different micro brain for the loan processing CoBot of FIG. 8 to illustrate operation of the software CoBot engineering, execution, and monitoring apparatus of FIG. 1 in accordance with an example of the present disclosure.
Figure 22:
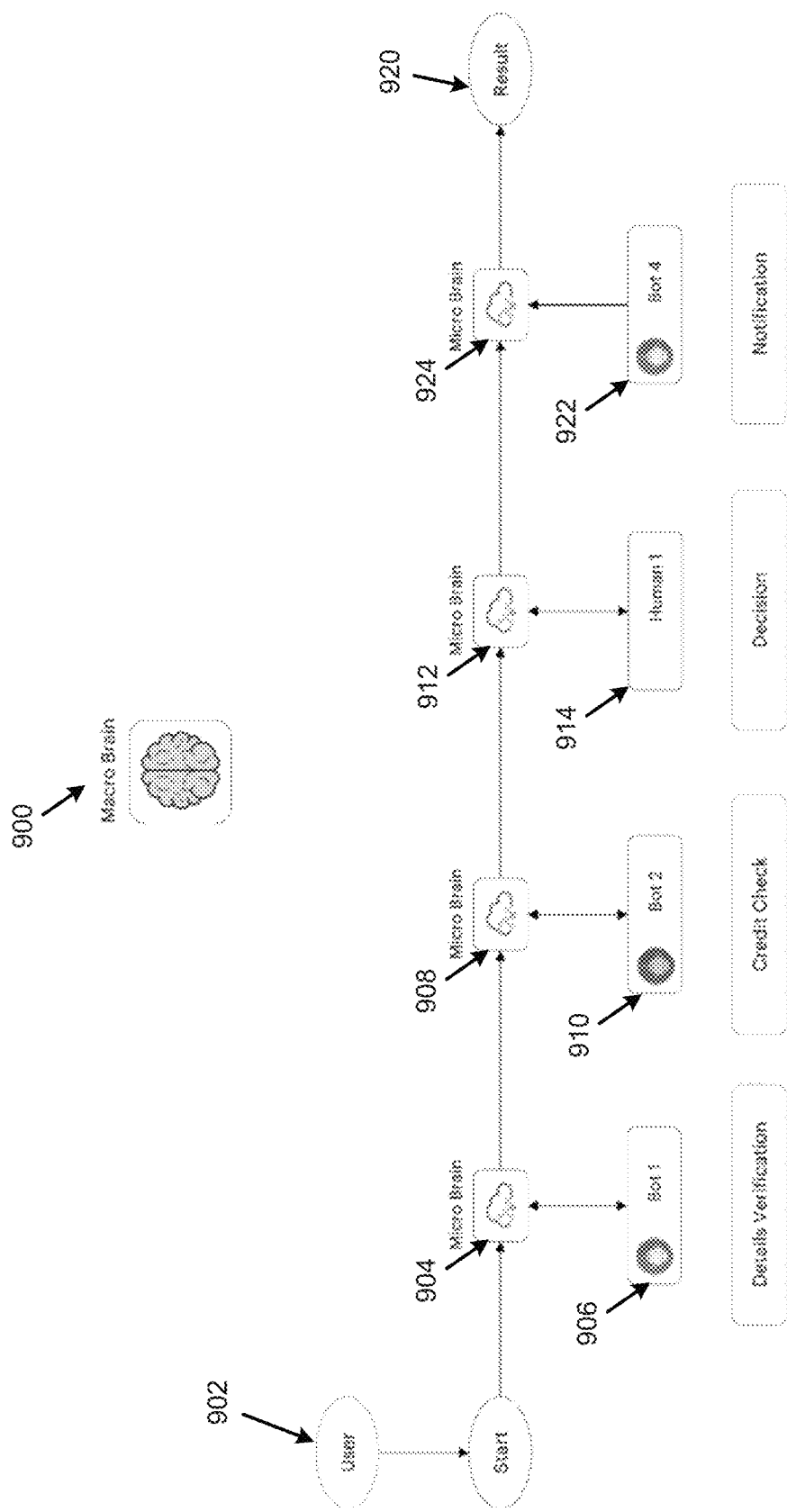
FIG. 22 illustrates analysis by a different micro brain for the loan processing CoBot of FIG. 8 to illustrate operation of the software CoBot engineering, execution, and monitoring apparatus of FIG. 1 in accordance with an example of the present disclosure.

Referring to FIGS. 21 and 22, micro brain 912 may communicate as needed with micro brain 924.

Figure 23:
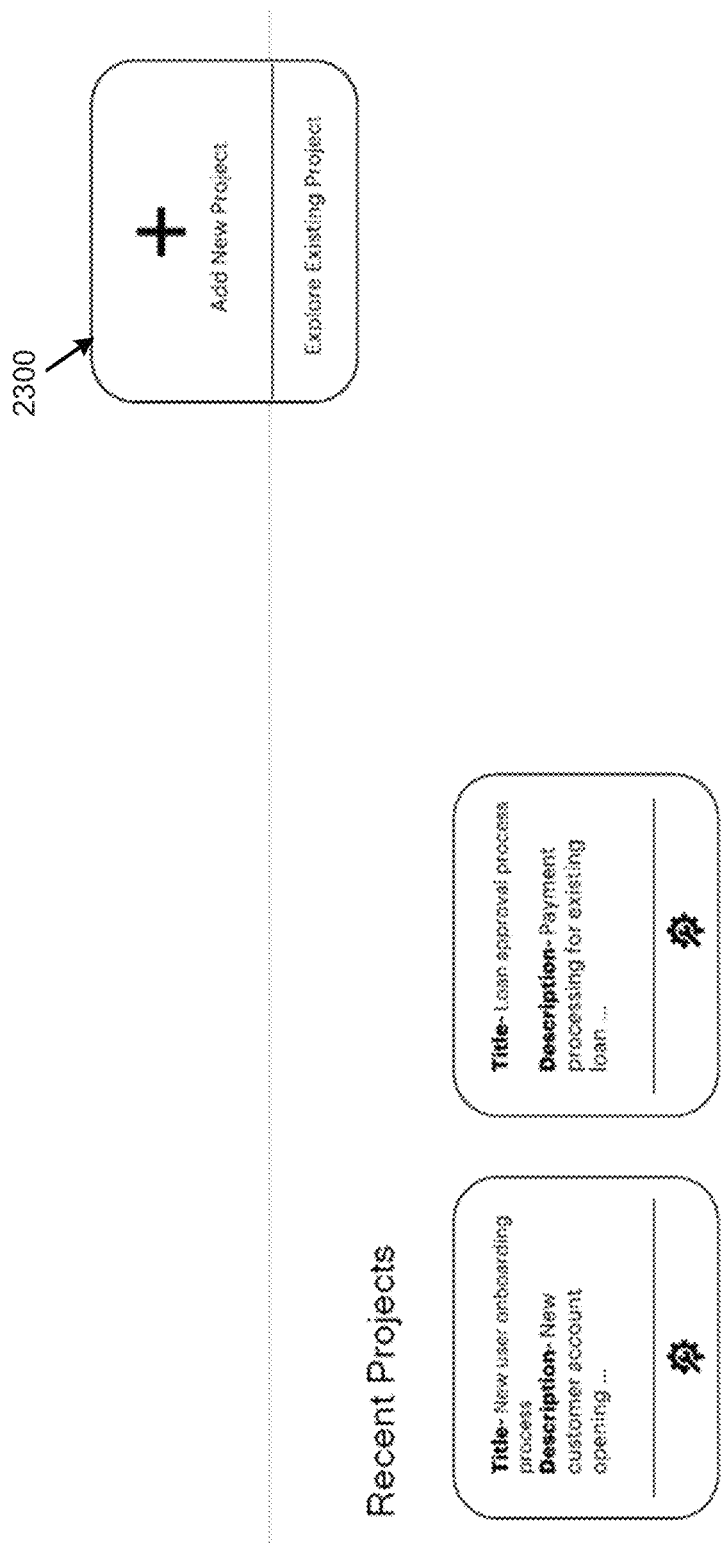
FIG. 23 illustrates an example of a loan approval process CoBot to illustrate operation of the software CoBot engineering, execution, and monitoring apparatus of FIG. 1 in accordance with an example of the present disclosure.

FIG. 23 illustrates an example of a loan approval process CoBot to illustrate operation of the apparatus 100 in accordance with an example of the present disclosure.

Referring to FIG. 23, at 2300, a requirement specification 108 for a CoBot 110 that is to be implemented may be specified.

Referring to FIG. 24, at 2400, the requirement specification 108 is shown in detail for a credit card (e.g., loan) application processing CoBot.

Figure 25:
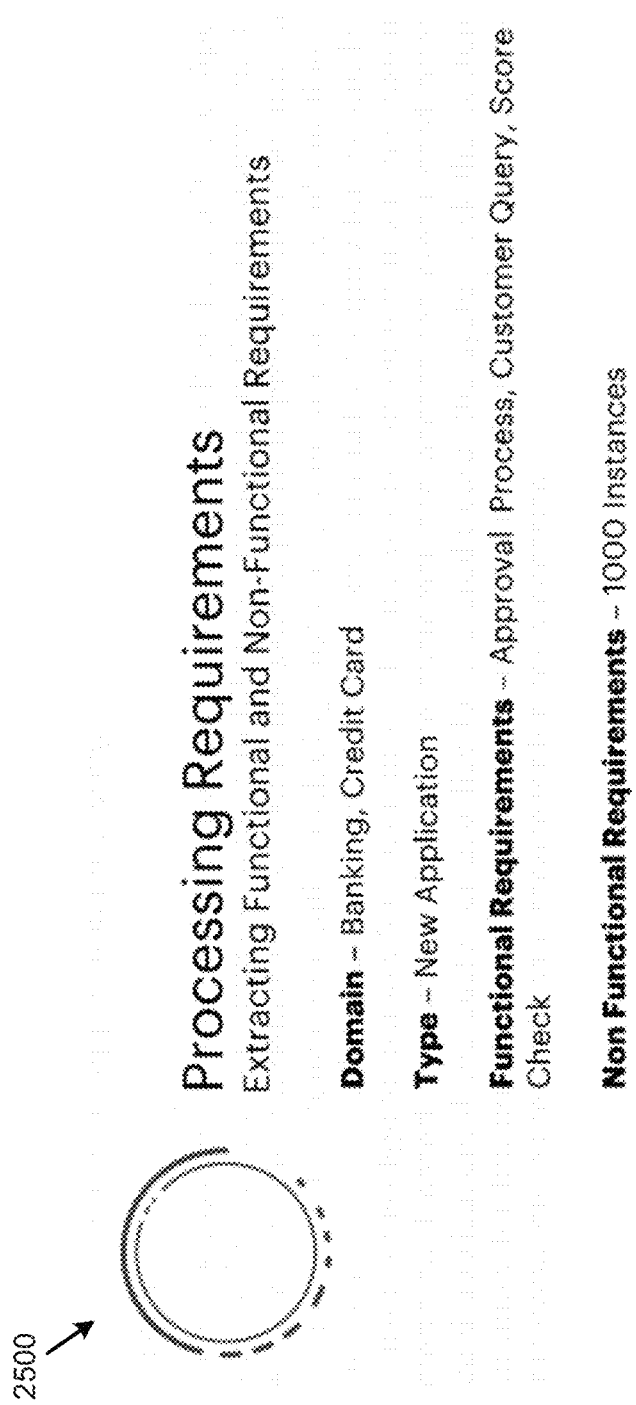
FIG. 25 illustrates processing requirements for the loan approval process CoBot of FIG. 23 to illustrate operation of the software CoBot engineering, execution, and monitoring apparatus of FIG. 1 in accordance with an example of the present disclosure.

Referring to FIG. 25, at 2500, the functional and non-functional requirements extractor 102 may extract, based on at least one domain-specific natural language processing model 104, at least one CoBot requirement 106 that includes at least one of a functional requirement, a non-functional requirement, an intent, a flow, or a constraint from the requirement specification 108 for the CoBot 110 that is to be implemented.

Referring to FIG. 26, at 2600, the CoBot requirement 106 may be mapped onto the requirement specification 108.

Figure 27:
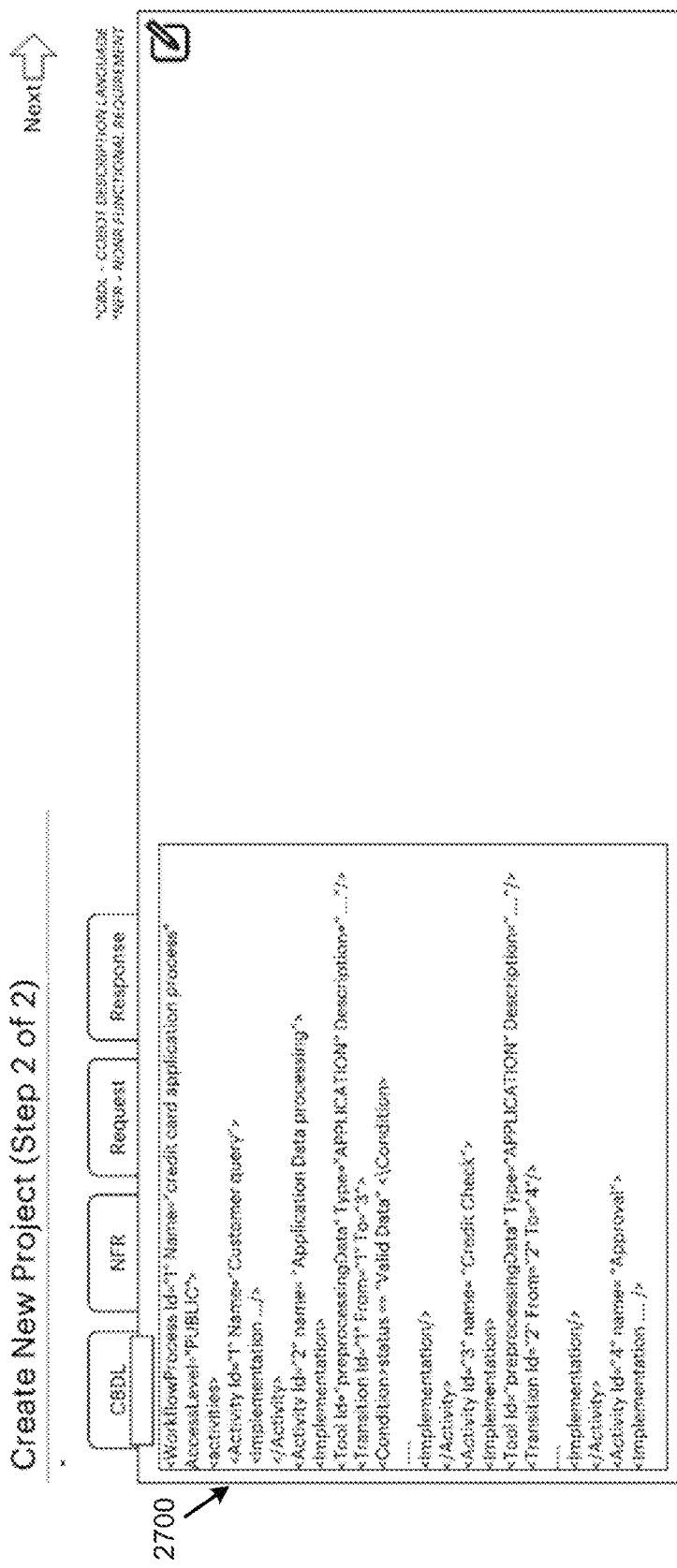
FIG. 27 illustrates creation of a new project including selection of CoBot description language (CBDL) for the loan approval process CoBot of FIG. 23 to illustrate operation of the software CoBot engineering, execution, and monitoring apparatus of FIG. 1 in accordance with an example of the present disclosure.

Referring to FIG. 27, the workflow generator 112 may generate, based on application of a CoBot description language to the at least one CoBot requirement 106, a CoBot workflow 114 that specifies a plurality of tasks to be performed by the CoBot 110. An example of the CoBot description language as shown at 2700.

Figure 28:
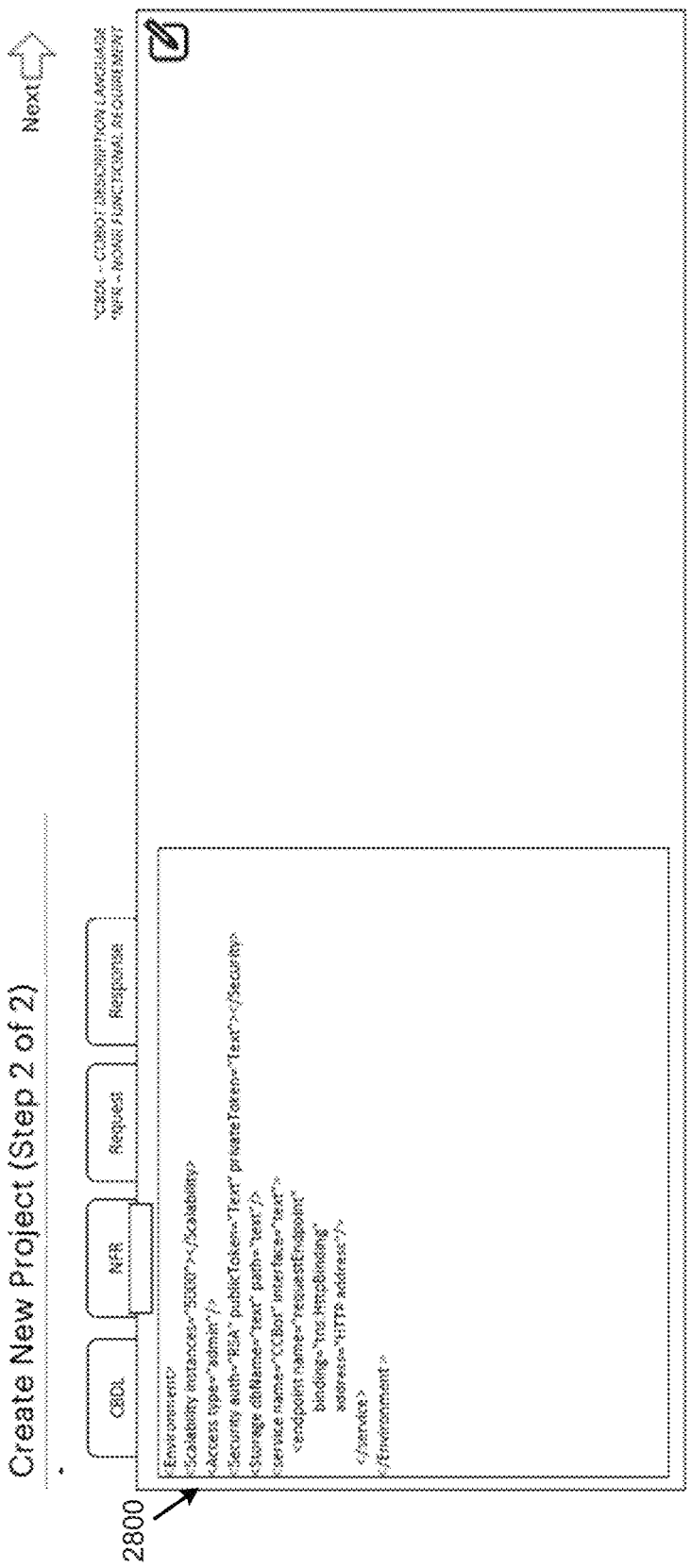
FIG. 28 illustrates creation of a new project including selection of non-functional requirement (NFR) for the loan approval process CoBot of FIG. 23 to illustrate operation of the software CoBot engineering, execution, and monitoring apparatus of FIG. 1 in accordance with an example of the present disclosure.

Referring to FIG. 28, non-functional requirements are illustrated as shown at 2800.

Figure 29:
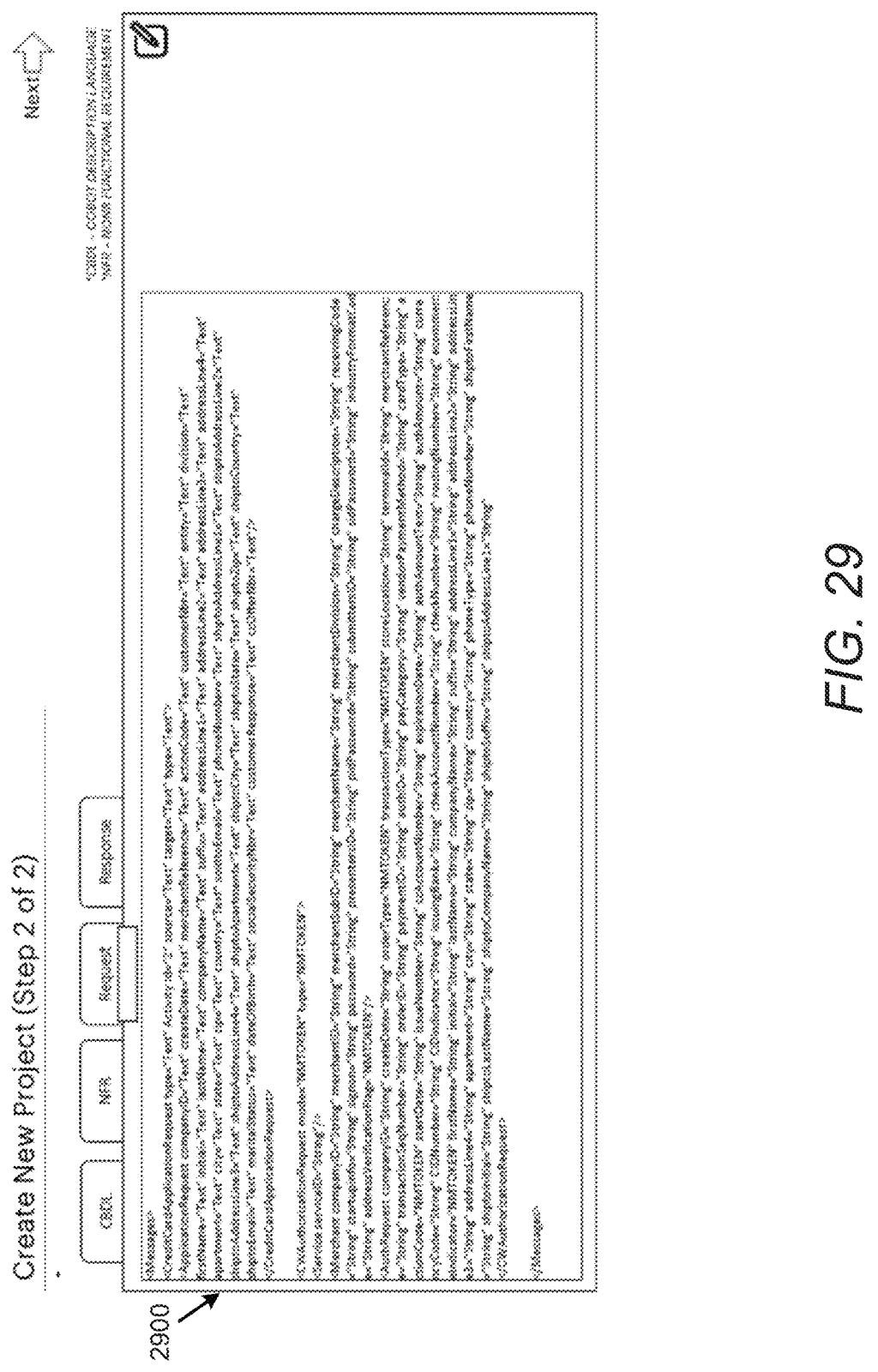
Figure 30:
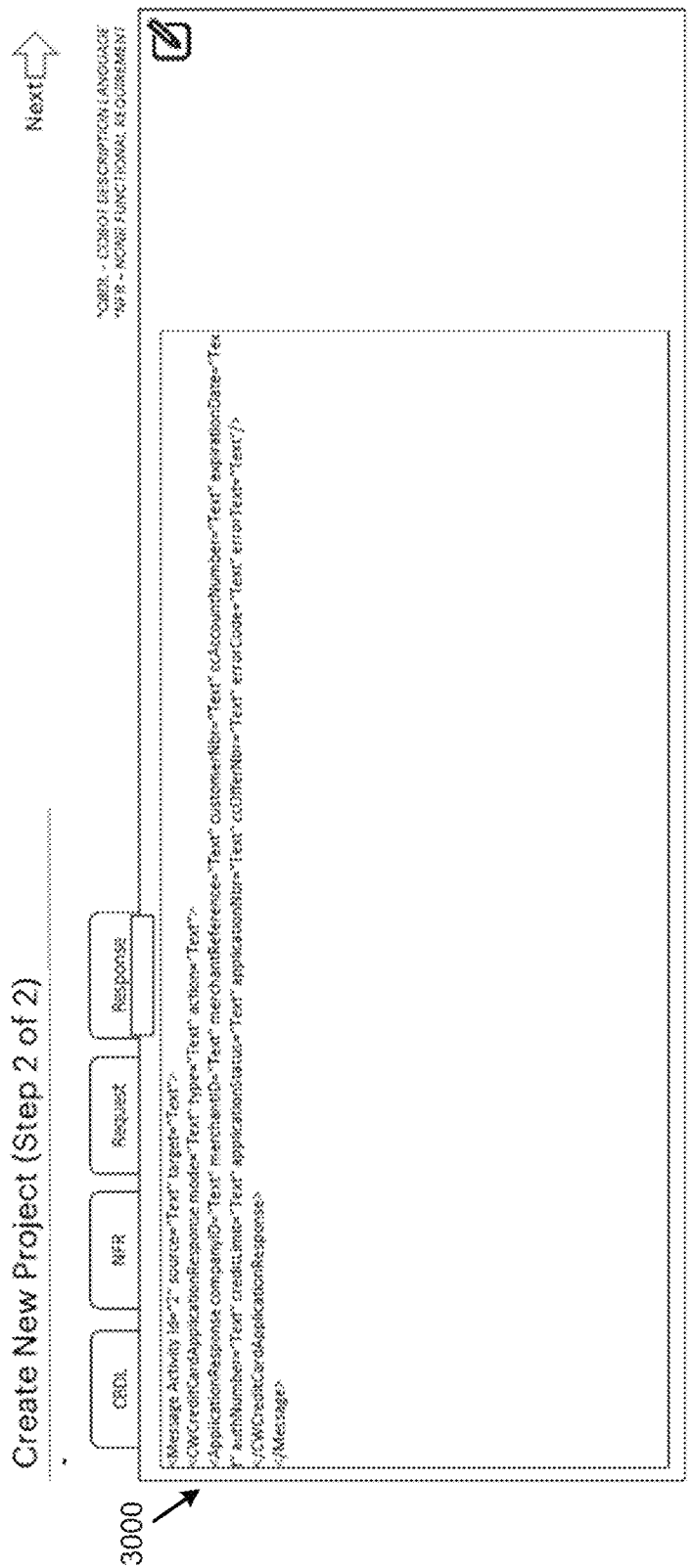
FIG. 30 illustrates creation of a new project including selection of a response for the loan approval process CoBot of FIG. 23 to illustrate operation of the software CoBot engineering, execution, and monitoring apparatus of FIG. 1 in accordance with an example of the present disclosure.

Referring to FIG. 29, for each activity performed by the CoBot 110 as shown at 2900, associated responses are shown in FIG. 30 at 3000.

Figure 31:
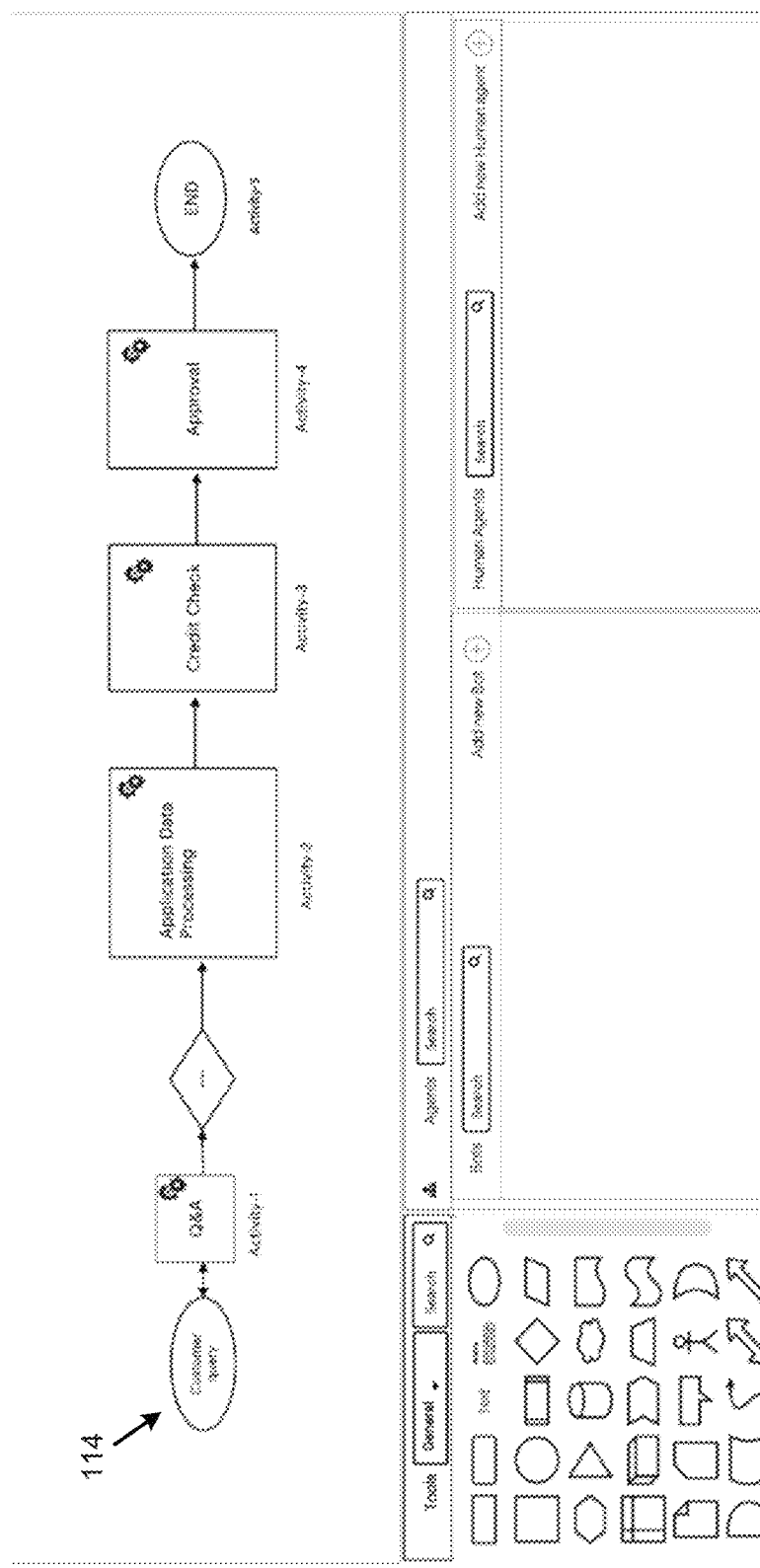
FIGS. 31-34 illustrate further details associated with the loan approval process CoBot of FIG. 23 to illustrate operation of the software CoBot engineering, execution, and monitoring apparatus of FIG. 1 in accordance with an example of the present disclosure.

Referring to FIG. 31, an example of an initial CoBot workflow 114 is illustrated for the requirement specification 108 of FIG. 24.

Figure 32:
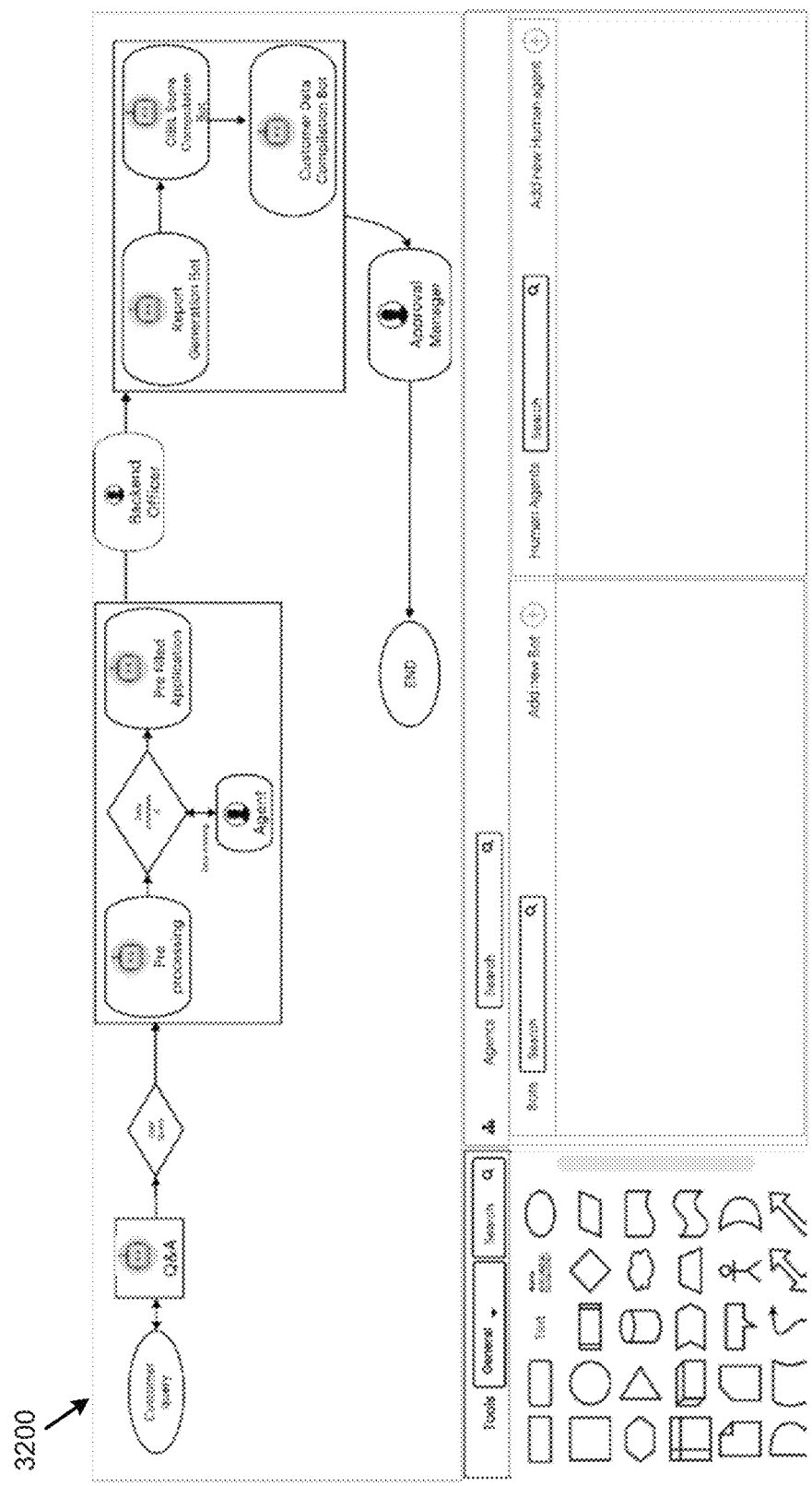

Referring to FIG. 32, at 3200, the goal-oriented human versus agent analyzer 116 may determine, for each of the tasks of the CoBot workflow 114, whether the task is to be performed by a bot or by a human.

Figure 33:
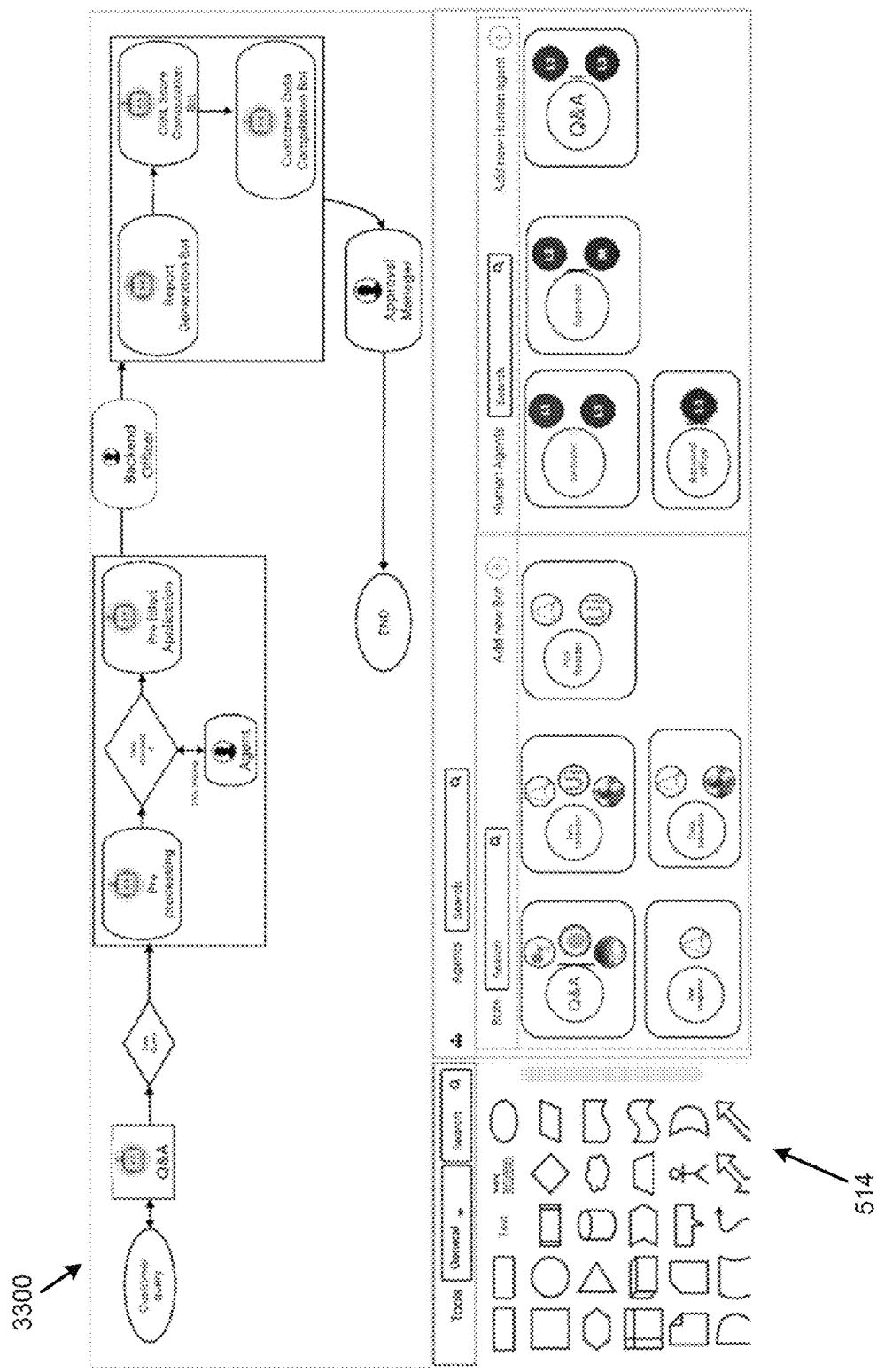

Referring to FIG. 33, at 3300, the workflow generator 112 may utilize an intelligent building blocks repository 514 to generate the CoBot workflow 114.

Figure 34:
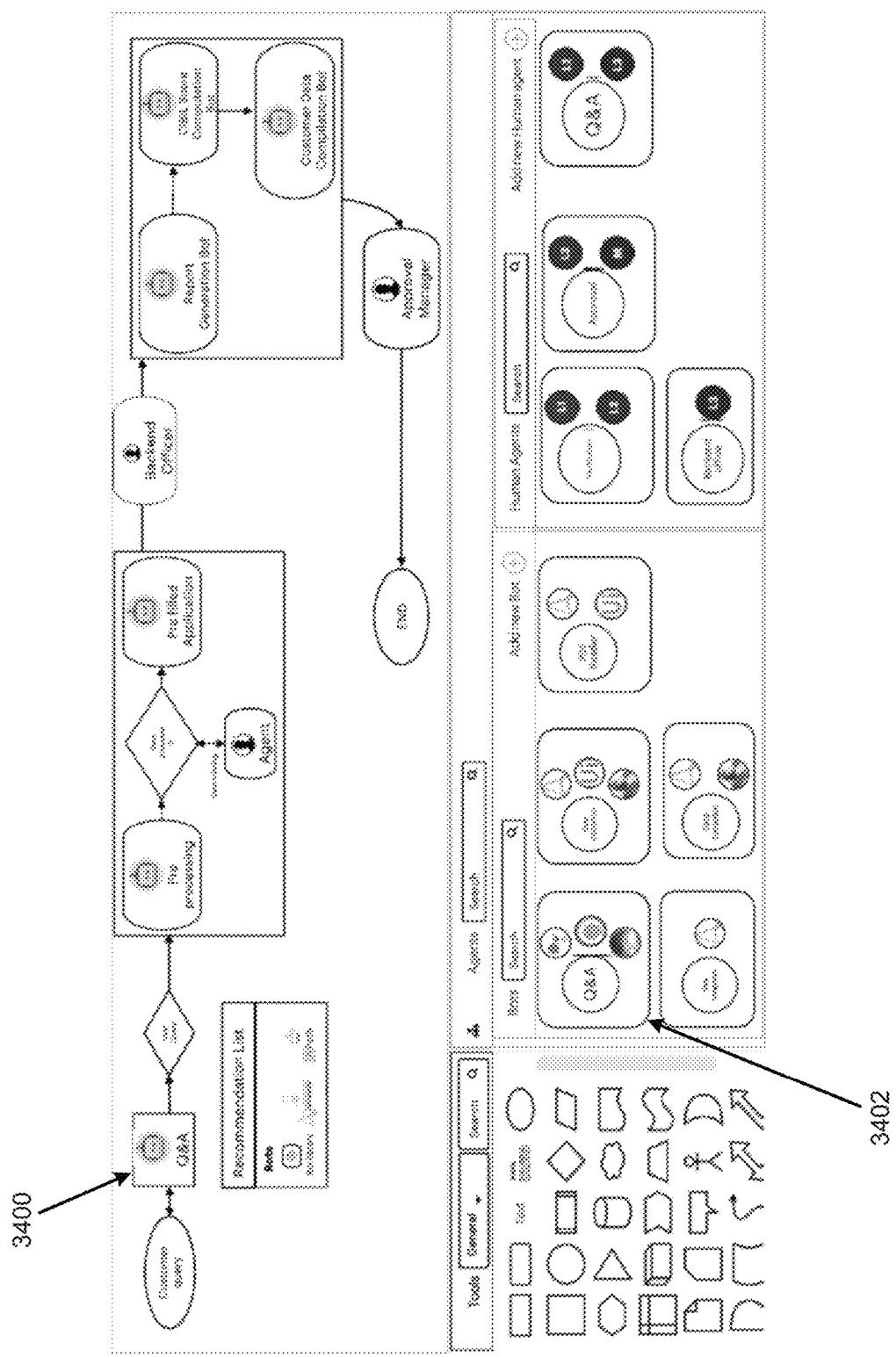

Referring to FIG. 34, if the Q&A bot is selected at block 3400, at 3402, additional bots that may operate with the Q&A bot and/or provide related functionality may also be displayed for selection.

Figure 35:
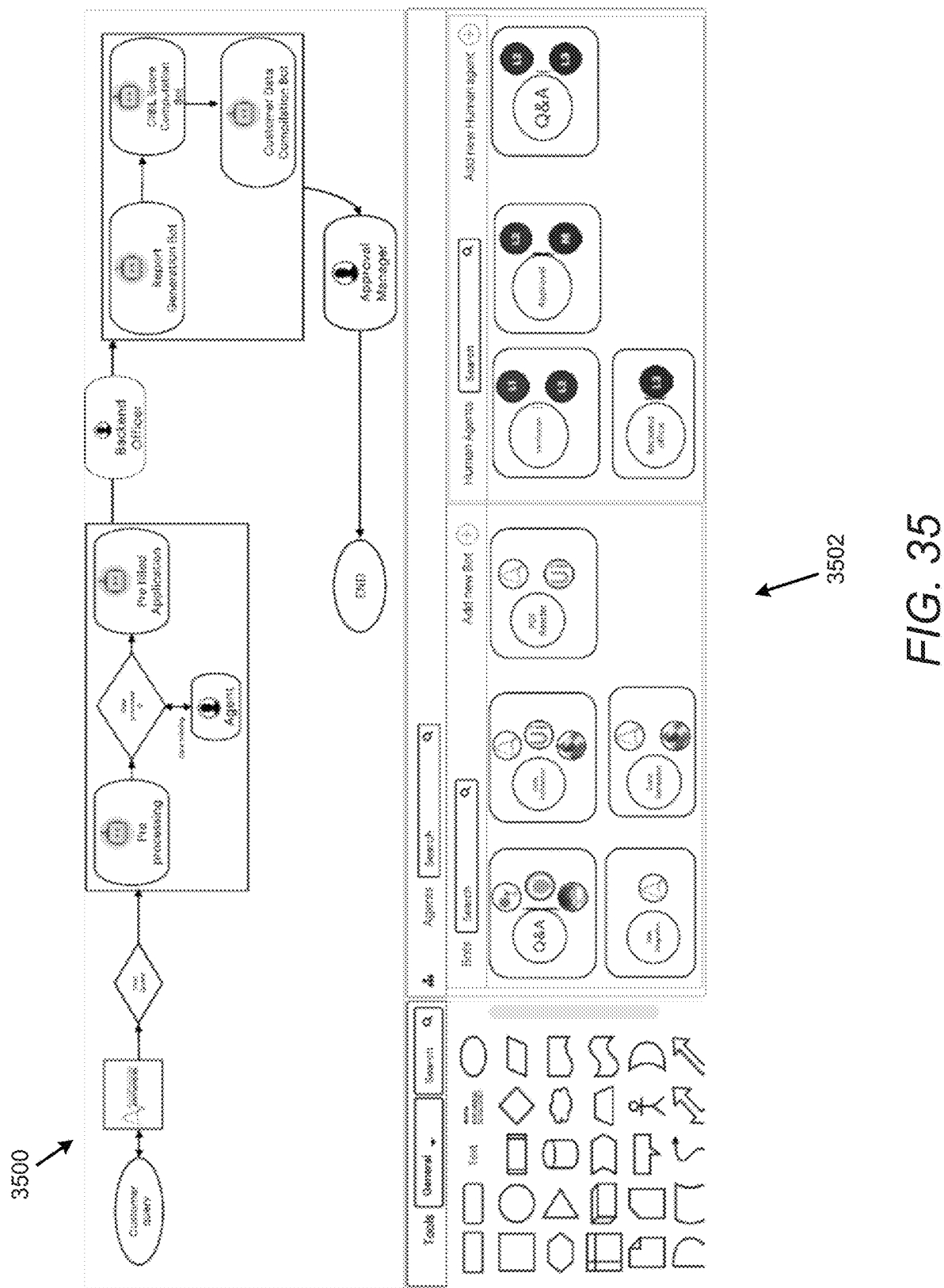
FIG. 35-41 illustrate of a credit card application processing CoBot to illustrate operation of the software CoBot engineering, execution, and monitoring apparatus of FIG. 1 in accordance with an example of the present disclosure.

Referring to FIG. 35, at 3500, the CoBot workflow 114 may be modified as needed based on the addition of a bot from the options at 3502.

Figure 36:
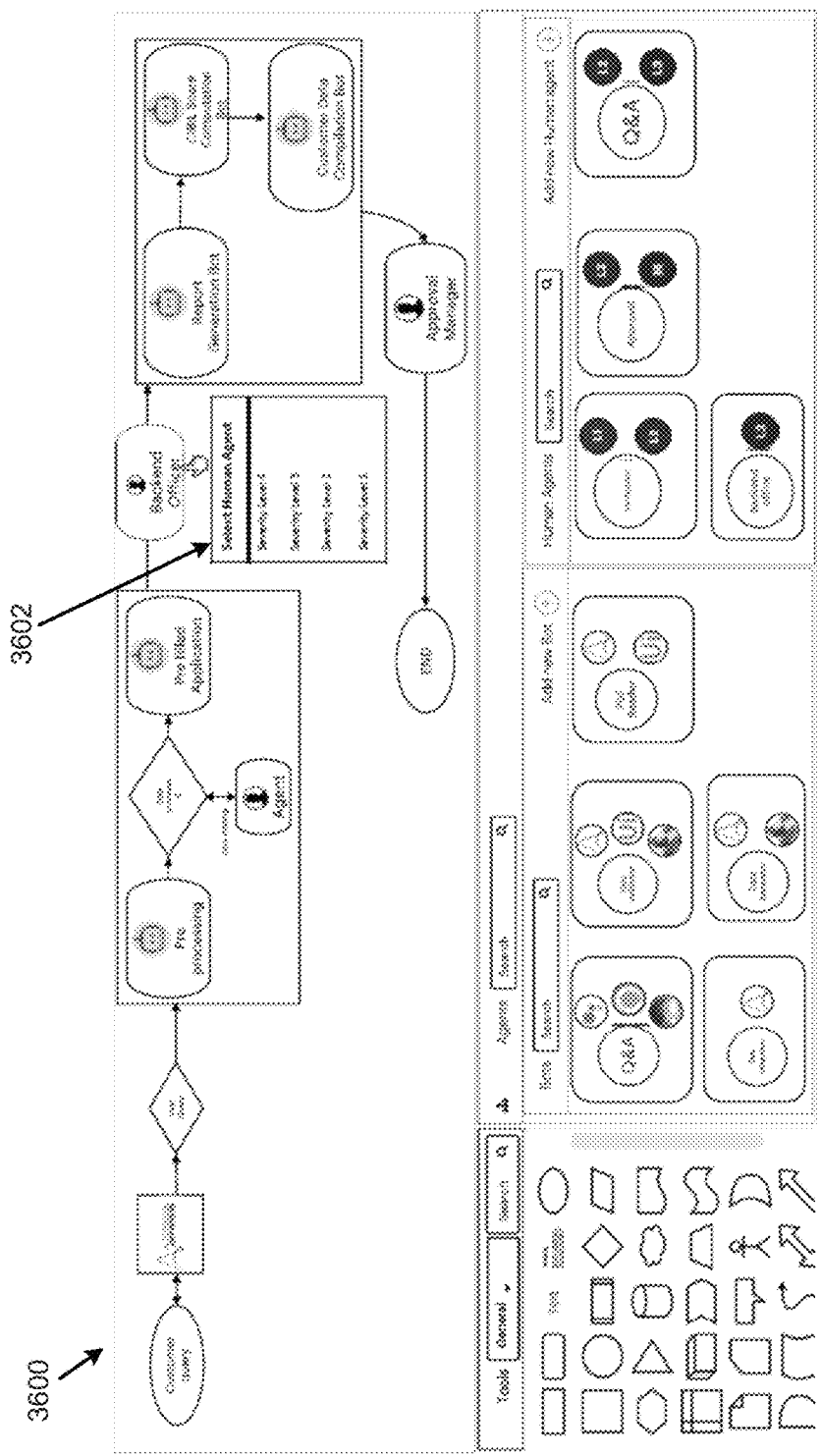
Figure 37:
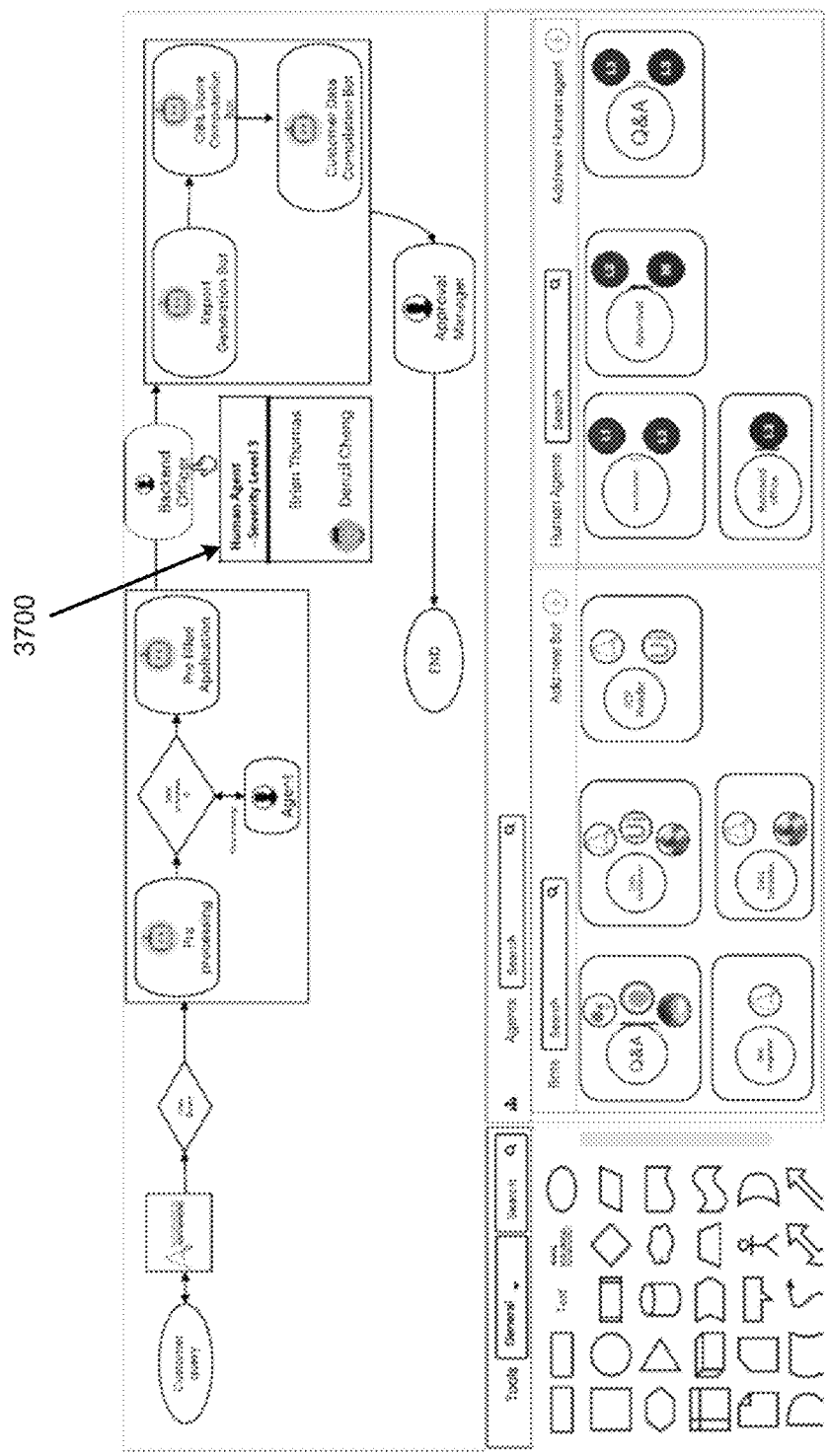

Referring to FIG. 36, at 3600, blocks related to humans in the CoBot workflow 114 may be modified by selecting a security level as shown at 3602. In this manner, based on the selected security level, additional humans that may meet the selected security level may be displayed as shown in FIG. 37 at 3700.

Figure 38:
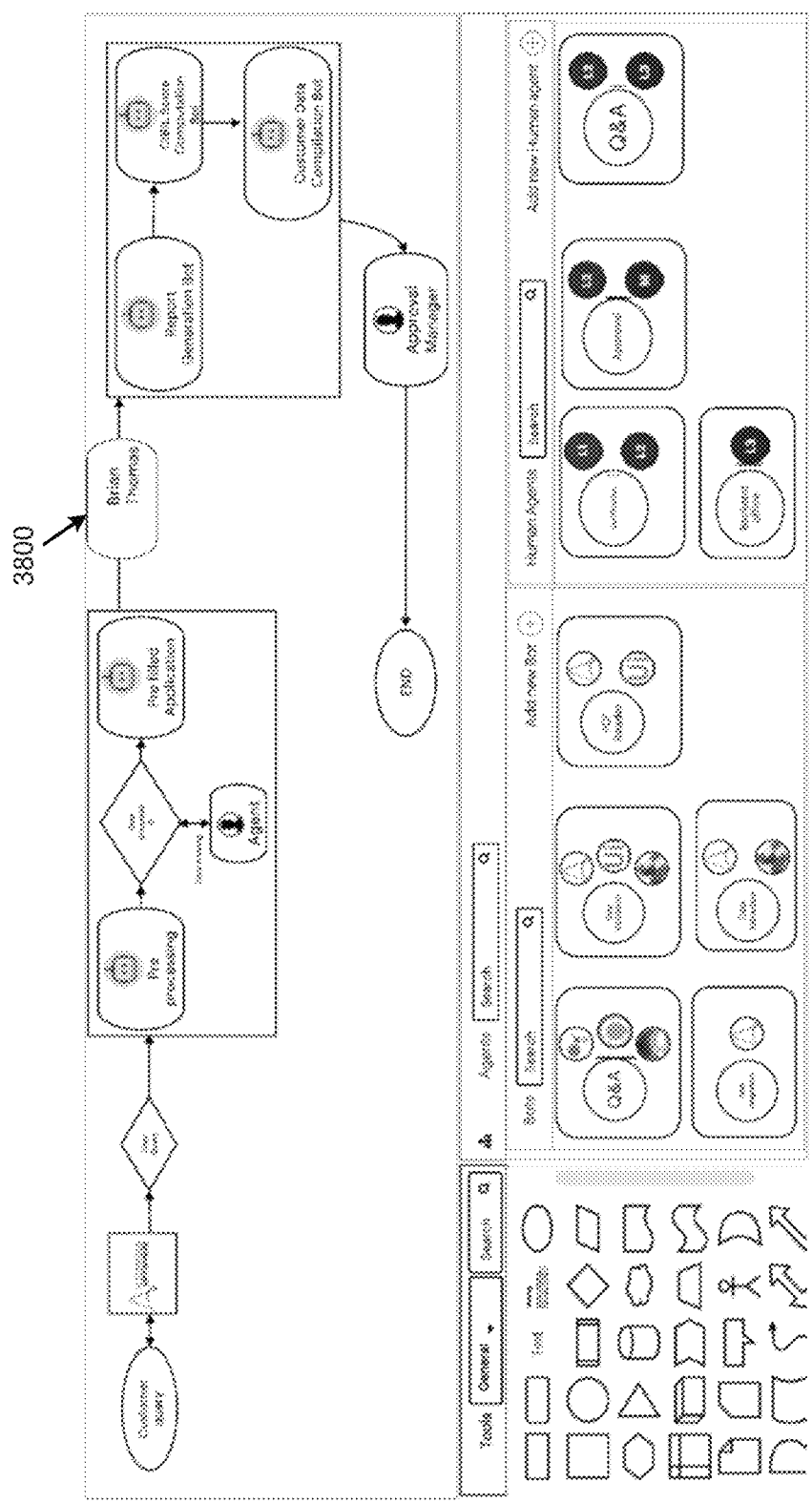

Referring to FIG. 38, the selected human to perform the task at 3800 may be displayed in the appropriate block.

Figure 39:
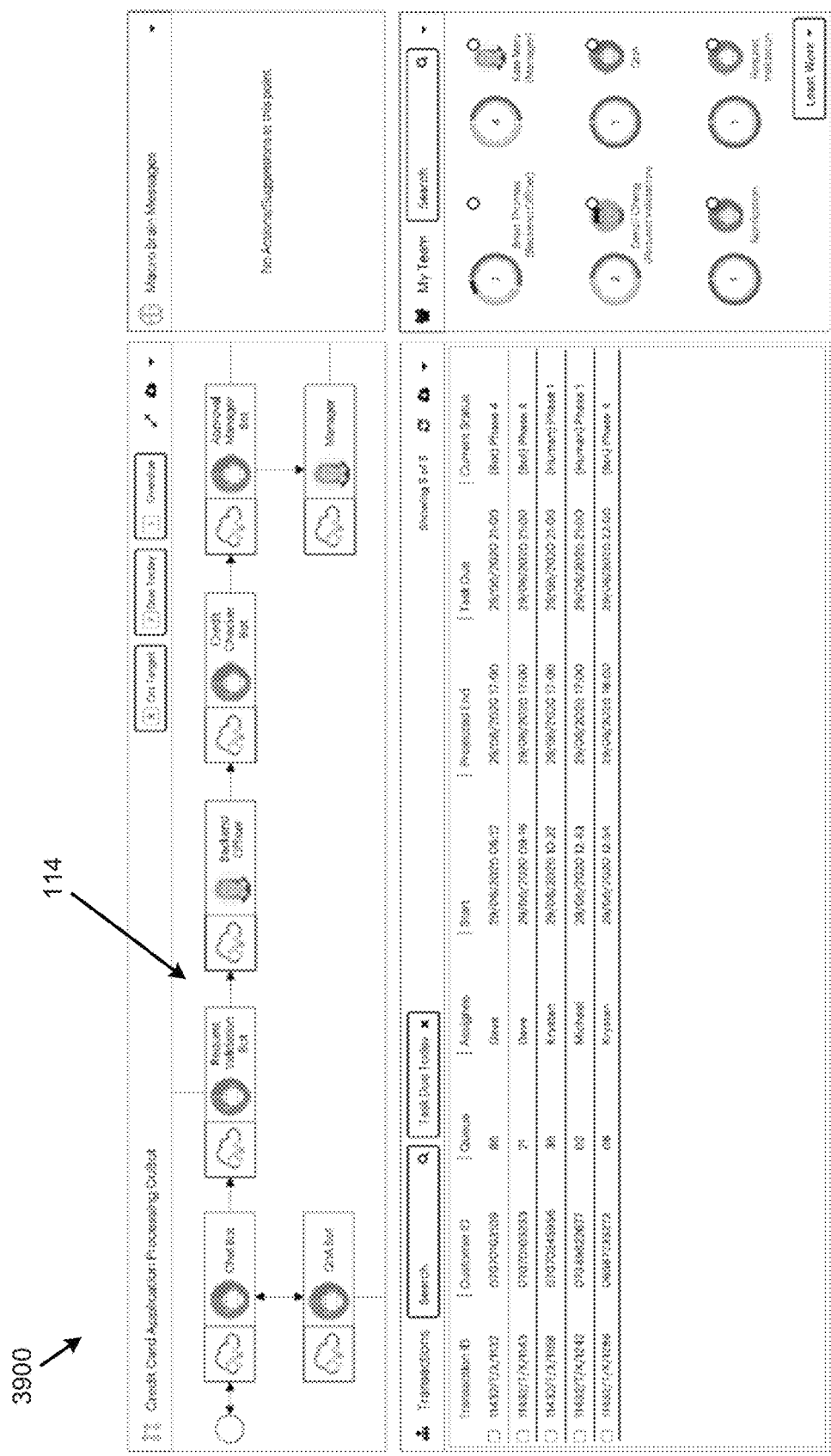

Referring to FIG. 39, at 3900, the workflow performer 134 may implement the CoBot 110 to perform the CoBot workflow 114.

Figure 40:
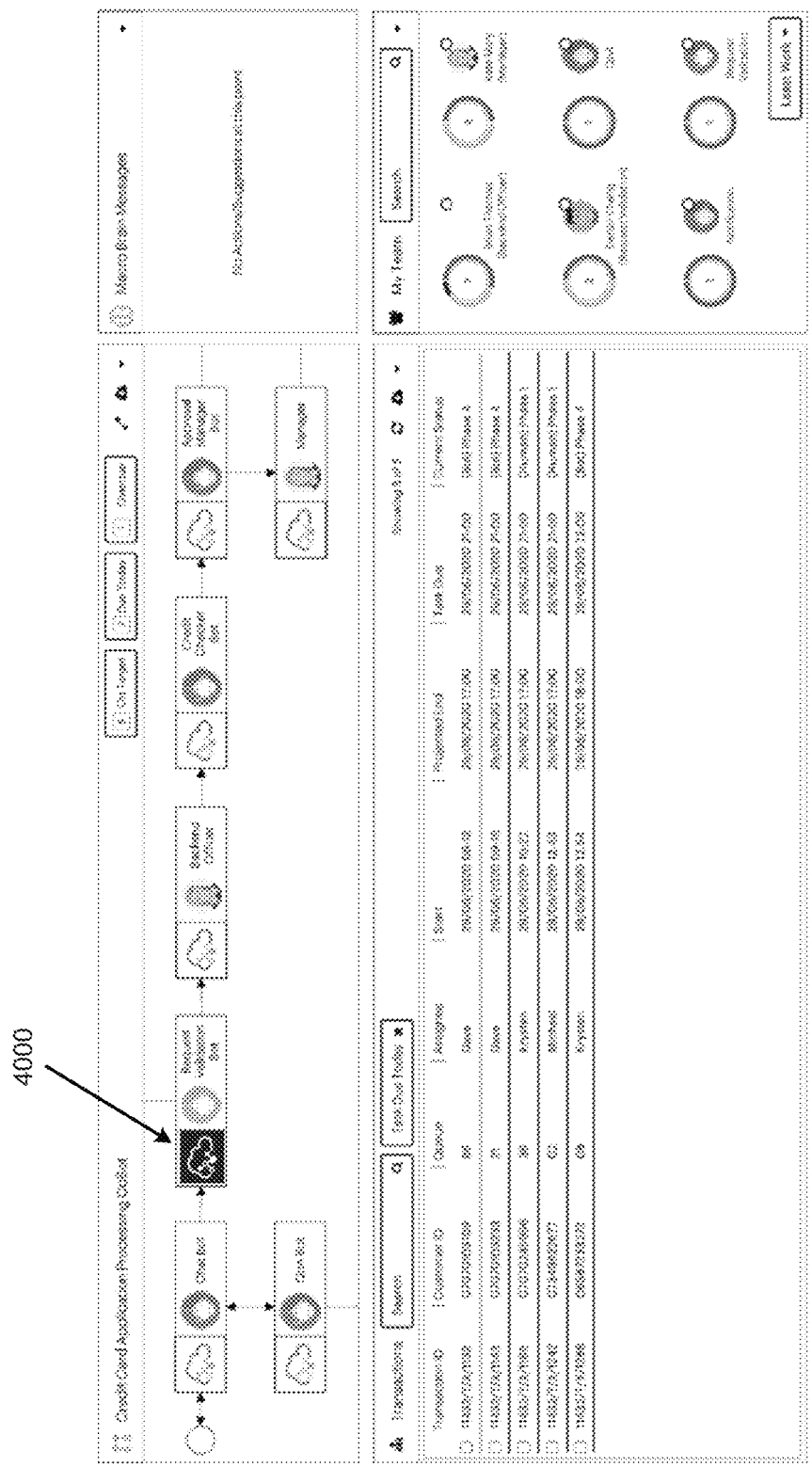
Figure 41:
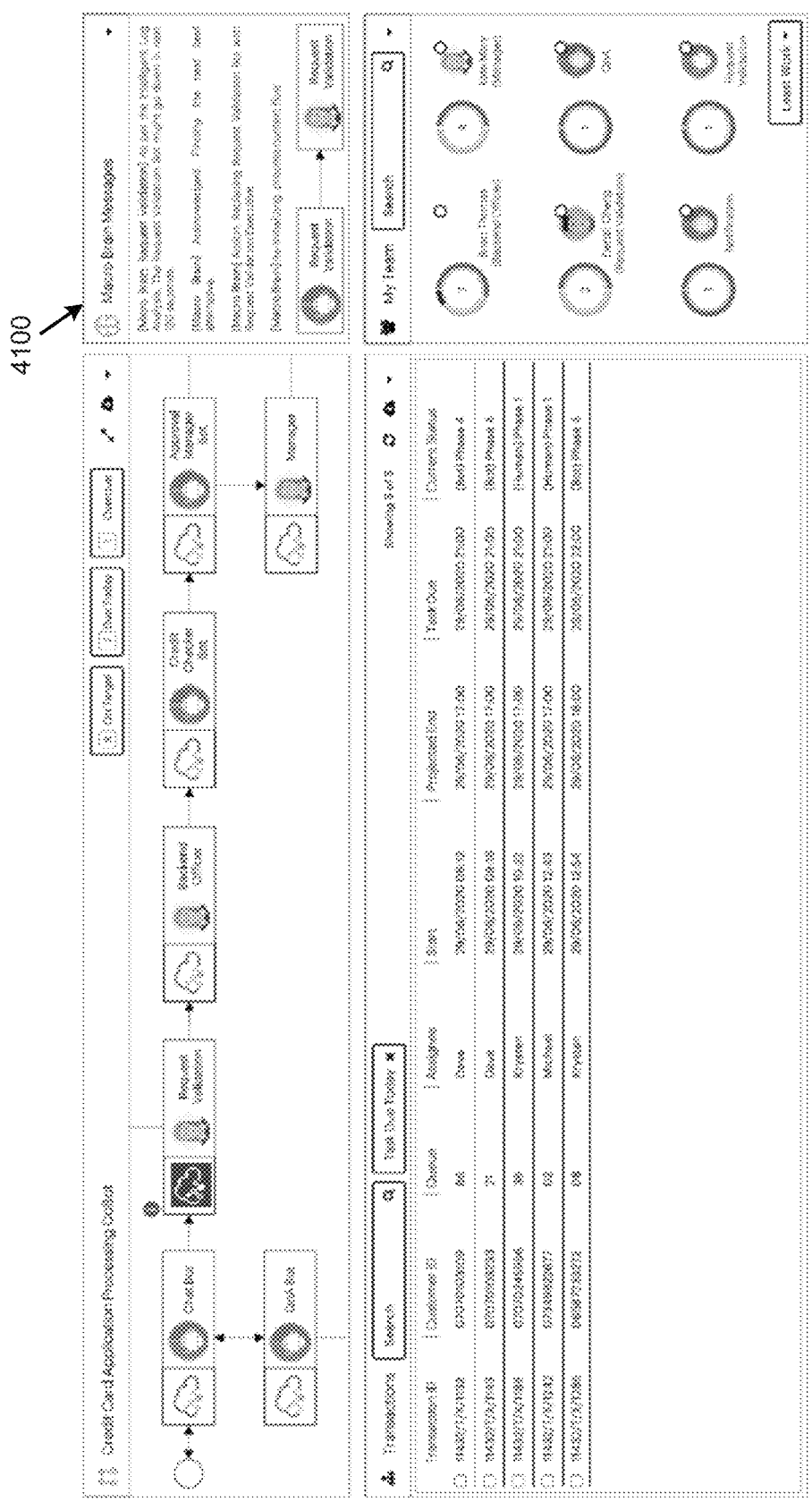

Referring to FIG. 40, assuming that a potential fault is detected with respect to the bot at block 4000, at 4100 in FIG. 41, as disclosed herein with respect to FIGS. 10-13, a micro brain may utilize the deep learning model to perform log analysis of the execution logs, resulting in detection of a potential health issue that may result in shut-down of the bot at block 4000 within a specified time. Details of the analysis results may be displayed at 4100.

Figure 44:
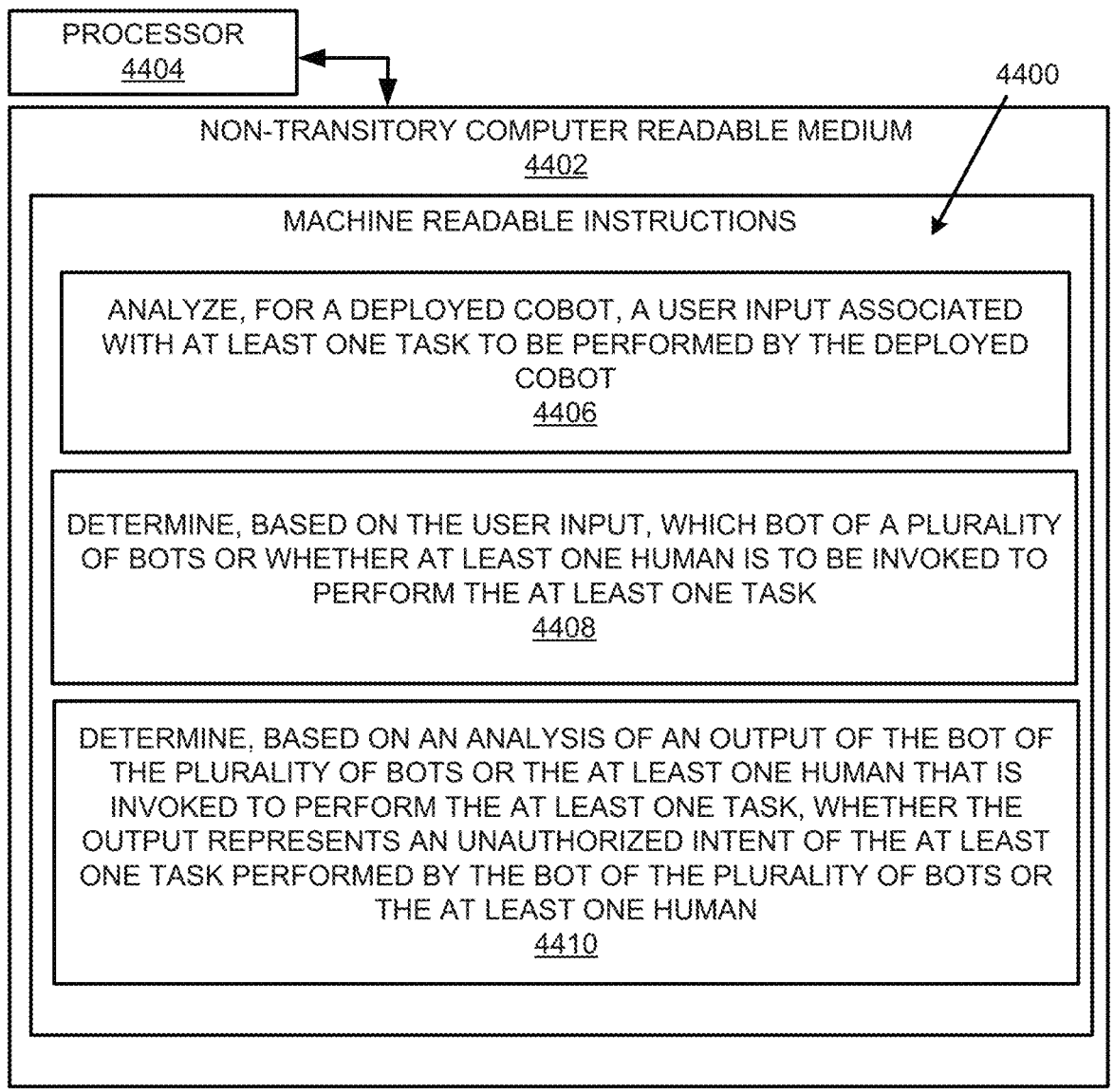
FIG. 44 illustrates a further example block diagram for software CoBot engineering, execution, and monitoring in accordance with another example of the present disclosure.

FIGS. 42-44 respectively illustrate an example block diagram 4200, a flowchart of an example method 4300, and a further example block diagram 4400 for software CoBot engineering, execution, and monitoring, according to examples. The block diagram 4200, the method 4300, and the block diagram 4400 may be implemented on the apparatus 100 described above with reference to FIG. 1 by way of example and not of limitation. The block diagram 4200, the method 4300, and the block diagram 4400 may be practiced in other apparatus. In addition to showing the block diagram 4200, FIG. 42 shows hardware of the apparatus 100 that may execute the instructions of the block diagram 4200. The hardware may include a processor 4202, and a memory 4204 storing machine readable instructions that when executed by the processor cause the processor to perform the instructions of the block diagram 4200. The memory 4204 may represent a non-transitory computer readable medium. FIG. 43 may represent an example method for software CoBot engineering, execution, and monitoring, and the steps of the method. FIG. 44 may represent a non-transitory computer readable medium 4402 having stored thereon machine readable instructions to provide software CoBot engineering, execution, and monitoring according to an example. The machine readable instructions, when executed, cause a processor 4404 to perform the instructions of the block diagram 4400 also shown in FIG. 44.

The processor 4202 of FIG. 42 and/or the processor 4404 of FIG. 44 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 4402 of FIG. 44), such as hardware storage devices (e.g., RAM (random access memory), ROM (read only memory), EPROM (erasable, programmable ROM), EEPROM (electrically erasable, programmable ROM), hard drives, and flash memory). The memory 4204 may include a RAM, where the machine readable instructions and data for a processor may reside during runtime.

Referring to FIGS. 1-42, and particularly to the block diagram 4200 shown in FIG. 42, the memory 4204 may include instructions 4206 to extract, based on at least one domain-specific natural language processing model 104, at least one CoBot requirement 106 that includes at least one of a functional requirement, a non-functional requirement, an intent, a flow, or a constraint from a requirement specification 108 for a CoBot 110 that is to be implemented.

The processor 4202 may fetch, decode, and execute the instructions 4208 to generate, based on application of a CoBot description language to the at least one CoBot requirement 106, a CoBot workflow 114 that specifies a plurality of tasks to be performed by the CoBot 110.

The processor 4202 may fetch, decode, and execute the instructions 4210 to determine, for each of the tasks of the CoBot workflow 114, whether the task is to be performed by a bot or by a human.

The processor 4202 may fetch, decode, and execute the instructions 4212 to generate, based on the determination for each of the tasks of the CoBot workflow 114 whether the task is to be performed by the bot or by the human, a team 120 that includes a plurality of bots and at least one human to execute the CoBot workflow 114.

The processor 4202 may fetch, decode, and execute the instructions 4214 to map the at least one of the functional requirement or the non-functional requirement with respect to the CoBot description language of the bots of the team 120.

The processor 4202 may fetch, decode, and execute the instructions 4216 to prioritize, based on the mapping of the at least one of the functional requirement or the non-functional requirement, the bots of the team 120 to identify a bot that is a best match to the at least one of the functional requirement or the non-functional requirement.

The processor 4202 may fetch, decode, and execute the instructions 4218 to analyze, for the bots of the team 120, compatibility of a bot that has been assigned to perform a task of the CoBot workflow 114 with another bot that has been assigned to perform another task of the CoBot workflow 114.

The processor 4202 may fetch, decode, and execute the instructions 4220 to configure each the bots to perform the assigned task of the CoBot workflow 114.

The processor 4202 may fetch, decode, and execute the instructions 4222 to deploy the CoBot 110 that includes the configured bots in an operational environment to perform the CoBot workflow 114.

Referring to FIGS. 1-42 and 43, and particularly FIG. 43, for the method 4300, at block 4302, the method may include extracting, based on at least one domain-specific natural language processing model 104, at least one CoBot requirement 106 from a requirement specification 108 for a CoBot 110 that is to be implemented.

At block 4304, the method may include generating, based on application of a CoBot description language to the at least one CoBot requirement 106, a CoBot workflow 114 that specifies a plurality of tasks to be performed by the CoBot 110.

At block 4306, the method may include deploying the CoBot 110 that includes at least one bot and at least one human in an operational environment to perform the CoBot workflow 114.

Referring to FIGS. 1-42 and 44, and particularly FIG. 44, for the block diagram 4400, the non-transitory computer readable medium 4402 may include instructions 4406 to analyze, for a deployed CoBot 110, a user input 136 associated with at least one task to be performed by the deployed CoBot 110.

The processor 4404 may fetch, decode, and execute the instructions 4408 to determine, based on the user input, which bot of a plurality of bots or whether at least one human is to be invoked to perform the at least one task.

The processor 4406 may fetch, decode, and execute the instructions 4408 to determine, based on an analysis of an output 140 of the bot of the plurality of bots or the at least one human that is invoked to perform the at least one task, whether the output 140 represents an unauthorized intent of the at least one task performed by the bot of the plurality of bots or the at least one human.

What has been described and illustrated herein is an example along with some of its variations. The terms, descriptions and figures used herein are set forth by way of illustration only and are not meant as limitations, Many variations are possible within the spirit and scope of the subject matter, which is intended to be defined by the following claims—and their equivalents—in which all terms are meant in their broadest reasonable sense unless otherwise indicated.

What is claimed is:

1. A software collaborative robot (CoBot) engineering, execution, and monitoring apparatus comprising:
    a functional and non-functional requirements extractor, executed by at least one hardware processor, to
        extract, based on at least one domain-specific natural language processing model, at least one CoBot requirement that includes at least one of a functional requirement, a non-functional requirement, an intent, a flow, or a constraint from a requirement specification for a CoBot that is to be implemented;
    a workflow generator, executed by the at least one hardware processor, to
        generate, based on application of a CoBot description language to the at least one CoBot requirement, a CoBot workflow that specifies a plurality of tasks to be performed by the CoBot;
    a goal-oriented human versus agent analyzer, executed by the at least one hardware processor, to
        determine, for each of the tasks of the CoBot workflow, whether the task is to be performed by a bot or by a human;
    a domain-specific team builder, executed by the at least one hardware processor, to generate, based on the determination for each of the tasks of the CoBot workflow whether the task is to be performed by the bot or by the human, a team that includes a plurality of bots and at least one human to execute the CoBot workflow;
    an agent discovery analyzer, executed by the at least one hardware processor, to map the at least one of the functional requirement or the non-functional requirement with respect to the CoBot description language of the bots of the team;
    an agent prioritizer, executed by the at least one hardware processor, to prioritize, based on the mapping of the at least one of the functional requirement or the non-functional requirement, the bots of the team to identify a bot that is a best match to the at least one of the functional requirement or the non-functional requirement;
    an agent inter-compatibility inspector, executed by the at least one hardware processor, to analyze, for the bots of the team, compatibility of a bot that has been assigned to perform a task of the CoBot workflow with another bot that has been assigned to perform another task of the CoBot workflow;
    an agent configuration generator, executed by the at least one hardware processor, to configure each the bots to perform the assigned task of the CoBot workflow;
    a CoBot deployer, executed by the at least one hardware processor, to deploy the CoBot that includes the configured bots in an operational environment to perform the CoBot workflow; and
    a façade wrapper generator, executed by the at least one hardware processor, to generate a homogeneous wrapper for each interface between the bots and the at least one human of the team to monitor a health of each of the bots and to enable communication between the bots and the at least one human.

2. The software CoBot engineering, execution, and monitoring apparatus according to claim 1, wherein the agent prioritizer is executed by the at least one hardware processor to:
    prioritize, based on the mapping of the at least one of the functional requirement or the non-functional requirement, the bots of the team to identify at least one further bot that is a lower match to the at least one of the functional requirement or the non-functional requirement.

3. The software CoBot engineering, execution, and monitoring apparatus according to claim 2, wherein the agent inter-compatibility inspector is executed by the at least one hardware processor to:
    assign, based on a determination that the bot that has been assigned to perform the task of the CoBot workflow is not compatible with the another bot that has been assigned to perform the another task of the CoBot workflow, the at least one further bot that is the lower match to the at least one of the functional requirement or the non-functional requirement to perform the task of the CoBot workflow.

4. The software CoBot engineering, execution, and monitoring apparatus according to claim 1, wherein the agent configuration generator is executed by the at least one hardware processor to:
perform a global configuration of all of the bots of the team; and
perform a local configuration of each of the bots of the team.

5. The software CoBot engineering, execution, and monitoring apparatus according to claim 1, further comprising:
a workflow performer, executed by the at least one hardware processor, to
analyze, for the deployed CoBot, a user input associated with at least one task to be performed by the deployed CoBot, and
determine, based on the user input, which bot of the plurality of bots or whether the at least one human is to be invoked to perform the at least one task to be performed by the deployed CoBot;
a workflow optimizer, executed by the at least one hardware processor, to
determine whether the user input corresponds to a previously performed user input, and
based on a determination that the user input corresponds to the previously performed user input, maintain or modify an order of the bot of the plurality of bots or the at least one human that is to be invoiced to perform the at least one task to be performed by the deployed CoBot; and
an unauthorized intents tracker, executed by the at least one hardware processor, to
analyze an output of the bot of the plurality of bots or the at least one human that is invoked to perform the at least one task to be performed by the deployed CoBot, and
determine, based on an analysis of the output of the bot of the plurality of bots or the at least one human, whether the output represents an unauthorized intent.

6. The software CoBot engineering, execution, and monitoring apparatus according to claim 5, further comprising:
a governance analyzer, executed by the at least one hardware processor, to
generate, based on a determination that the output represents the unauthorized intent, an edge data bundle;
a data aggregator, executed by the at least one hardware processor, to
generate, based on the edge data bundle, a CoBot transparency graph that tracks operations of the plurality of bots and the at least one human in the team; and
a liability ledger analyzer, executed by the at least one hardware processor, to
determine, based on the CoBot transparency graph, whether the bot or the human that is developing the unauthorized intent is to be replaced or retrained.

7. The software CoBot engineering, execution, and monitoring apparatus according to claim 6, further comprising:
a change manager, executed by the at least one hardware processor, to
determine whether a requirement associated with the bot or the human that is developing the unauthorized intent is changed, and
based on a determination that the requirement associated with the hot or the human that is developing the unauthorized intent is changed, replace or retrain the bot or the human that is developing the unauthorized intent.

8. The software CoBot engineering, execution, and monitoring apparatus according to claim 6, further comprising:
a fault tolerance analyzer, executed by the at least one hardware processor, to
determine whether a fault has occurred with respect to the bot or the human that is developing the unauthorized intent, and
based on a determination that the fault has occurred with respect to the hot or the human that is developing the unauthorized intent, replace or retrain the bot or the human that is developing the unauthorized intent.

9. The software CoBot engineering, execution, and monitoring apparatus according to claim 6, further comprising:
a workload manager, executed by the at least one hardware processor, to
determine whether a workload associated with the bot or the human that is developing the unauthorized intent exceeds a specified workload, and
based on a determination that the workload associated with the hot or the human that is developing the unauthorized intent exceeds the specified workload, divide the workload amongst a plurality of bots or humans.

10. The software CoBot engineering, execution, and monitoring apparatus according to claim 6, further comprising:
a compliance analyzer, executed by the at least one hardware processor, to
determine whether the bot or the human that is developing the unauthorized intent is in compliance with a policy associated with operation of the bot or the human, and
based on a determination that the bot or the human that is developing the unauthorized intent is not in compliance with the policy associated with operation of the bot or the human, replace or retrain the hot or the human that is developing the unauthorized intent.

11. The software CoBot engineering, execution, and monitoring apparatus according to claim 5, further comprising:
a health tracker, executed by the at least one hardware processor, to
monitor, based on an analysis of environment logs and network logs associated with the plurality of hots and the at least one human in the team to determine an operational status of the plurality of bots and the at least one human in the team.

12. The software CoBot engineering, execution, and monitoring apparatus according to claim 5, further comprising:
a workflow tracker, executed by the at least one hardware processor, to
track, based on the environment logs and network logs associated with the plurality of hots and the at least one human in the team, a status of the CoBot workflow.

13. The software CoBot engineering, execution, and monitoring apparatus according to claim 5, further comprising:
an interoperability analyzer, executed by the at least one hardware processor, to convert an output of a bot of the plurality of bots in the team for comprehension by another bot of the plurality of hots in the team.

14. A method for software collaborative robot (CoBot) engineering, execution, and monitoring, the method comprising:

extracting, by at least one hardware processor, based on at least one domain-specific natural language processing model, at least one CoBot requirement from a requirement specification for a CoBot that is to be implemented;

generating, by the at least one hardware processor, based on application of a CoBot description language to the at least one CoBot requirement, a CoBot workflow that specifies a plurality of tasks to be performed by the CoBot;

determining, by the at least one hardware processor, for each of the tasks of the CoBot workflow, whether the task is to be performed by a bot or by a human;

generating, by the at least one hardware processor, based on the determination for each of the tasks of the CoBot workflow that the task is to be performed by the bot or by the human, a team that includes the at least one bot and the at least one human to execute the CoBot workflow;

deploying, by the at least one hardware processor, the CoBot that includes the at least one bot and the at least one human in an operational environment to perform the CoBot workflow; and generating, by the at least one hardware processor, a homogeneous wrapper for each interface between bots and the at least one human of the team to monitor a health of each of the bots and to enable communication between the bots and the at least one human.

15. The method for software CoBot engineering, execution, and monitoring, according to claim 14, the method comprising:

configuring, by the at least one hardware processor, the at least one bot to perform an assigned task of the CoBot workflow; and deploying, by the at least one hardware processor, the CoBot that includes the at least one configured bot and the at least one human in the operational environment to perform the CoBot workflow.

16. A non-transitory computer readable medium having stored thereon machine readable instructions, the machine readable instructions, when executed by at least one hardware processor, cause the at least one hardware processor to:

analyze, for a deployed collaborative robot (CoBot), a user input associated with at least one task to be performed by the deployed CoBot;

determine, based on the user input, which bot of a plurality of bots or whether at least one human is to be invoked to perform the at least one task; and determine, based on an analysis of an output of the bot of the plurality of bots or the at least one human that is invoked to perform the at least one task, whether the output represents an unauthorized intent of the at least one task performed by the bot of the plurality of bots or the at least one human; and generate a homogeneous wrapper for each interface between the bots and the at least one human to monitor a health of each of the bots and to enable communication between the bots and the at least one human.

17. The non-transitory computer readable medium according to claim 16, the machine readable instructions, when executed by the at least one hardware processor, cause the at least one hardware processor to:

determine whether the user input corresponds to a previously performed user input; and based on a determination that the user input corresponds to the previously performed user input, maintain or modify an order of the bot of the plurality of bots or the at least one human that is invoked to perform the at least one task.

18. The non-transitory computer readable medium according to claim 16, the machine readable instructions, when executed by the at least one hardware processor, cause the at least one hardware processor to:

generate, based on a determination that the output represents the unauthorized intent, an edge data bundle;

generate, based on the edge data bundle, a CoBot transparency graph that tracks operations of the plurality of hots and the at least one human; and determine, based on the CoBot transparency graph, whether a bot or a human that is developing the unauthorized intent is to be replaced or retrained.

* * * * *